Oct. 26, 1971   J. LUSTI   3,614,997
PLURAL CAR CONVEYOR SYSTEM CONTROLLED BY PERFORMANCE
TIMES BETWEEN CARS
Original Filed Aug. 30, 1967   16 Sheets-Sheet 1

INVENTOR
JOHN LUSTI
BY R. T. Mayer ATTORNEY

INVENTOR
JOHN LUSTI
BY R. T. Mayer ATTORNEY

Oct. 26, 1971  J. LUSTI  3,614,997
PLURAL CAR CONVEYOR SYSTEM CONTROLLED BY PERFORMANCE
TIMES BETWEEN CARS
Original Filed Aug. 30, 1967  16 Sheets-Sheet 5

INVENTOR
JOHN LUSTI
BY R. T. Mayer ATTORNEY

INVENTOR
JOHN LUSTI
BY ATTORNEY

Oct. 26, 1971  J. LUSTI  3,614,997
PLURAL CAR CONVEYOR SYSTEM CONTROLLED BY PERFORMANCE TIMES BETWEEN CARS
Original Filed Aug. 30, 1967  16 Sheets-Sheet 7

INVENTOR
JOHN LUSTI
BY R. T. Mayer ATTORNEY

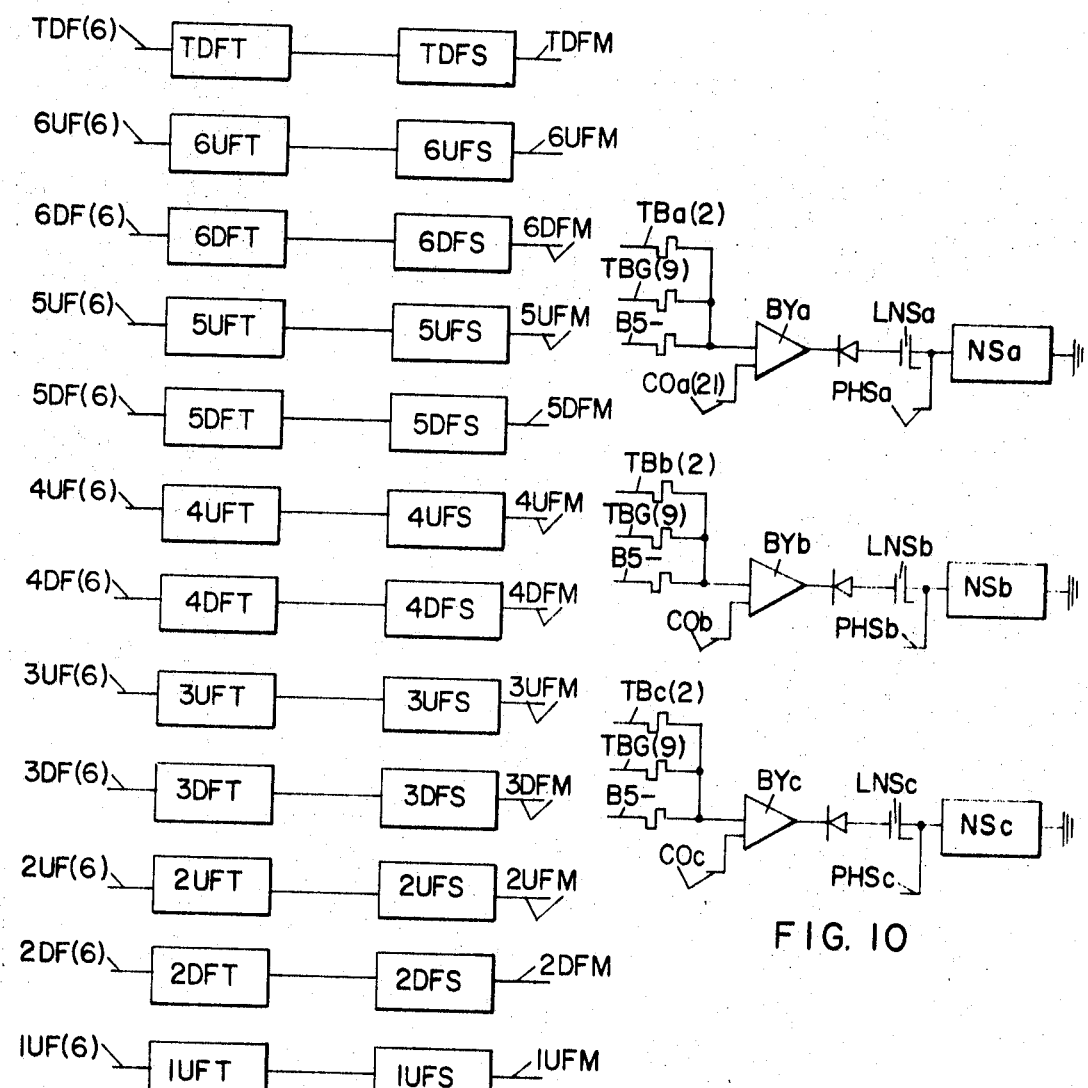
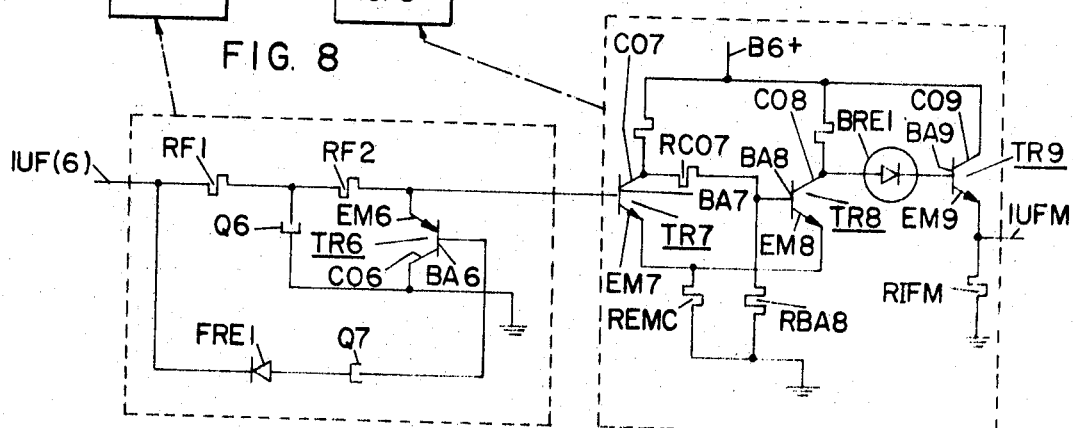
FIG. 8
FIG. 10
FIG. 8A

INVENTOR
JOHN LUSTI
ATTORNEY

INVENTOR
JOHN LUSTI

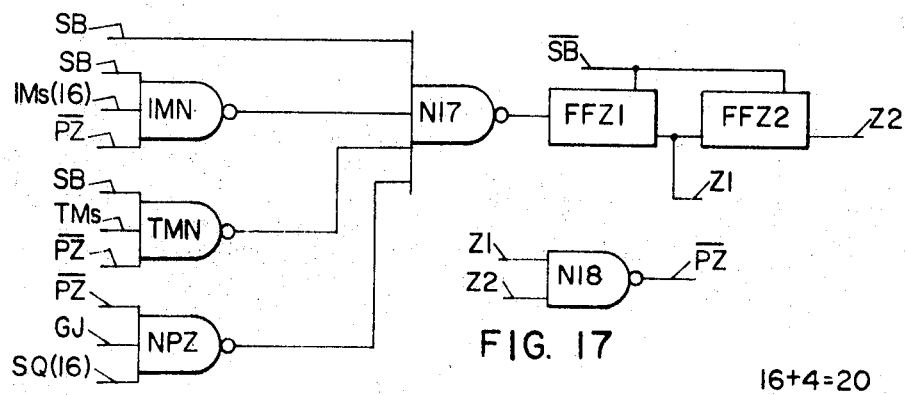
FIG. 17
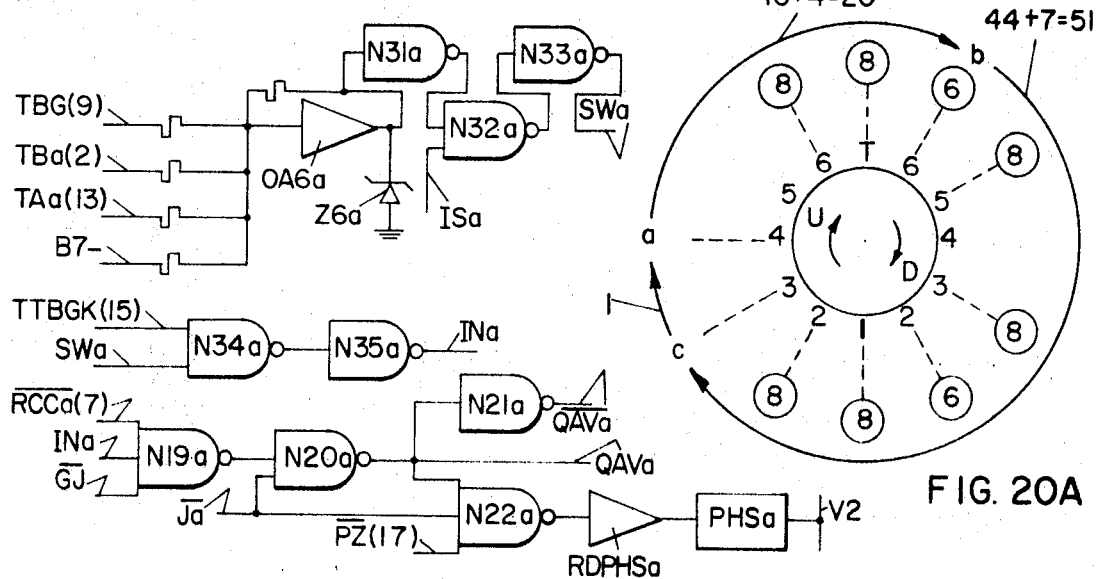
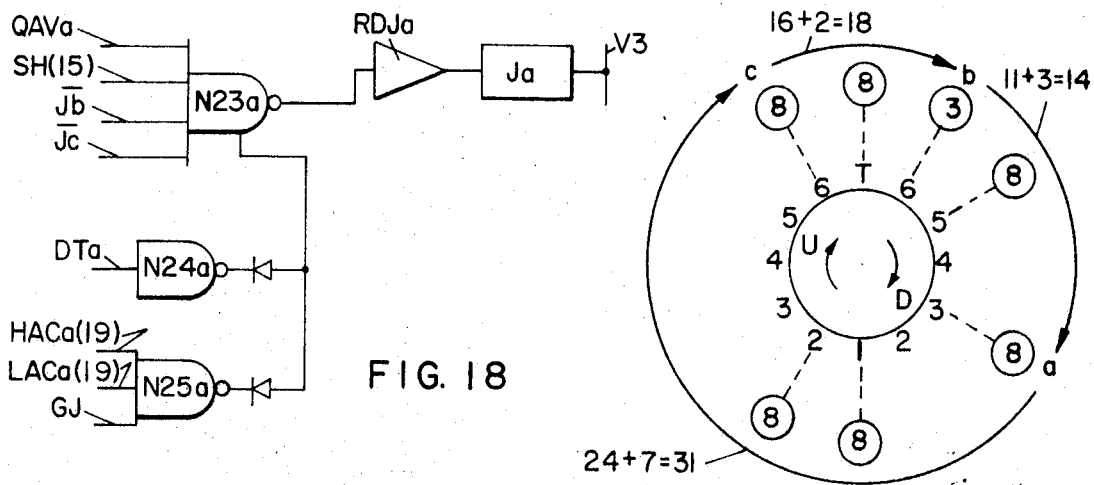
FIG. 18
FIG. 20A
FIG. 20B

Oct. 26, 1971
J. LUSTI
3,614,997
PLURAL CAR CONVEYOR SYSTEM CONTROLLED BY PERFORMANCE TIMES BETWEEN CARS
Original Filed Aug. 30, 1967     16 Sheets-Sheet 16

INVENTOR
JOHN LUSTI
BY ATTORNEY

United States Patent Office 3,614,997
Patented Oct. 26, 1971

3,614,997
PLURAL CAR CONVEYOR SYSTEM CONTROLLED BY PERFORMANCE TIMES BETWEEN CARS
John Lusti, River Vale, N.J., assignor to Otis Elevator Company, New York, N.Y.
Continuation-in-part of application Ser. No. 866,417, Sept. 18, 1969, which is a continuation of application Ser. No. 664,434, Aug. 30, 1967. This application Dec. 16, 1969, Ser. No. 885,607
Int. Cl. B66b 1/20
U.S. Cl. 187—29
117 Claims

ABSTRACT OF THE DISCLOSURE

An conveyor control system for a group of cars in which the cars respond to calls for service in accordance with the relationship between the work load of each individual car and the average of the work loads of all the cars in the group. The work load of a car preferably is expressed in terms of the performance time separating it from the car immediately ahead of it in a prescribed way of travel and is a function of both the distance between it and the car immediately ahead of it and the number of landings between them at which the car in question will answer calls for service. If the work load of any car is less than the average the car immediately ahead of it is enabled to bypass without stopping at those landings at which it otherwise would in answer to calls. If the combined work loads of any one car and the car immediately behind it are less than the average, that one car is available and will operate to provide direct service to a selected one of the hall calls in registration.

This is a continuation-in-part of application Ser. No. 866,417, filed Sept. 18, 1969 now abandoned, which itself is a continuation of application Ser. No. 664,434 filed Aug. 30, 1967 now abandoned.

This is an invention in the conveyor art. While it is applicable to control systems for what might broadly be called conveyor cars, it more particularly concerns an elevator control system for a group of cars. The cars serve the lands in the system in response to calls and preferably each car shares equally in the total work of the group.

For many years it has been accepted practice to provide service to passengers in elevator systems by having the cars in each of these systems operate as a group and travel through the building they serve in a series of round trips which normally but not invariably take them from one terminal to the other and back again. Variations in the length of the round trips are provided in some systems by an added feature which permits the cars under certain traffic conditions to reverse before reaching either of the terminals in order to start them sooner towards the opposite terminal. Dispatching arrangements are also provided in such systems to distribute the cars with respect to the traffic by dispatching them at intervals from one or both terminals. Distributing the cars in this way enhances the efficiency of the system because it tends to prevent the cars from gathering in clusters, or "bunching" as it is more commonly called, traversing their hoistways together and thereby increasing the waiting time of intending passengers.

In all of these systems it has long been the desire to exercise more control over the cars than is exercised by the present dispatching arrangements which regulate the operation of the cars primarily only at the terminals. This has been done in some cases but has resulted in the accompanying surrender of the basic round trip type of operation.

This invention provides a multi-car elevator system with an arrangement for controlling the cars at a plurality of points in addition to the terminals so as to make each of the cars do a substantially equal amount of work. It does this—and does not sacrifice the basic round trip type of operation—by controlling the cars in accordance with the distance and the service demands existing between them.

Accordingly, the primary object of this invention is to provide a more efficient multi-car elevator control system.

In carrying out the invention in a presently preferred embodiment, the system generates currents signifying the number of floors between each individual car and the car immediately ahead of it on its trip through the building. The magnitude of each of these distance responsive currents depends upon the time it takes its associated car to travel the determined number of floors at its rated speed. Also generated are currents signifying the number of floors at which each car will encounter calls for service in traveling the distance between it and the car immediately ahead of it. The magnitude of each of these call responsive currents depends upon the time allotted its associated car to answer the calls it will encounter. The magnitude of the distance and call responsive currents for each car are combined to obtain a total. An average of all of these totals is computed and each total is compared to this average. Any car whose total is less than the average, influences the system to cause the car immediately ahead of it to bypass, without stopping at, those floors with registered hall calls which normally would cause the car to stop. This bypassing is permitted, however, only if the car ahead does not have a car call registered for such a floor. In this way, the system maintains the work each car must perform substantially equal to that of each of the other cars under the various conditions of call registration.

In addition, the total distance and call responsive currents for each car are combined with those of the car immediately ahead of it. If any such combined total is less than the average the car ahead which is associated therewith is designated as an available car. Any car whose individual total is greater than twice the average causes the operation of a heavy traffic signifying means. This causes a scanning device to select one of the hall calls which caused the operation of the heavy traffic signifying means for response by an available car. As a result of the selection of a hall call and the availability of a car, direct service means causes the available car to travel directly to the floor at which the selected call is registered, to stop thereat and to answer that call. By causing cars to bypass floors at which they would otherwise stop and by directing cars to serve calls other cars would ordinarily serve, the system maintains the amount of work of each car substantially equal.

The foregoing and other objects and advantages of the invention will be appreciated from the following description of a preferred embodiment when considered in conjunction with the accompanying claims and drawing.

In the drawing:

FIG. 1 shows rows and columns of circuits for a representative one of the elevator cars of a hereinafter to be described three car group system installed in accordance with the invention in a seven floor building; each row being associated with a different floor and containing a number of different circuits illustrated in block diagram form, the circuits in a row generating various direction and location signals when the car is located at its associated floor; and the columns segregating those circuits which correspond to one another in each of the rows;

FIG. 1A shows the interndal component arrangements of the block diagrams of a representative one of the rows in FIG. 1;

FIGS. 2 and 3 taken together show four operational amplifiers each connected to the output of a different ring arrangement of switching circuits in block diagram form;

these ring arrangements provide signals indicating the work load between each car of the aforementioned three car system and the car immediately behind it on its trip through the building as well as the work load from any floor in the building to the nearest car to that floor in a prescribed way of travel;

FIGS. 2A and 3A show the internal component circuit arrangements of a representative one of each of the different block diagrams shown in FIGS. 2 and 3, respectively;

FIGS. 4 and 5 taken together show a ring arrangement of switching circuits in block diagram form which determines which of the car calls registered in each car of the three car system are for floors between it and the car immediately ahead of it on its trip through the building;

FIG. 8 shows switching circuits in block diagram form associated with each hall call registering device for generating signals signifying that its associated hall call has been in registration for a predetermined period of time;

FIG. 8A shows the internal compenent arrangements of a representative one of each of the different block diagrams of FIG. 8;

FIG. 10 shows three comparator circuits one for each car of the three car group for comparing the work load of each individual car with the average of the work loads of all cars;

Figure 12:
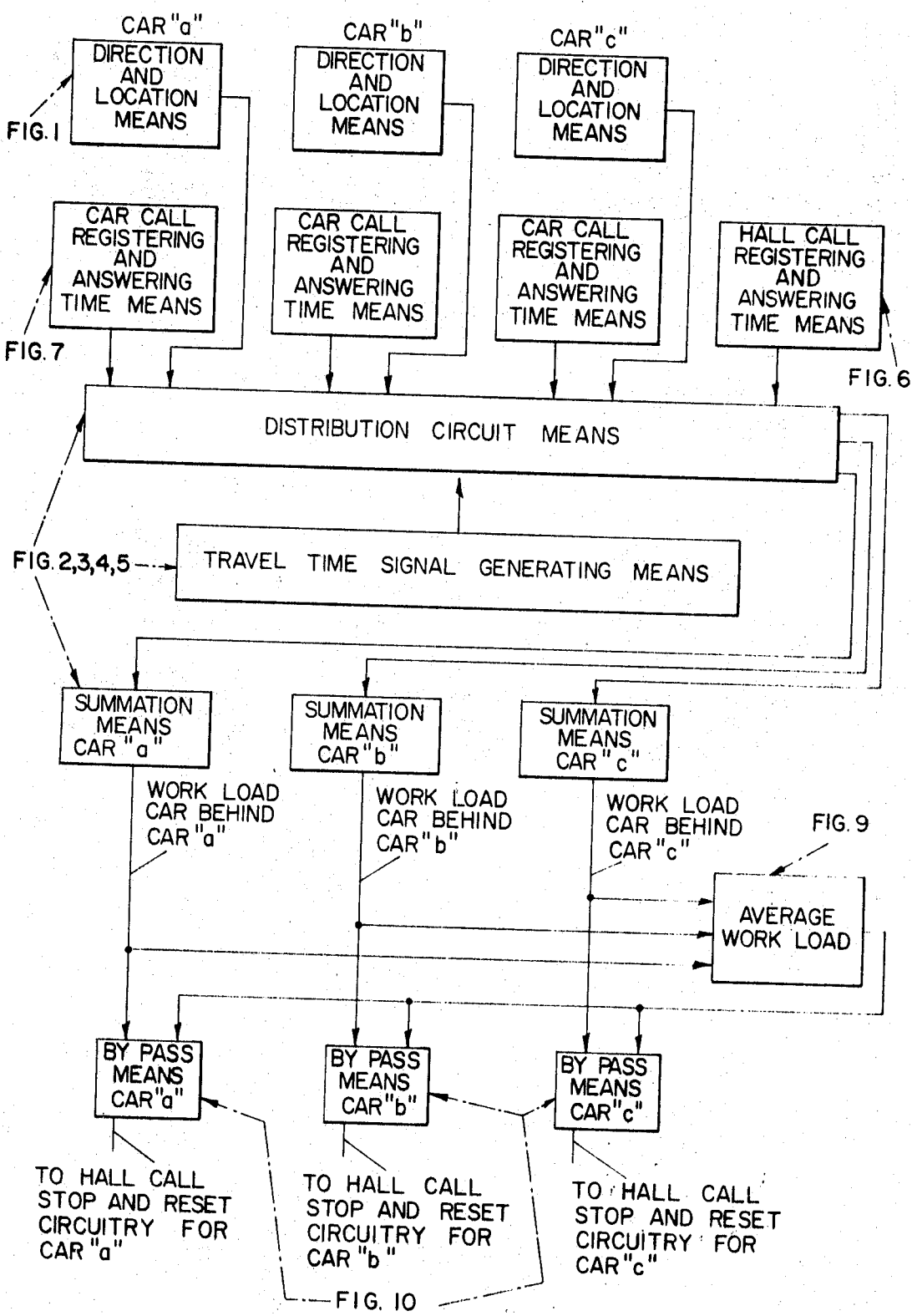
Figures 13, 13A:
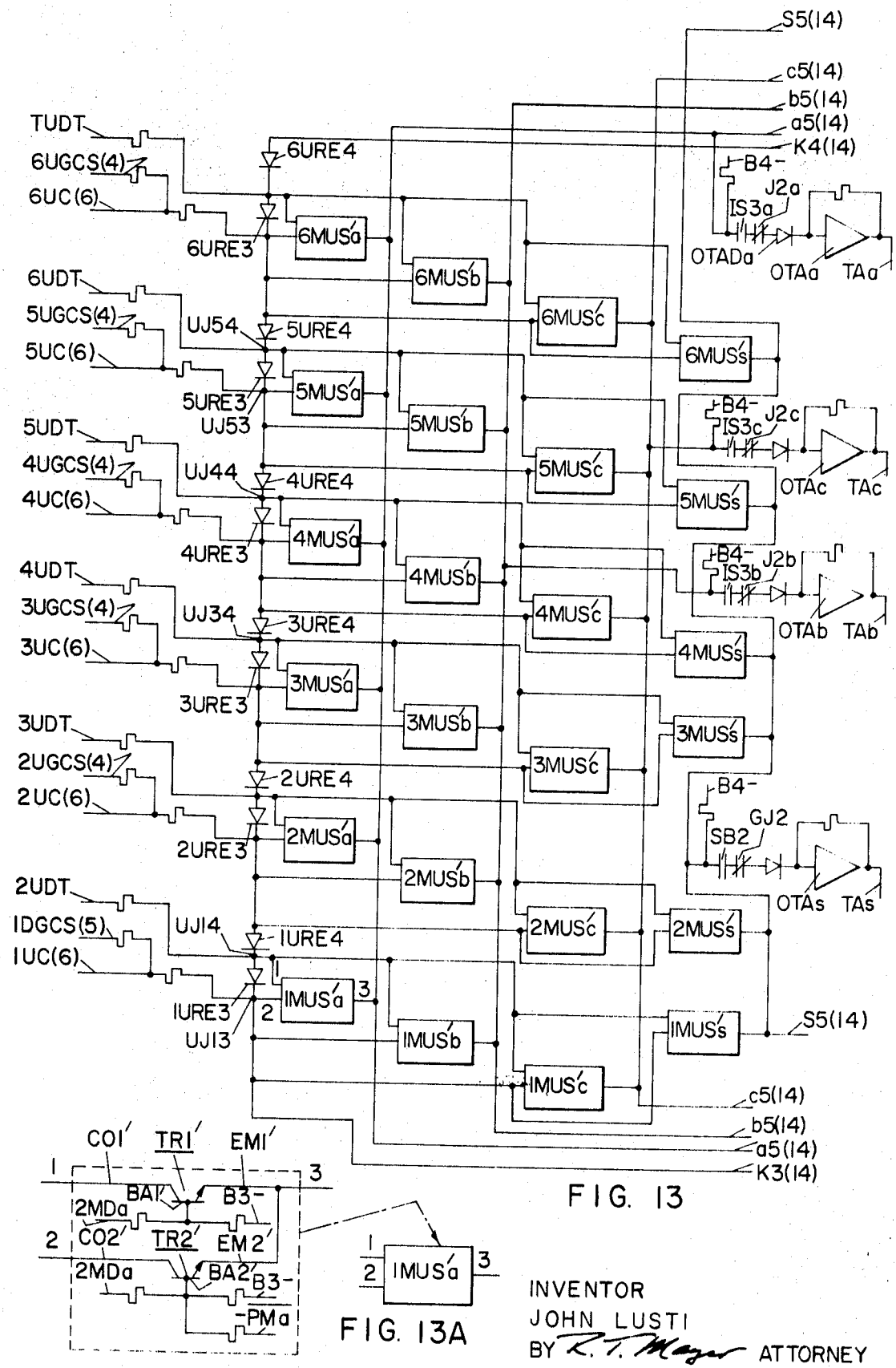
Figure 14:
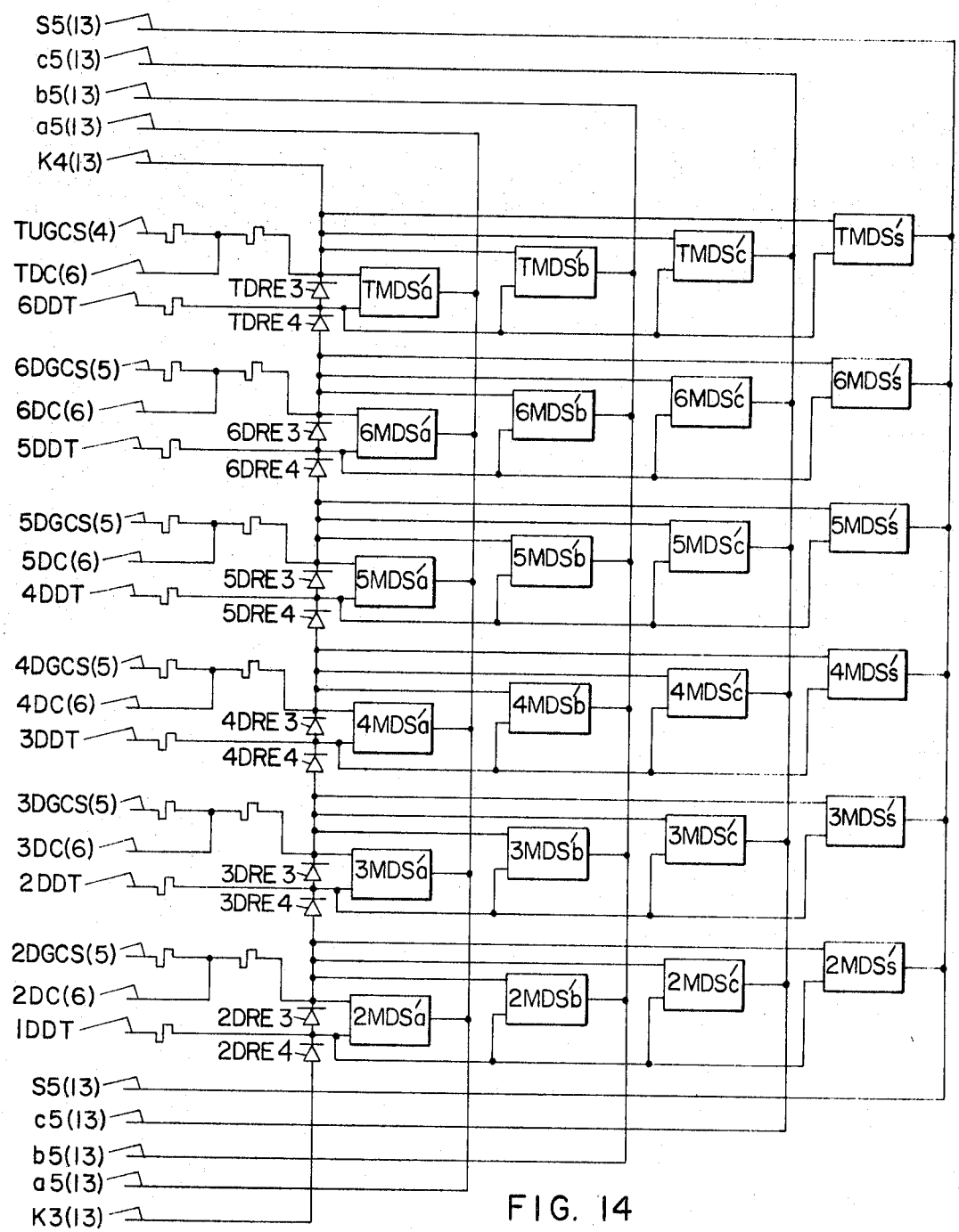
Figure 14A:
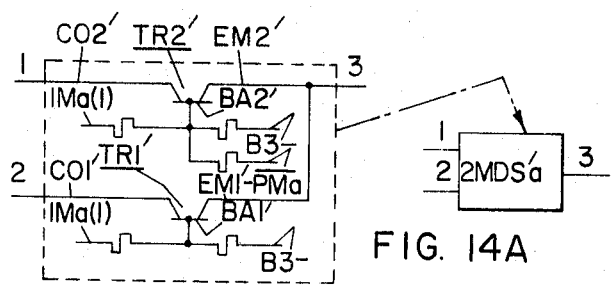
Figure 15:
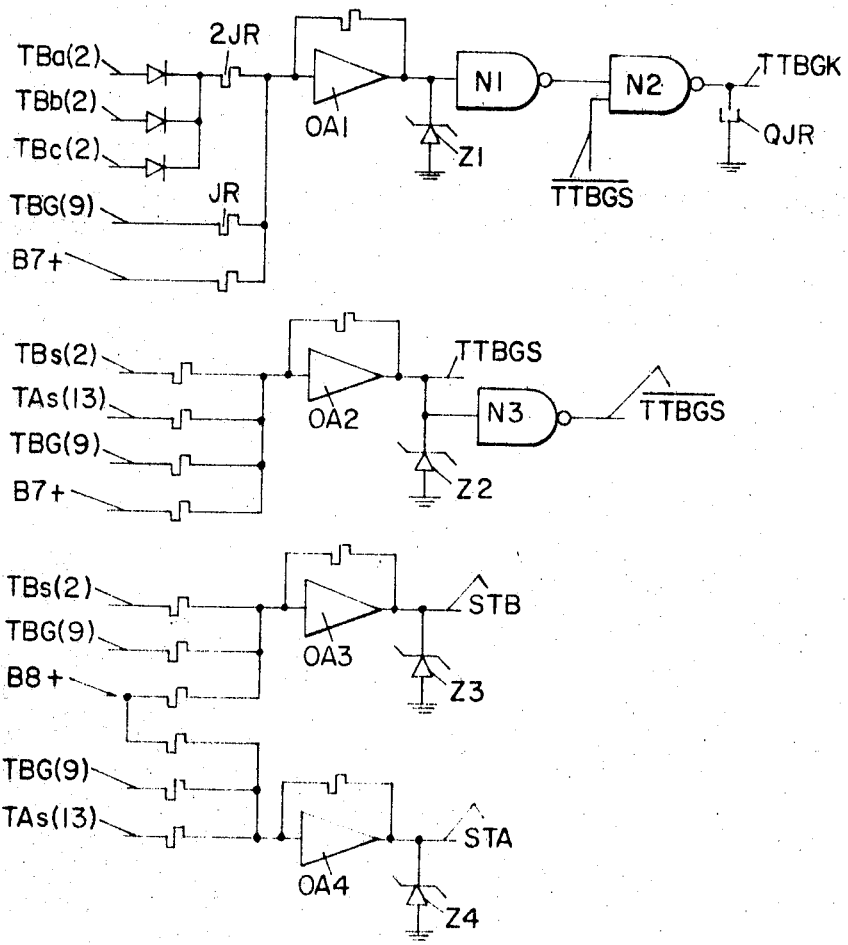
Figure 15:
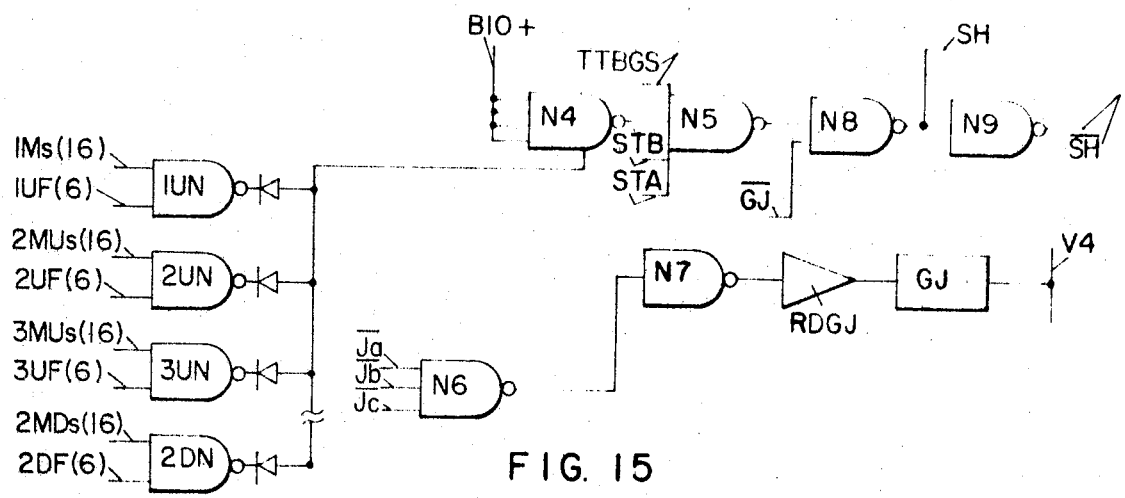
Figure 16:
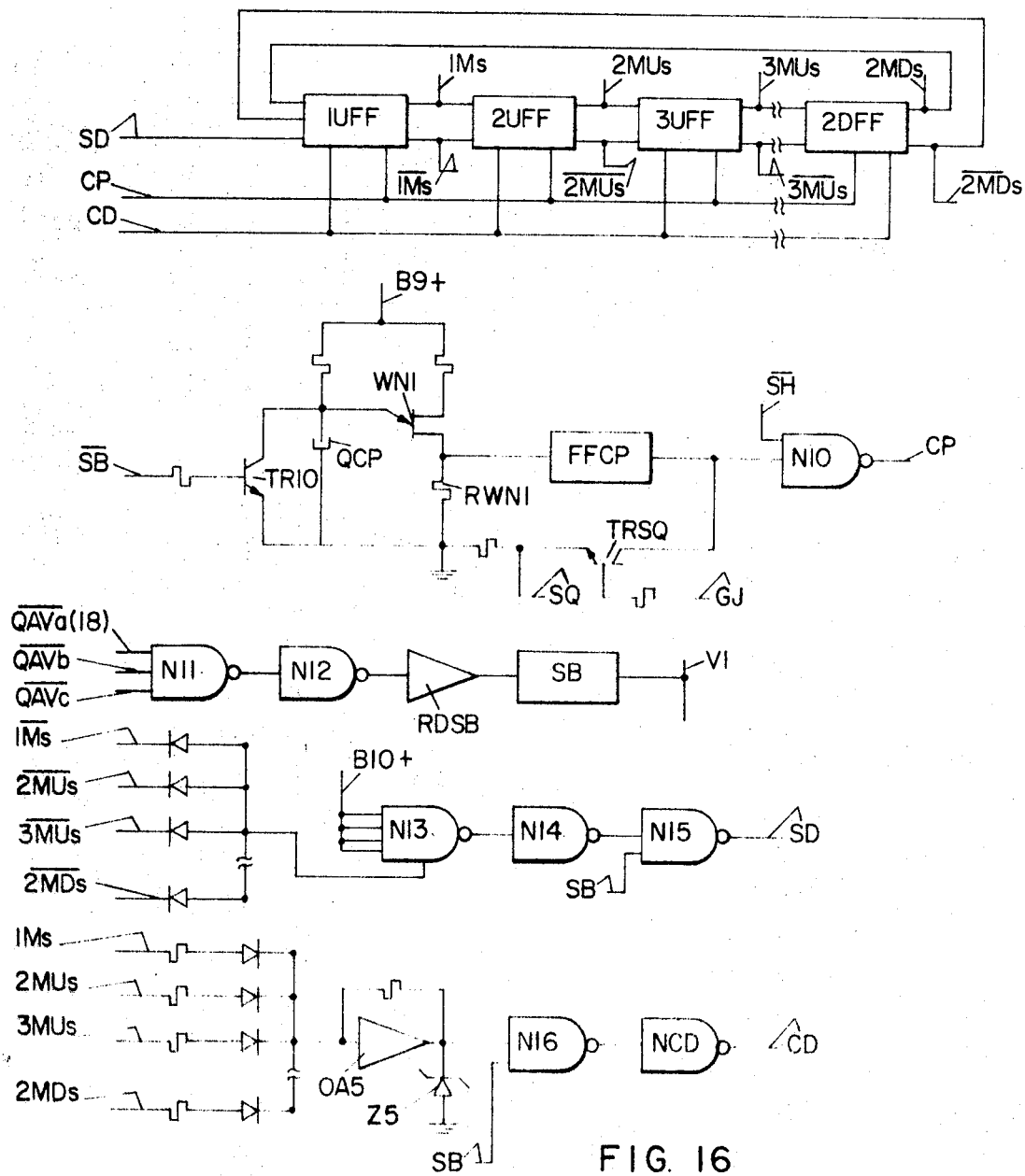
Figure 21:
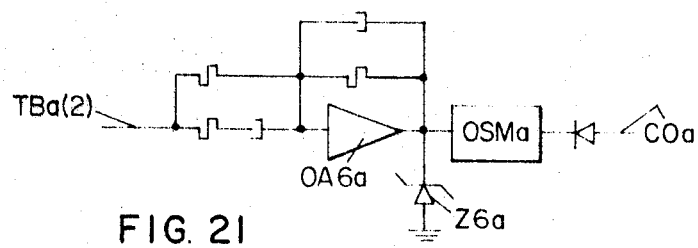
Figure 19:
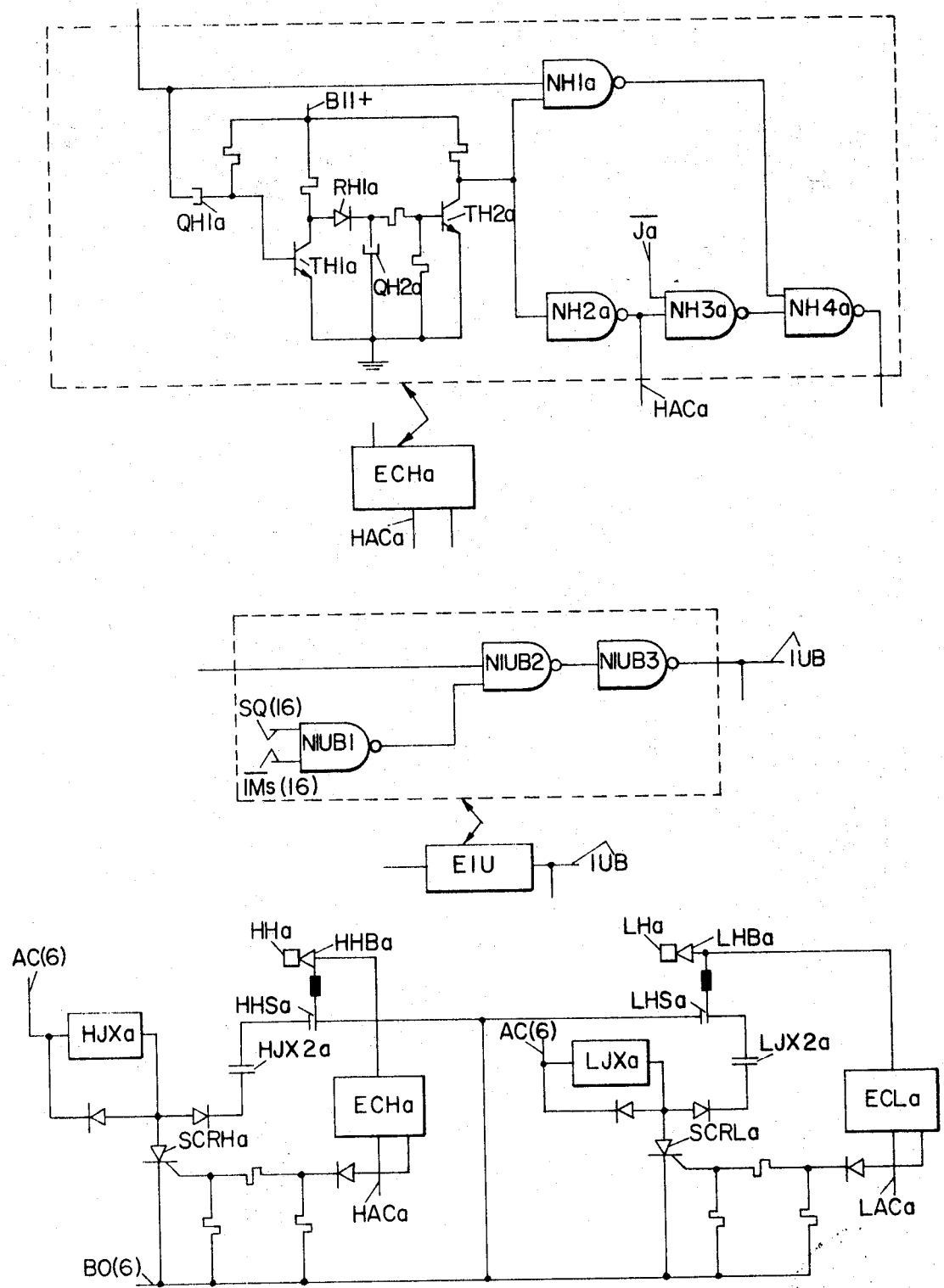

FIGS. 11A to 11D picture the forementioned seven floor installation as being represented in a circular array in which the left and right semicircles of each figure represent the routes taken by the cars in traveling up and down the hoistway, respectively. The distribution of the cars under four different conditions of operation is shown together with numerical representations of the work loads of each of the cars under each of these conditions;

FIG. 12 is a block diagram showing the interconnections between some of the equipment shown in FIGS. 1 to 10 of the drawing;

FIGS. 13 and 14 taken together show four operational amplifiers each connected to the output of a different ring arrangement of switching circuits in block diagram form; these ring arrangements provide signals indicating the work load between each car of the forementioned three car system and the car immediately ahead of it on its trip through the building as well as the work load from any floor in the building to the nearest car ahead of that floor;

FIGS. 13A and 14A show the internal component circuit arrangements of a representative one of each of the different block diagrams shown in FIGS. 13 and 14, respectively;

FIG. 15 shows circuitry including a heavy traffic signifying means together with that part of a hall call selection means for determining which hall call to select;

FIGS. 16 and 17 show circuitry including a scanning means which forms a part of the hall call selection means;

FIG. 18 shows a portion of a car availability means including a car availability switch for one of the cars of the three car system and also shows that portion of a direct service means provided for one of the cars;

FIG. 19 shows another portion of the direct service means for causing an available one of the cars in the three car system to respond to a selected hall call;

FIGS. 20A and 20B picture the system under two other conditions of operation;

FIG. 21 is an anti-coincident circuit for one of the cars.

As already indicated, the invention is disclosed in a three car group in an installation having seven floors, or landings. For convenience the control equipment has been simplified by omitting from it many of the typical elevator control components, such as the motor and brake control equipment, the door control equipment, and for the most part what is commonly referred to as the selector equipment. All of these, it is understood would be used in an actual installation but are superfluous to an understanding of the invention. All the equipment essential to such an understanding is illustrated in detail, however, and those skilled in the art will be able from this to appreciate the significance of the invention and fully practice it. In addition to emissions of equipment unessential to an understanding of the invention, in those cases where there is no fear of confusion and where the equipment for each of the cars is identical, only one representative set of that equipment is shown. Differentiation between the same equipment, where necessary in both the drawing and the following description, is made by appending the lower case letters $a$, $b$ and $c$ to the reference characters used to designate the equipment of the individual cars. The prefix numbers 1 to 6 and the prefix letter T used with the reference characters for the equipment signifies which landing, one to six and top, respectively, the equipment so marked and referred to is provided for; while the letters U and D applied to any of the equipment signify which direction of travel that equipment is associated with. Various pieces of equipment in different figures of the drawing are interconnected. The lines representing the wires which provide these interconnections have been broken and reference characters have been applied to these lines so that the same lines in different figures of the drawing bear the same reference characters. Numerals in parentheses appended to these reference characters indicate the figures in the drawing in which these lines originate.

Figure 1:
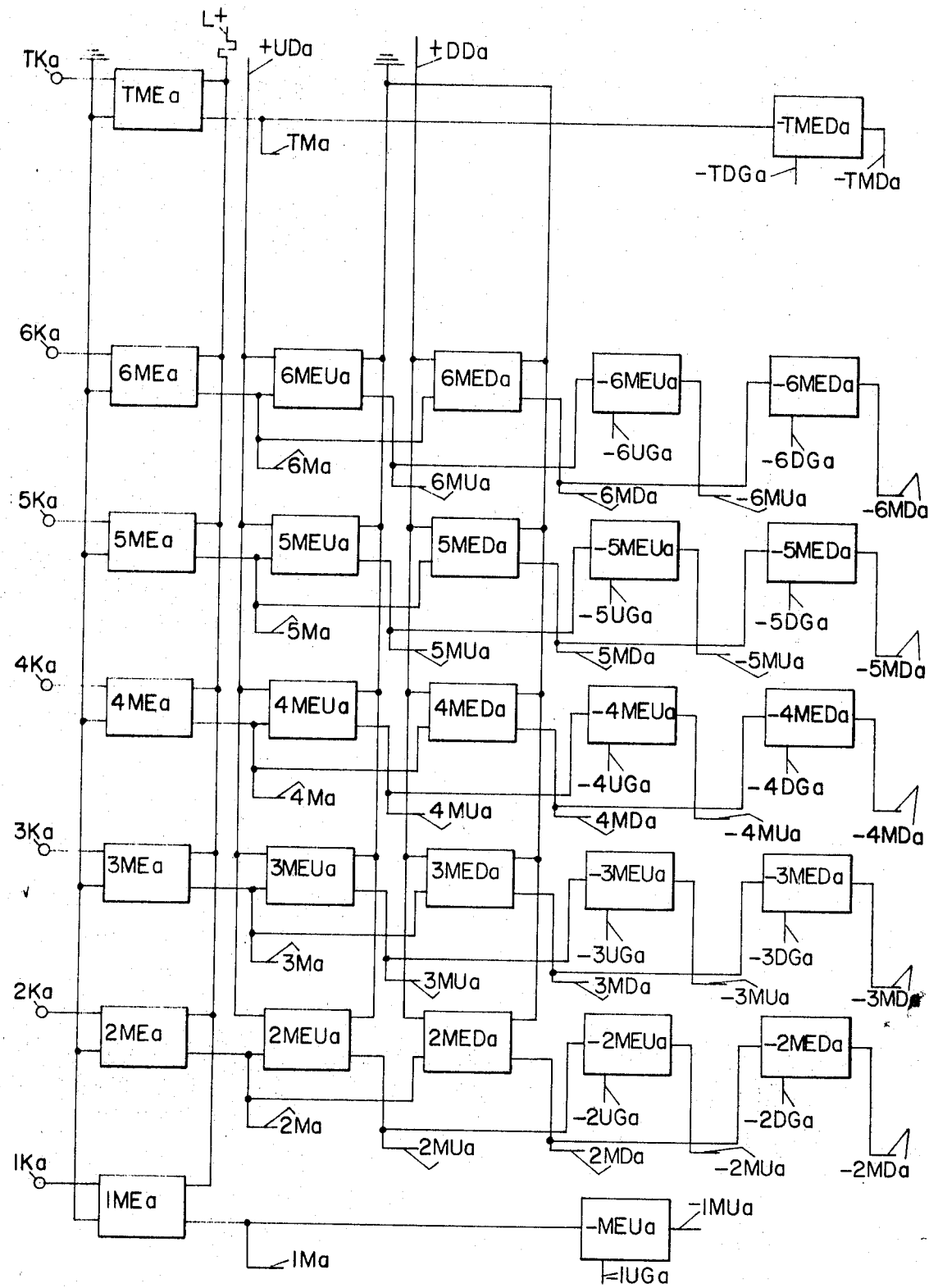

A general understanding of the invention will begin to develop upon considering FIG. 1 of the drawing in which a floor memory control unit for car $a$ is illustrated. Although not shown, a duplicate of this unit is provided for each of the other cars in the system. Each of these units comprises a direction and location means for its individual car. Contacts 1K$a$ to TK$a$ symbolize any of the well known devices used in the floor selectors of elevator systems to develop a signal whenever the car associated with them, in this case car $a$, approaches the landing to which they correspond. Depending upon the rated speed of the car the development of each of these signals may take place in synchronism with the car's location adjacent a landing or in advance thereof.

In the circuitry of FIG. 1 each of contacts 1K$a$ to TK$a$ is connected to a corresponding floor memory element 1ME$a$ to TME$a$. An output circuit is connected from each memory element. The output circuits 2M$a$, etc., of the memory elements 2ME$a$ to 6ME$a$, for the intermediate floors, or landings, are each individually connected to the input circuits of two associated AND elements 2MEU$a$ to 6MEU$a$ and 2MED$a$ to 6MED$a$. Each of these AND elements has a second input circuit. Those AND elements whose reference characters include the letter U are associated with the up direction of car travel from their respective landings and have an input along line +UD$a$ from a well known device which produces a positive polarity signal whenever car $a$ is conditioned for continued travel in the up direction. Those whose reference characters include the letter D are associated with the down direction of car travel from their respective landings and have an input along line +DDa from a well known device which produces a positive polarity signal whenever car a is conditioned for continued travel in the down direction. No such AND elements are provided for the terminal floors, or landings, since the cars can only travel in one direction from these.

The output circuits 2MUa, 2MDa, etc., of each of the AND elements 2MEUa to 6MEUa and 2MEDa to 6MEDa for the intermediate landings as well as the output circuits 1Ma, TMa of each of the terminal floor memory elements 1MEa and TMEa are connected to individual signal inverters designated −2MEUa to −6MEUa and −2MEDa to −6MEDa for the intermediate landings and −1MEUa and −TMEDa for the terminal landings.

Figure 1A:
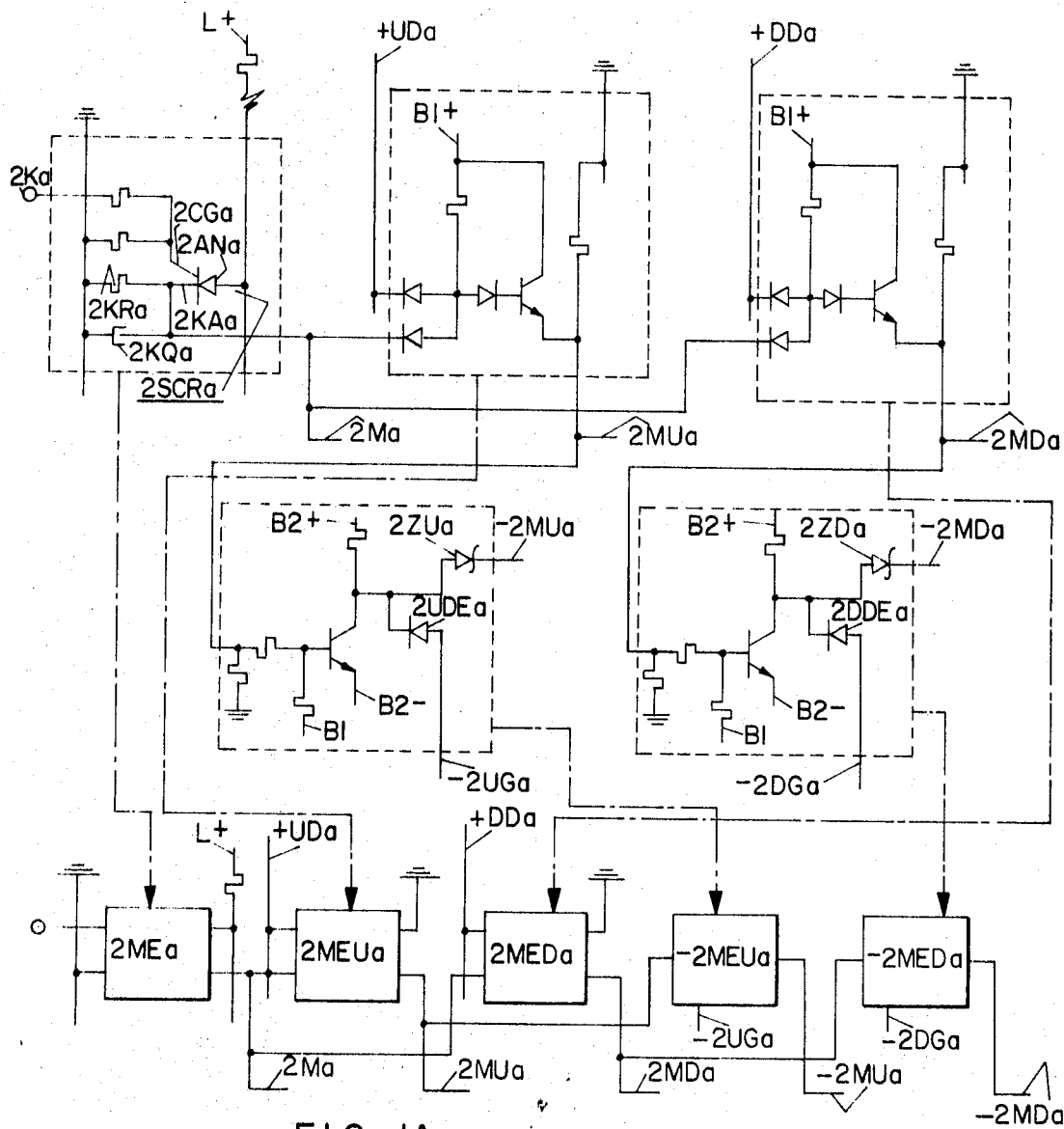

Each of the floor memory elements 1MEa to TMEa includes a silicon controlled rectifier such as the representative one 2SCRa shown for the second landing (FIG. 1A). The control gate of each of the silicon control rectifiers is connected to its corresponding floor contacts 71Ka to TKa in the same way as control gate 2CGa is connected to its corresponding floor contact 2Ka (FIG. 1A). All of the rectifiers have their anode-cathode circuits connected in parallel from a positive potential along line L+ through a common resistor and individual parallel resistor condenser circuits to ground as is observable from FIG. 1A.

The operation of only that part of the circuitry of FIG. 1 which is associated with the second landing will be described, it being understood that the corresponding circuitry associated with the other landings operates in a similar manner. The upward approach of car a to the second floor, or landing, applies a positive potential signal through contact 2Ka to control gate 2CGa causing conduction in silicon controlled rectifier 2SCRa to signify the location of car a at the second landing. Current flowing through the rectifier causes its cathode condenser 2KQa to charge. But before any charge can accumulate, the condenser acts as a short to ground from cathode 2KAa, lowering the anode to ground potential of the anode-cathode circuits of all the rectifiers. At this time condenser 1KQa (not shown) associated with previously operated rectifier 1SCRa (not shown) for the first landing, which car a just left, is charged fully. This maintains cathode 1KAa (not shown) at a potential which causes the voltage from itself to anode 1ANa (not shown) to be below the voltage drop which will sustain conduction of rectifier 1SCRa and it ceases conducting ending the memory of the location of car a at the first landing. In a similar manner the memory of the location of car a is transferred from one floor memory element to another as it travels up and down the building.

The cathode potential of an operated floor memory element for an intermediate landing, say 2MEa, is transmitted along line 2Ma to both its associated AND elements 2MEUa and 2MEDa, where it provides a blocking input signal to the positive potential on line B1+ (FIG. 1A). Depending upon the direction of travel for which car a is conditioned, another blocking input signal is provided on either line +UDa or +DDa and the potential of line B1+ saturates the base of the transistor in the AND element to which the two blocking inputs are applied. Thereupon this transistor conducts signifying the location of car a at the second landing conditioned for continued travel from that landing in either the up or down direction. Conduction in the transistor causes its emitter voltage to increase from ground to a positive potential. This potential is applied along line 2MUa or 2MDa to the base of the transistor in its corresponding inverter −2MEUa or −2MEDa where it overcomes the negative bias along line B1− and saturates the base of the transistor. As a result the respective inverter transistor conducts and its collector voltage goes from a positive potential to a negative one. This potential is applied through the respective diode 2UDEa, or 2DDEa (FIG. 1A) to group output line −2UGa or −2DGa. It is also applied through the respective Zener diode 2ZUa to 2ZDa where its magnitude is sufficiently in excess of the Zener's reverse breakdown voltage to cause it to conduct and apply a negative signal to individual output line −2MUa or −2MDa.

As mentioned earlier, no AND elements are provided for the terminal landings. The inverters −1MEUa and −TMEDa for these landings operate as a result of receiving the cathode potential of their respective floor memory elements 1MEa and TMEa directly.

Figures 2, 2A:
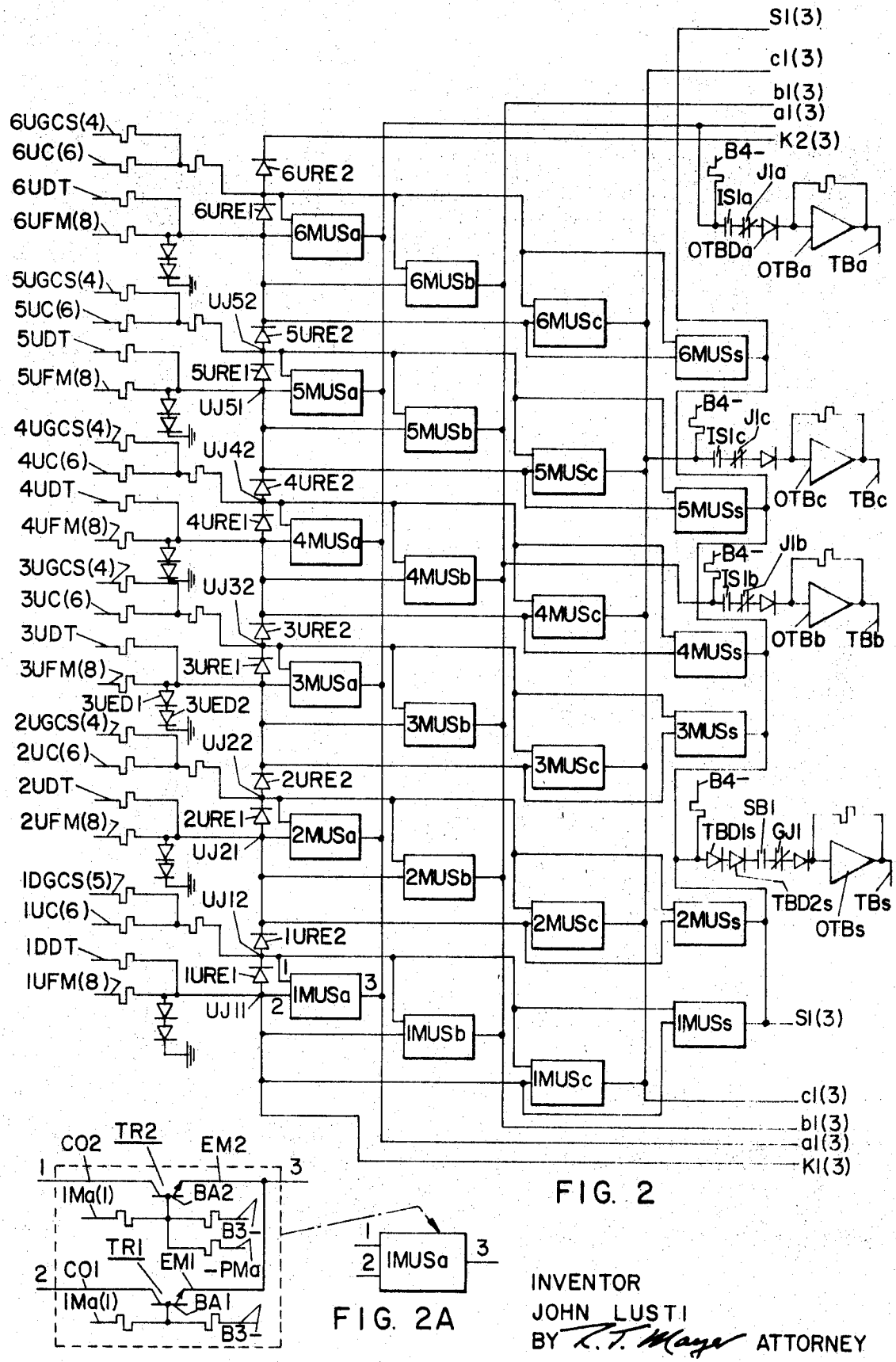
Figure 3:
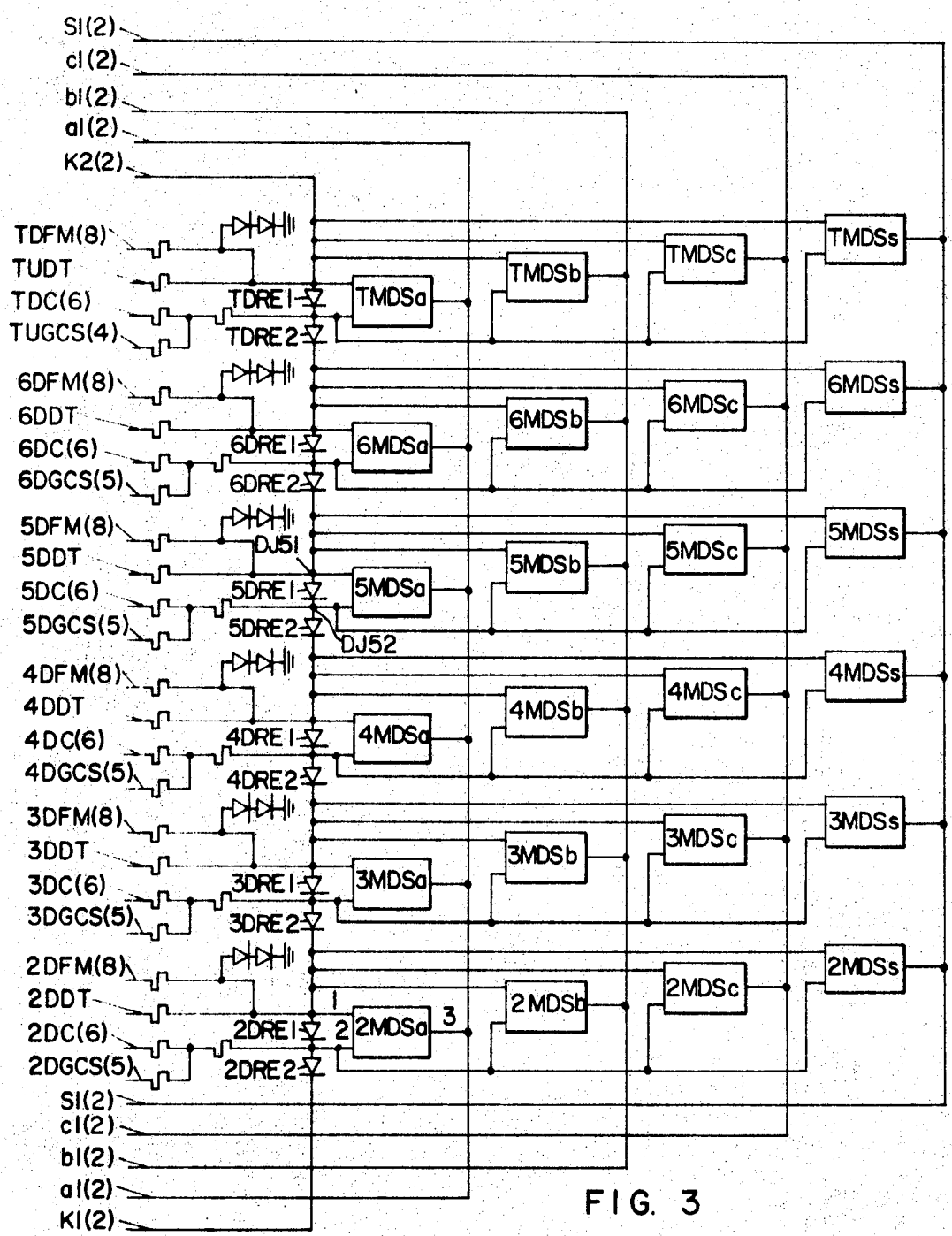

Referring now to the four operational amplifiers and their individual ring arrangement of switching circuits in FIGS. 2 and 3, one of these amplifiers and ring arrangements is provided for each of the cars. The fourth amplifier and ring arrangement is provided for the hall call selection means, described later. Each amplifier is employed as a first summation means and the ring circuits in combination and in conjunction with other equipment in the system form a first distribution circuit means including a first switching means for distributing signals to the first summation means.

Figure 3A:
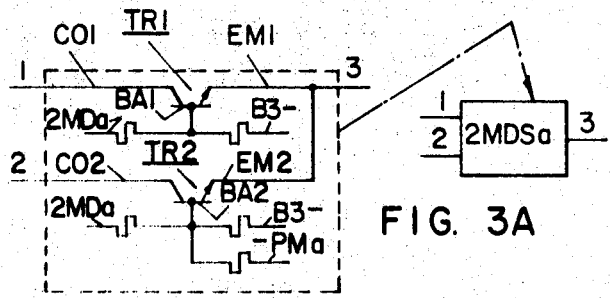

Each ring arrangement includes a switch 1MUSa, 2MUSa, etc., for each of the directions in which a car can travel from each of the floors. Each of these switches contains two transistors TR1, TR2 connected as shown in FIGS. 2A and 3A. Collectors CO1, CO2 of each pair of transistors provide two input circuits for each of the switches. Collector CO1 of each switch is isolated from collector CO2 of that switch by the diodes 1URE1, 2URE1, etc., (FIGS. 2 and 3), in the diode chain. In addition, another set of diodes 1URE2, URE2, etc., (FIGS. 2 and 3) in this chain isolates collector CO2 of each floor switch from collector CO1 of the floor switch associated with the floor immediately ahead of it in the direction of travel of the cars.

Collector CO1 of each floor switch is connected to one of a pair of first junction points UJ11, UJ21, etc., and thence through resistor circuits to its respective terminals 1DDT, etc., and 1UFM(8), etc. Each terminal 1DDT, etc., is connected to a travel time signal generating source in the form of a steady state D.C. power supply (not shown). In accordance with a current-time scale selected as a matter of design choice, this source causes a positive polarity current to flow through the resistor associated with each terminal. Each of these currents is characteristic of, by having its magnitude proportional to, the time it takes a car of the system to travel at rated speed to the corresponding floor from the floor preceding it in the direction of travel of the car. Terminals 1UFM(8), etc., are connected to equipment shown in FIG. 8 for providing a positive polarity signal which causes a current to flow signifying that a hall call for the associated landing and direction of travel has been in registration beyond a predetermined time.

Collector CO2 of each floor switch is connected to the other of a pair of first junction points UJ12, UJ22, etc., and thence through a resistor circuit to its respective terminals 1UC(6), etc., and 1DGCS(5), etc. Each terminal 1UC(6), etc., is connected to equipment shown in FIG. 6 for providing a positive polarity signal which in accordance with the selected current-time scale causes a current to flow through its associated resistor circuit which is characteristic of, by having its magnitude proportional to, the time allotted a car to answer a hall call at the associated floor. Each terminal 1DGCS(5), etc., is connected to equipment shown in FIG. 5 for providing a positive polarity signal which, in accordance with the selected current-time scale, causes a current to flow through its associated resistor circuit which is characteristic of, by having its magnitude proportional to, the time allotted a car to answer a car call at the associated floor. For purposes of simplifying this disclosure the resistor circuits connecting terminals 1UC(6), etc., and 1DGCS(5), etc., to collectors CO2 of their respective floor switches are arranged to make the input currents provided to these collectors proportional to the time allotted a car to answer a hall call at the associated floor should both a hall call and a car call be required to be answered thereat.

A different one of the operational amplifiers OTBa, OTBb and OTBc is associated with each car. The input of each amplifier is connected to the output of a different one of the ring arrangements of switches. At the input of each amplifier is a contact of the "in service" switch of one of the cars. These switches, in a well known manner are operated to close their contacts IS1a, etc., whenever their respective cars are in operation and are providing service as a member of the group. For the purpose of this disclosure, each of these switches is considered to be so operated unless either the load in its respective car is a predetermined percentage of the car's rated load capacity or the emergency stop switch in its respective car is operated.

Operational amplifier OTBs is associated with the hall call selection means and is connected to the fourth ring arrangement of switches. At its input is a contact SB1 of a scan begin switch SB (coil circuit, FIG. 16) which is operated to close these contacts whenever the scanning means of the hall call selection means is operating.

In operation, both transistors TR1 and TR2 of each of the switches of FIGS. 2 and 3 normally are biased to the non-conducting state by the negative polarity signals applied to their bases BA1, BA2 along line B3−. The bias of each switch associated with a car is overcome by a positive polarity signal signifying that the car associated with that switch is approaching the floor associated with that switch and is conditioned for continued travel in the direction associated with that switch. These signals are applied along lines 1Ma(1), 2MDa(1), etc., to their respective switches from the corresponding floor memory elements 1MEa, TMEa (FIG. 1) or from the corresponding AND elements 2MEUa, etc., or 2MEDa, etc. (FIG. 1). The bias of each switch associated with the scanning means is overcome by a positive polarity signal signifying that the scanning means is scanning the floor associated with the switch in the direction with which the switch is associated. These signals are applied along lines 1Ms, 2MUs, etc. (FIG. 16).

Each signal applied to the transistors of a switch saturates the bases of its respective transistors causing them to assume the conducting state and permitting them to transmit the input signals from diode chain 1URE1, 1URE2, etc., to the input of their respective operational amplifier OTBa, etc. The input signal along line −PMa (FIGS. 2A and 3A) applies a negative polarity bias to the base BA2 of each transistor TR2 associated with car a to make each such transistor non-conductive after car a is caused to initiate a stopping operation at its respective landing. This signal is maintained until car a is ready to start again. A device capable of providing such a signal is well known and will not otherwise be described. Similar signals are applied to the switches associated with cars b and c. No such signal is applied to the switches associated with the scanning means, for reasons which will become apparent when the purpose served by the signals along lines −PMa, etc., is fully understood as explained immediately hereinafter.

By isolating collector CO1 of each switch from collector CO2 of that switch with the set of diodes 1URE1, 2URE1, etc., and by making transistor TR2 of each switch associated with a car conductive until the initiation of a stop at its respective landing by the associated car, the call answering time signal circuits 1UC(6), 1DGCS(5), etc., for each landing are connected through transistor TR2 for that landing to the operational amplifier associated with the equipment of the car approaching the landing until the car initiates a stop thereat. At that time the transfer of transistor TR2 to the non-conducting state switches those signal circuit connections to the amplifier associated with the equipment of the car immediately ahead of the car stopping at said landing.

The operating characteristics of the operational amplifiers OTBa, OTBb, OTBc and OTBs are such that a virtual ground appears along lines a1, b1, c1 and s1, respectively, when contacts IS1a, etc., and SB1 are engaged. For practical purposes this ground can be considered as appearing at those first input junction points UJ11, UJ12, etc., in diode chain 1URE1, 1URE2, etc., which are connected to the transistors of the conducting switch in each ring arrangement. In this way the input signals associated with all the landings are distributed. The virtual ground presented by each amplifier prevents the signals received by any amplifier from being applied to any other amplifier. Each amplifier receives and sums only those signals for the landing associated with the first junction points to which it is connected by its associated transistor switches and those landings between that landing and the landing associated with the first junction points to which the amplifier next behind in the way of travel of the cars is connected.

The negative polarity signals applied to the inputs of the operational amplifiers along line B4− are employed to offset the positive polarity signals applied to the transistors of the switches by the floor memory unit of FIG. 1. In the well known manner operational amplifiers OTBa, OTBb, OTBc and OTBs in summing their input signals also invert them. As has been explained, all the input signals to these amplifiers are of positive polarity so that their outputs are negative polarity signals.

Figure 4:
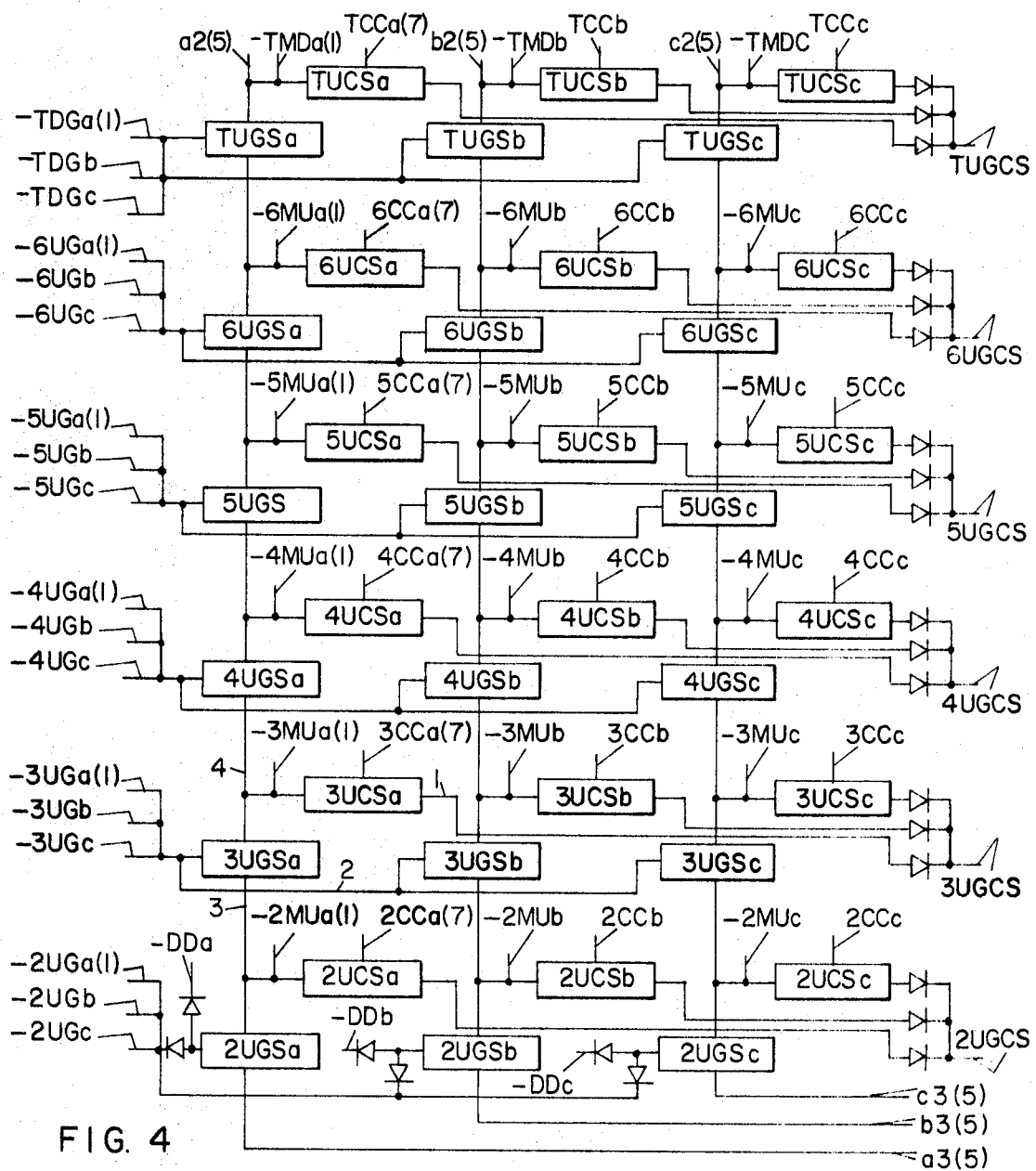
FIGS. 4A and 5A show the internal component arrangements of a represenative one of each of the different block diagrams of FIGS. 4 and 5, respectively.
Figure 4A:
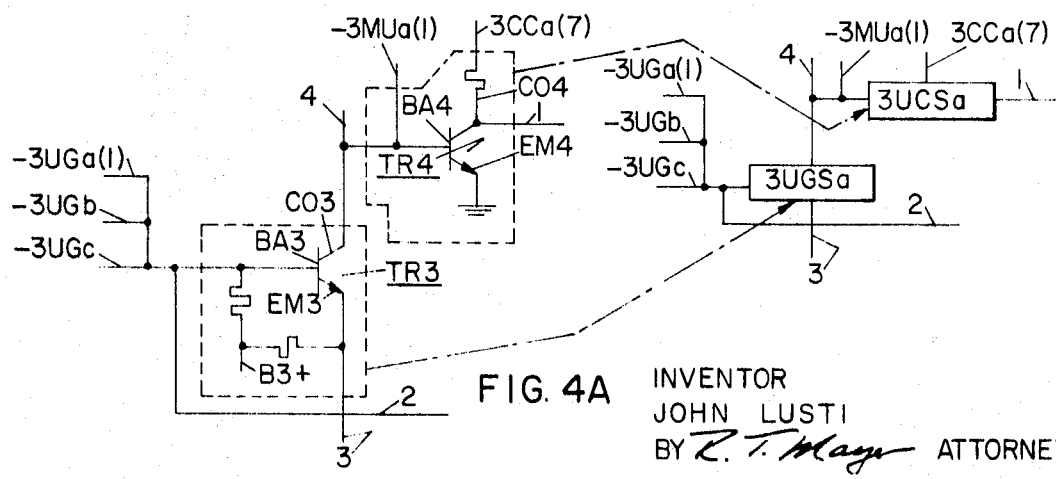
Figure 5:
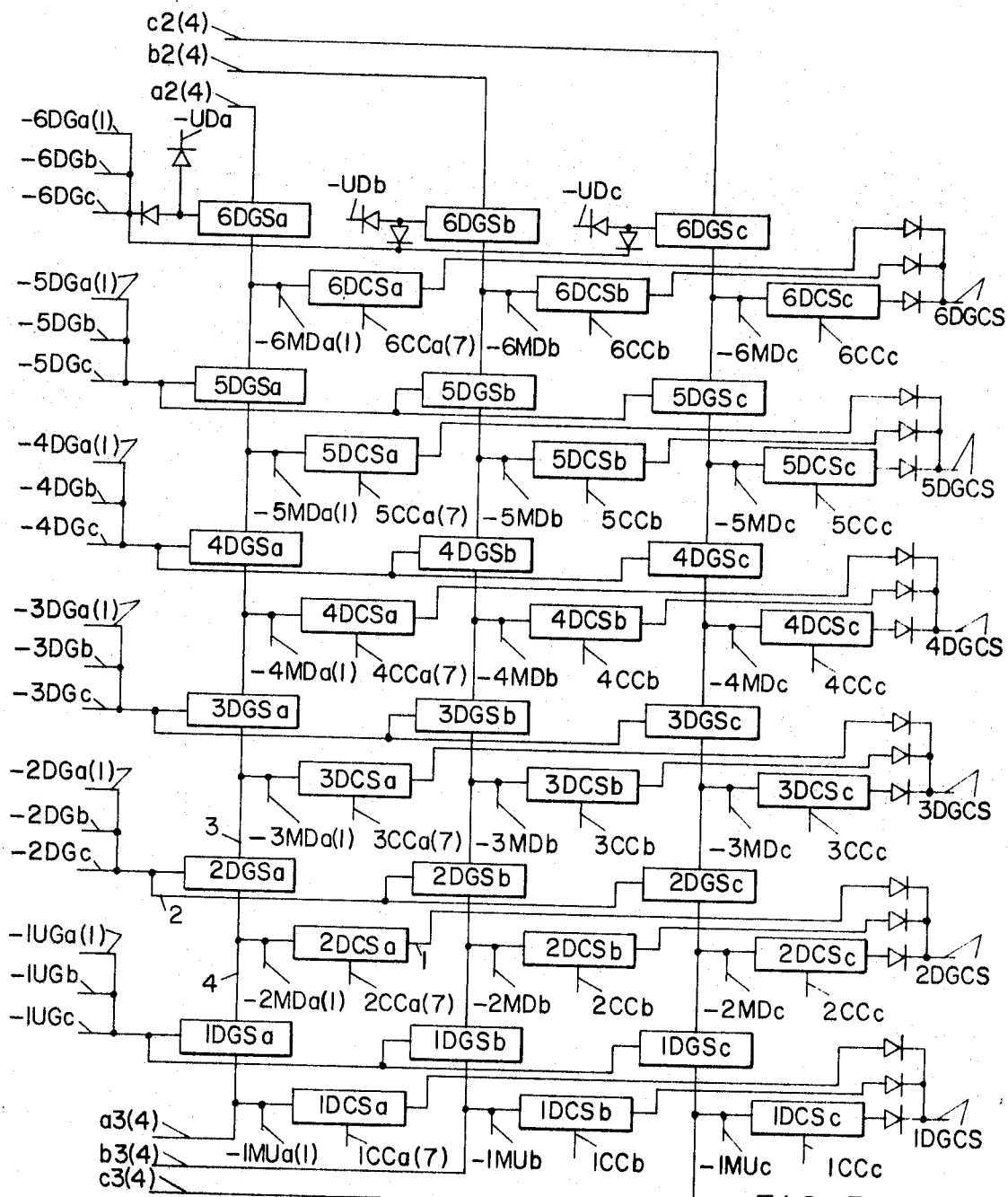
Figure 5A:
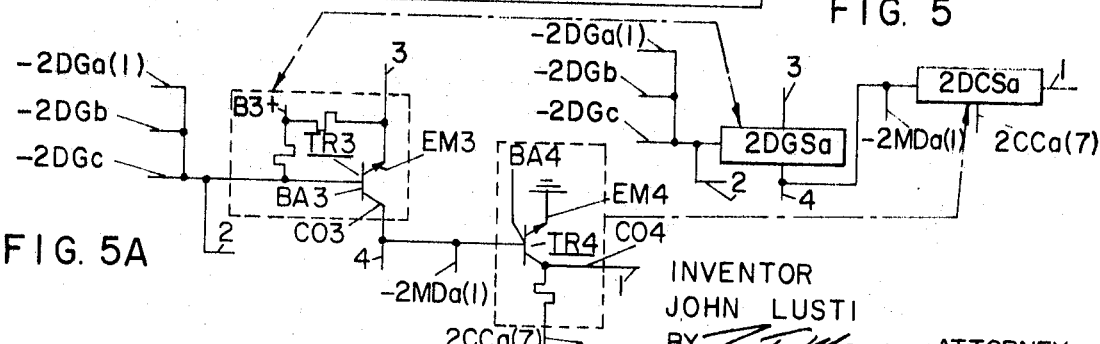

Referring now to the three ring arrangements of switching circuits in FIGS. 4 and 5, one of these ring arrangements is also provided for each of the cars. These circuits constitute car call separation means which in conjunction with the switching circuits of FIGS. 2 and 3 form the distribution circuit means previously mentioned while discussing the equipment of FIGS. 2 and 3. Each of these ring circuits of FIGS. 4 and 5 includes a floor-direction-group switch 1DGSa, etc., and a floor-direction-individual switch 1DCSa, etc., for each of the directions in which its respective car can travel from each of the floors. As is representatively shown in FIGS. 4A and 5A for switches 3UGSa, 3UCSa, 2DGSa and 2DCSa, each floor-direction-group switch 1DGSa, etc., contains a transistor TR3 and each floor-direction-individual switch 1DCSa, etc., contains a transistor TR4. As can be observed from FIG. 4A base BA3 of each floor-direction-group switch, in this case switch 3UGSa, is connected to the group output lines −3UGa(1), −3UGb and −3UGc from the inverter, associated with that floor and direction, of the floor memory control unit of each of the cars in the group. A positive polarity bias is applied through a resistor to each base BA3 by a signal delivered along line B3+. Emitter EM3 of each group switch for each car is also connected through a resistor to line B3+ as well as being connected to collector CO3 of the group switch for that car associated with the preceding floor in the direction of travel. For example, in the case of group switch 3UGSa its emitter EM3 is connected to collector CO3 of group switch 2UGSa. Collector CO3 of each group switch for each car is also connected to base BA4 of its corresponding floor-direction-individual switch. Thus collector CO3 of group switch 3UGSa is connected to base BA4 of floor-direction-individual switch 3UCSa.

As is further observable from FIG. 4A base BA4 of each floor-direction-individual switch 1UCSa, etc., for each car, is additionally connected to the individual output line of the inverter, associated with that floor and direction, of the floor memory control unit for the associated car. For the illustrated switch 3UCSa, base BA4 is connected to individual line −3MUa(1) of inverter −3MEUa (FIG. 1). Emitter EM4 of each floor-direction-individual switch is grounded. Collector CO4, as is shown for switch 3UCSa, is connected through a resistor to the output, in this case 3CCa(7), from its associated car call registering device timer, 3CCT*a* (FIG. 7), for its respective car and floor. It is also connected through a diode to its associated terminal 3UGCS which, as should be understood from the description of FIGS. 2 and 3, applies and input signal through a resistor circuit to diode chain 1URE1, 1URE2, etc., of FIGS. 2 and 3 at first junction point UJ32 between diodes 3URE1 and 3URE2.

During operation, each car call for a landing, say the third landing, which is registered in one of the cars, for instance car *a* applies a positive polarity signal from its car call registering device timer, 3CCT*a* (FIG. 7), through its respective line, 3CC*a*(7), to collector CO4 of its associated individual switch, 3UCS*a*. When transistor TR4 of switch 3UCS*a* is conducting, this signal is dissipated substantially entirely in the resistor in the circuit of collector CO4. Consequently, no signal occurs at the respective terminal 3UGCS. However, the location of car *a* as it approaches the third landing in the up direction causes the car's memory control unit third floor up inverter —3MEU*a* (FIG. 1) to produce a negative polarity signal on line —3MU*a*(1). This is applied to base BA4 of switch 3UCS*a* which places its transistor TR4 in its non-conducting state. In this way the positive polarity signal along line 3CC*a*(7) from the operated car call registering device timer 3CCT*a* is applied to the corresponding terminal 3UGCS to signify the existence of a car call which will be encountered by car *a*. At the same time the individual negative polarity signal produced on line —3MU*a*(1) by the actuated memory control unit third floor up inverter —3MEU*a* is applied to emitter EM3 of switch 4UGS*a* corresponding to the fourth landing, the next floor car *a* will encounter on its trip through the building. As long as no other car is approaching the fourth floor in the up direction, switch 4UGS*a* is in the conducting state owing to the positive polarity bias applied to its base BA3 along line B3+. As a result the negative polarity signal applied along line —3MU*a* to emitter EM3 of switch 4UGS*a* drives its collector CO3 negative. Being connected directly to base BA4 of switch 4UCS*a* the negative potential of collector CO3 of switch 4UGS*a* causes switch 4UCS*a* to assume the non-conducting state. Thus if the car call registering device in car *a* for the fourth floor, i.e. the landing it will next encounter, is registered it also applies a positive polarity signal along line 4CC*a*(7) to its respective terminal 4UGCS.

In a similar manner the negative polarity signal of collector CO3 of group switch 4UGS*a* makes emitter EM3 of group switch 5UGS*a* negative. If it is conducting, its collector CO3 also becomes negative to cause individual switch 5UCS*a* to become non-conducting so as to permit a car call for the fifth landing to apply a positive polarity signal along line 5CC*a*(7) to terminal 5UGCS. This operation continues from collector CO3 of one group switch to emitter EM3 of the next in the ring and from emitter EM3 of each group switch to its own collector CO3 around the ring circuit in the direction the car travels on its trips up and down the building until a group switch is reached that is in the non-conducting state.

A group switch operates to its non-conducting state when its associated car, or any other car in the group approaches the landing for which the switch is provided in the direction with which the switch is associated. Thus group switch 3UGS*a* assumes the non-conducting state when a car approaches the third floor in the up direction and causes its floor memory unit inverter for the third floor up direction —3MEU*a* (FIG. 1), —3MEU*b* or —3MEU*c* to produce a negative polarity signal on line —3UG*a*(1), —3UG*b* or —3UG*c* to overcome the bias applied along line B3+ to base BA3 of switch 3UGS*a*. In addition, a negative polarity signal is applied along lines —UD*a*, —UD*b* and —UD*c* to bases BA3 of group switches 6DGS*a*, 6DGS*b* and 6DGS*c* to cause each of these switches to assume the non-conducting state when its associated car is conditioned for continued travel in the up direction. Similarly, a negative polarity signal is applied along lines —DD*a*, —DD*b* and —DD*c* to bases BA3 of group switches 2UGS*a*, 2UGS*b* and 2UGS*c* to cause each of these switches to assume the non-conducting state when its associated car is conditioned for continued travel in the down direction. Mention has already been made, in connection with the signals along lines +UD*a* and +DD*a* of FIG. 1, of well known devices capable of producing positive polarity signals whenever their associated car is conditioned for continued travel in the up or down direction. Counterparts of such devices may be used to produce the negative polarity signals along lines —UD*a*, etc., and —DD*a*, etc.

By operating their group switches to the non-conducting state in response to the locations and the directions of travel of the cars, the ring arrangements of FIGS. 4 and 5 are opened in such a way that those car calls in each car which are registered for landings between it and the car immediately ahead of it in the traverse of the building are separated from all other calls which might be registered in the car and only the former calls are applied to the ring arrangements of FIGS. 2 and 3 for consideration in computing the amount of work each car has to do. By operating the second floor group switch in the up direction portion and the sixth floor group switch in the down direction portion of each ring arrangement of FIGS. 4 and 5 in response to the direction of travel its respective car is conditioned for, the ring arrangements of FIGS. 2 and 3 are prevented from taking the same car calls into consideration twice, once in their up direction portions and once in their down direction portions, in those situations where a car is approaching either of the terminal landings and the car immediately ahead of it has already left the same terminal.

The operation of the second floor up group switches and the sixth floor down group switches in response to the directions for which the cars are conditioned for travel also provides increased accuracy in computing the work loads between the cars. In making each of these computations in terms of the time, calculated to elapse in performing services, that separates each car from the car immediately ahead of it, only those calls which cause a car to stop while traveling to the location of the car ahead of it are of interest. It sometimes happens, however, that a passenger enters a car and either erroneously or michievously registers a call for a floor the car has already passed in the direction in which it is traveling. This call may be treated as a mistake and as such be cancelled when the car reverses its direction of travel. Alternatively, it may be left registered so that the car can answer it after it reverses. In one case the car is never required to perform any services with respect to the call and in the other it is required to perform such service only after it reverses. As a result, before such reversal, this call is not taken into consideration in calculating the performance time separating its car from the car ahead of it even though the car ahead might pass the floor for which the call is registered and make it a call for a floor between the locations of the two cars. The foregoing provision for opening the second and sixth floor group switches insures that such a call cannot be included in the calculation of the performance times separating the cars before reversal.

Figure 6:
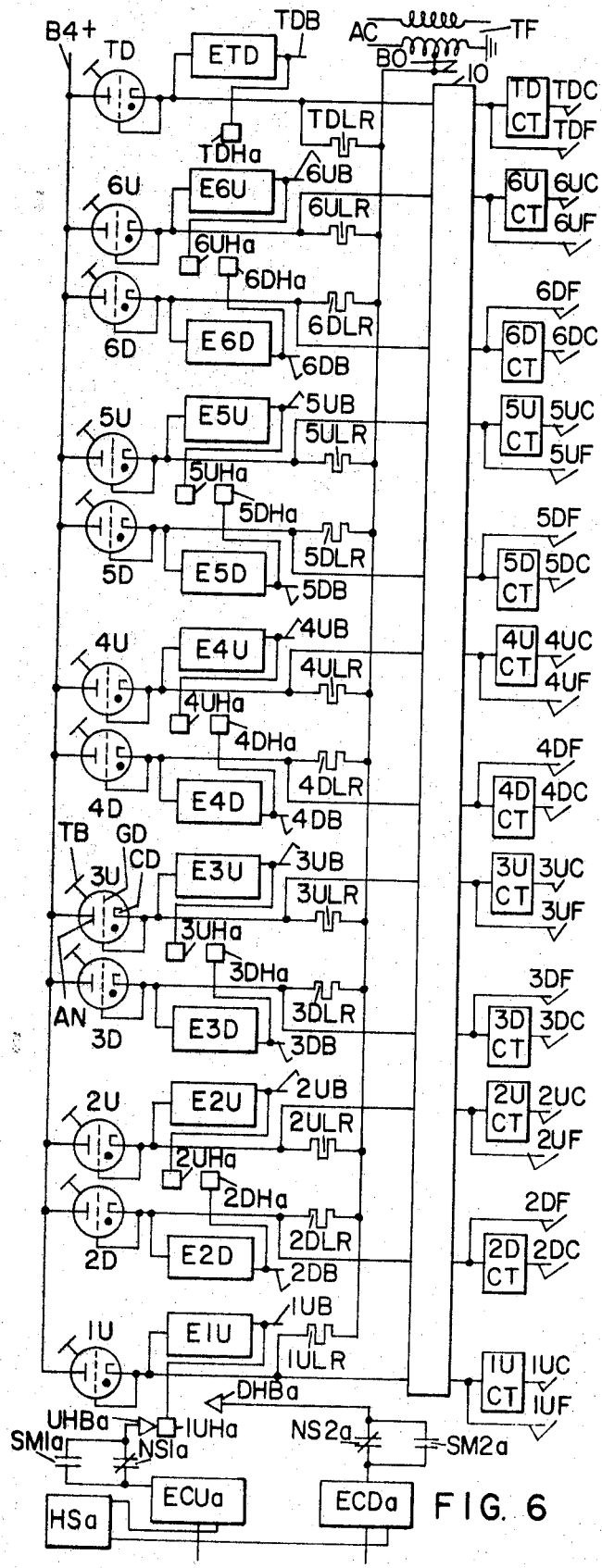
FIG. 6 shows up and down hall call registering devices for the aforementioned seven floor elevator installation together with circuit connections for transmitting signals signifying the actuated condition of each device as well as timing circuits operable upon the deactuation of each device for dissipating as a function of time the signals they transmit when actuated.

Turning now to the up and down hall call registering circuits of FIG. 6, in this well known arrangement a cold cathode gas discharge tube is provided for each hall call registering device 1U, 2D, etc. As is illustrated for the third floor up hall call device 3U, each of these devices has its anode AN connected to receive a positive potential signal applied along line B4+. The cathode CD and grid GD of each device are connected together and both are connected through a load resistor 1ULR, etc., to one side BO of the secondary of transformer TF. The other side of the secondary is grounded. A touch button TB, accessible to the touch of the finger of an intending passenger, is connected to the glass envelope of each tube at a point near its anode AN. Connected to the junction point of each cathode CD and its load resister is a separate encoding device E1U, E2D, etc. The internal component circuitry of these devices is explained later in connection with FIG. 19. The output of each encoding device is connected to a separate electrical contact 1UH, 2UH, etc., for each car, only that set 1UHa, 2UHa, etc., of each of such contacts for car *a* being shown for convenience sake. In addition, the output signal from each encoding device is applied along a separate line 1UB, 2DB, etc., to any well known circuit (not shown) for determining the registration of a hall call above or below the location of a car. This circuit which may be common to all cars, as is known, terminates in inputs through selector brushes HHB and LHB (those for car *a* shown in FIG. 19) individual to each car to actuate hall call above and below switches HJX and LJX (those for car *a* shown in FIG. 19).

Brushes UHB and DHB, one pair for each car, only that pair UHBa and DHBa for car *a* being shown, engage their associated hall call landing contacts 1UH, etc., and TDH, etc., whenever their respective car is approaching or located adjacent the landing for which the associated contacts are provided. Each pair of these brushes is connected to a separate pair of contacts NS1 and NS2 of non-stop relay NS which, like brushes UHB and DHB, is individually provided for each car. Connected in parallel with contacts NS1 and NS2 respectively, are contacts SM1 and SM2 of car stop relay SM which is also provided individually for each car. This relay is not otherwise shown but in the well known manner operates to engage its contacts SM1 and SM2 when its car initiates a stop and releases to separate these contacts when the car is ready to start again. Contacts NS1, NS2, SM1 and SM2 are connected to their respective car's hall call stop and reset circuitry HS through decoding devices ECU and ECD, only the decoding devices and circuitry for car *a* being shown. The hall call stop and reset circuitry is well known and for that reason is illustrated in block diagram form and will not be described in detail. The internal component circuitry of the decoding devices is explained later in connection with FIG. 19.

The junction points between the cathodes CD of the tubes and their respective load resistors 1ULR, etc., are also connected to hall call interface circuits illustrated by block diagram 10. These circuits are designed and constructed by standard electrical engineering techniques to make the output voltages developed across load resistors 1ULR, etc., compatible with the equipment to which these signals are applied, i.e. the transistor timing circuits 1UCT, etc., of FIG. 6 and the circuitry of FIGS. 8, 15 and 19. The individual configuration and components of such interface circuits depend upon a plurality of variables including the characteristics of the tubes used in devices 1U, etc., and the transistors used in the timing circuits 1UCT, etc., of FIG. 6 and in the input of FIGS. 8, 15 and 19. For this reason, it would serve no practical purpose to show a particular arrangement for these interface circuits and so they have been illustrated in block diagram form only.

Figure 6A:
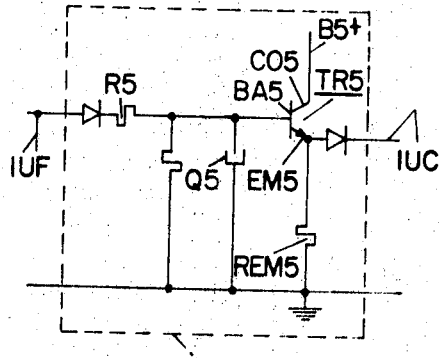
FIG. 6A shows the internal component arrangement of a representative one of the timing circuits of FIG. 6.

Each of the timing circuits 1UCT, etc., includes a transistor TR5 as shown in FIG. 6A. Base BA5 of each of these transistors is connected through a diode and resistor to its corresponding output of the interface circuits of block diagram 10. Emitters EM5 are all connected to ground through individual resistors REM5 and collectors CO5 are all connected to a positive potential applied along line B5+. The output of each timing circuit is taken across its emitter resistor and is applied along its associated line 1UC, etc., to diode chain 1URE1, 1URE2, etc., of FIGS. 2 and 3. Connected from base BA5 of each transistor are individual parallel resistor condenser circuits.

Upon the touch of an intending passenger to the touch button TB of one of the hall call registering devices, a circuit is completed from a sufficient A.C. potential which is supplied by the secondary of transformer TF through the capacitance of the passenger to ground to break the tube down and actuate the device. After the removal of the passenger's touch conduction in the tube is continued by the D.C. potential existing between line B4+, connected to the anode AN, and line BO. As a result of conduction, a positive potential signal is generated across the corresponding load resistor 1ULR, etc. This potential is applied to the associated contacts 1UHa, 1UHb, 1UHc, etc., and also to interface 10 to be applied to the circuit of base BA5 of its corresponding transistor timing circuit 1UCT, etc. Because of the very low time constant of the circuit of resistor R5 and condenser Q5, the condenser charges very rapidly to the potential applied from interface circuits 10. This potential appears at base BA5 of transistor TR5 and saturates the transistor causing it to conduct from line B5+ to ground and apply a positive polarity output signal along line 1UC, etc., to diode chain 1URE1, etc., of FIGS. 2 and 3. The magnitude of this signal is a function of the time allotted a car to answer the call to which the signal corresponds. By the time allotted to answer a call is meant preferebaly the average normal interval one of the cars spends in making a stop at the floor for which the call was registered between the time it cancels the call and the time it starts running again. This interval might be determined in a number of ways. One of these takes the interval as the difference between the time it takes a car to run at rated speed past a floor between two locations and the time it takes to travel the same distance while making a stop in response to a hall call for the floor. Other ways will suggest themselves to those skilled in the art. At some floors of course, the allotted answering time might be longer than at others. This has been foreseen and the answering time signal for such floors can be adjusted to reflect this by changing the magnitude of the individual resistor REM5 and/ or condenser Q5 of the corresponding timing circuit 1UCT, etc., accordingly. In addition, it might be desirable to allot different call answering times to the same call under different conditions of traffic or during different times of a day. This can readily be done through the use of switching circuits responsive to such different conditions or different times which operate to replace the timing circuit corresponding to the call with others having different valued components.

As the cars travel past the landings in the building, one of them will have its brush UHBa, etc., or DHBa, etc., encounter the potential on the energized contact 1UHa, etc. If either its contacts NS1A and NS2A, etc., or its contacts SM1a and SM2a, etc., are closed and the car is traveling in the direction corresponding to that for which the call signifies the passenger wishes to travel, the potential on the energized landing contact is transferred to brush UHBa, etc., or DHBa, etc. If as will be further explained in connection with FIG. 19 this potential is proper for decoding into an energizing potential, it causes the energization of the hall call stop and reset circuitry HSa, etc., to initiate a stop for the car at the respective landing in the well known manner. The initiation of the stop causes circuitry HSa, etc., to apply a positive potential of sufficient magnitude to a selector landing contact (not shown) to raise the potential of the cathode CD of the conducting tube to a value which decreases the tube drop below its conducting level and the tube extinguishes to deactuate the call registering device and to cancel the call. This removes the input potential to the corresponding transistor timing circuit 1UCT, etc., but until the charge on condenser Q5 dissipates it maintains transistor TR5 conducting. The discharge path for the condenser is from base BA5 through emitter EM5 and its resistor REM5. The time constant of this circuit is selected to have the charge dissipate in the time allotted to answer a hall call. Only after that time is the signal along line 1UC, etc., entirely removed, although during that time it decreases as a function of the time elapsed from the cancellation of the hall call as the charge on condenser Q5 dissipates.

Figure 7:
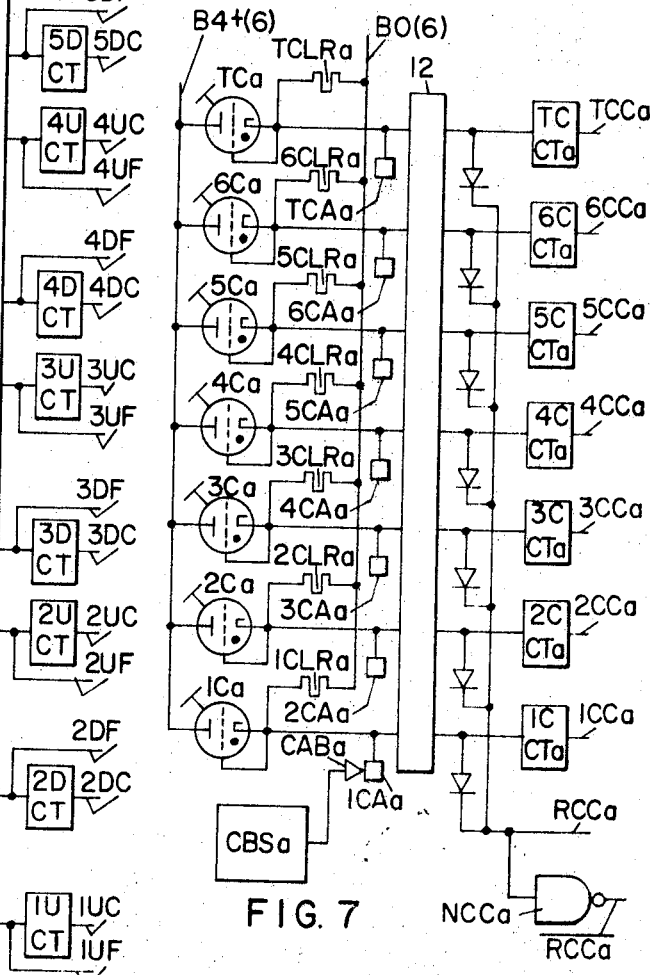
FIG. 7 shows the car call registering devices for a representative car of the forementioned three car system together with circuit connections for transmitting signals signifying the actuated condition of each device and timing circuits operable upon the deactuation of each device for dissipating as a function of time the signals they transmit when actuated.

The car call registering circuits of FIG. 7, shown for a representative one of the cars, car $a$, are similar to the up and down hall call registering circuits of FIG. 6 except they do not include encoding and decoding devices. The tubes used for the car call registering devices are the same type as those used for the hall call registering devices. The load resistors 1CLR$a$, etc., are equivalent to the load resistors 1ULR, etc., as are the car call landing contacts 1CA$a$, etc., their brush CAB$a$ and the car call stop and reset circuitry CBS$a$ equivalent respectively to the hall call landing contacts 1UH$a$, etc., the brushes UHB$a$ and DHB$a$, etc., and the hall call stop and reset circuitry HS$a$, etc. Car call interface circuits 12 are provided for the car call registering circuits for the same reason that hall call interface circuits 10 are provided for the hall call registering circuits and are shown in block diagram form for the same reason, also. The outputs of these interface circuits apply positive potentials to timing circuits 1CCT$a$, etc. These circuits are similar to timing circuits 1UCT, etc., except that their output signals applied along lines 1CC$a$, etc., to the equipment of FIGS. 4 and 5 are characteristics of the time allotted to answer a car call and are arranged to dissipate in such time.

The outputs of interface circuits 12 are also applied through individual rectifiers to a common line RCC$a$ along which a positive potential signal is applied whenever a car call is registered in car $a$. Connected to line RCC$a$ is a NAND gate NCC$a$ illustrated in typical fashion as are all other NAND gates disclosed as an AND gate with its output connected through an inverter shown as a small circle. This produces, along line $\overline{\text{RCC}}a$, a signal which is the inverse of the signal along line RCC$a$. Thus if the positive potential signal along line RCC$a$ signifying that a call is registered in car $a$ is considered to be a binary 1, the signal which is produced along line $\overline{\text{RCC}}a$ while this binary 1 signal continues is a binary 0 signal, and vice versa.

In FIG. 8 a time dependent circuit including timer 1UFT, etc., and switch 1UFS, etc., is provided for each hall call registering device of FIG. 6. Each timer 1UFT, etc., is connected to a different one of the outputs of the hall call interface circuits 10 of FIG. 6. A different switch 1UFS, etc., is connected to the output of each timer. Each switch 1UFS, etc., has an individual output which is connected by lines 1UFM, etc., to the diode chain 1URE2, etc., of FIGS. 2 and 3.

As illustrated for timer 1UFT in FIG. 8A each of the timers has one terminal of its condenser Q6 connected to its corresponding input line 1UF(6), etc., through individual resistor RF1. The same terminal of condenser Q6 is also connected through resistor RF2 to emitter EM6 of transistor TR6. The other terminal of condenser Q6 is connected to the grounded collector CO6 of its respective transistor TR6. Base BA6 of transistor TR6 is connected through condenser Q7 and diode FRE1 to its corresponding input line 1UF(6), etc.

Each of switches 1UFS, etc., includes three transistors TR7, TR8 and TR9 (FIG. 8A) as well as breakover diode BRE1. Emitters EM7 and EM8 of transistors TR7 and TR8 of each switch are connected through a common resistor REMC to ground. Base BA7 of each switch is connected to the output of its switch's corresponding timer 1UFT, etc. Each collector CO7 is connected through one individual resistor to a positive potential applied from a source along line B6+ and through another individual resistor RCO7 to base BA8 of its associated transistor TR8 and thence to ground through a third individual resistor RBA8. Collector CO8 of each switch is connected through a separate resistor to the positive potential applied along line B6+ and through its associated breakover diode BRE1 to base BA9 of its associated transistor TR9. Collector CO9 of each switch is connected directly to the positive potential applied along line B6+. Each emitter EM9 is connected through an individual resistor RIFM, to ground. Individual output lines 1UFM, etc., extend from the junctions of emitters EM9 and resistors RIFM.

As previously described in connection with FIG. 6, upon the registration of a hall call, a positive polarity signal appears at the corresponding output of hall call interface circuits 10 (FIG. 6). This signal is applied along its respective line 1UF(6), etc., to charge condenser Q6 of its associated timer 1UFT, etc., through resistor RF1. If this call remains registered for a predetermined period of time the charge stored in condenser Q6 becomes sufficient to saturate base BA7 of its associated transistor TR7. As a result transistor TR7 conducts current from the positive potential applied along line BA6+, through a circuit including its collector CO7 and emitter EM7 to ground through common emitter resistor REMC. This circuit is in parallel with that from collector CO7 through resistor RCO7 and RBA8 to ground and causes a decrease in the potential at collector CO7. This, in turn, decreases the potential of its interconnected base BA8 below its saturation point and causes transistor TR8 to become non-conducting. This raises the potential of collector CO8 sufficiently to exceed the rating of breakover diode BRE1 and to cause it to conduct. As a result, base BA9 of associated transistor TR9 is saturated and the transistor conducts from the positive potential applied along line B6+ through its collector CO9 and emitter EM9 as well as its associated resistor RIFM to ground. The positive polarity signal across individual resistor RIFM is applied along the respective individual output line 1UFM, etc., to the appropriate junction point in the diode chain 1URE1, 1URE2, etc., of FIGS. 2 and 3.

As previously mentioned, in connection with FIG. 6, when a hall call is reset, the positive polarity signal to the circuitry of FIG. 8 along line 1UF(6), etc., is removed. This causes a negative pulse to appear by way of diode FRE1 and condenser Q7 at base BA6 of transistor TR6 of the corresponding timer 1UFT, etc., and it saturates that base. Thereupon, transistor TR6 conducts so that a low resistance path is established through resistor RF2, emitter EM6 and collector CO6 to discharge condenser Q6 very rapidly so as to be ready to measure the time the associated call awaits response the next time it is registered. In discharging, condenser Q6 removes its stored potential from base BA7 of its associated transistor TR7. If this potential had been sufficient to have transistor TR7 assume the conducting state, its removal causes the transistor to become non-conducting. As a result, transistors TR8 and TR9 assume their initial states and the potential on line 1UFM, etc., is removed. Thus it can be seen that upon registration of a call its associated timer 1UFT, etc., measures the duration from its registration to its reset and that its associated switch 1UFS, etc., applies a positive polarity signal on line 1UFM, etc., whenever the call is in registration beyond a predetermined time.

Figure 9:
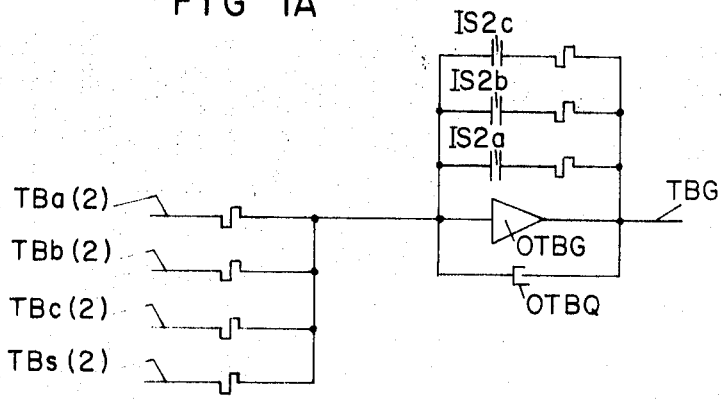
FIG. 9 shows an operational amplifier connected in a circuit which determines the average of the work loads of all cars of the three car group.

The equipment of FIG. 9 includes operational amplifier OTBG arranged with four input circuits. These circuits are connected through individual resistors to lines TB$a$(2), TB$b$(2), TC$c$(2) and TB$s$(2) and receive thereby currents produced by the negative polarity signals from the operational amplifiers of the ring arrangements of FIGS. 2 and 3.

A resistive feedback path is provided around amplifier OTBG for each of the cars through an individual resistor and contacts IS2$a$, IS2$b$ and IS2$c$ of each car's "in service" switch IS$a$, etc. By this arrangement the input of amplifier OTBG is the sum of the combined signals applied to amplifiers OTB$a$, OTB$b$, OTB$c$ and OTB$s$ and is, therefore, a function of the total work load in the system. Its output is proportional to this work load divided by the number of cars in service and is, therefore, a function of the average work load for each car. Condenser OTBQ is provided in another feedback path around the amplifier to delay slightly the response of the amplifier to its input signals. As mentioned with respect to amplifiers OTB$a$, etc., amplifier OTBG also produces an output signal along line TBG which is inverted from the polarity of its input. As a result its output is invariably a positive polarity signal.

FIG. 10 includes a separate comparison circuit including light traffic signifying means for each of the cars. All three being identical only one will be described. Operational amplifier BY$a$ is provided with three input circuits. One is connected through a resistor to line TB$a$(2) to receive currents produced by the negative polarity output signals from amplifier OTB$a$ of FIGS. 2 and 3. The second is connected through a resistor to line TBG(9) to receive currents produced by the positive polarity output signals from amplifier OTBG of FIG. 9. The last of the input circuits to amplifier BY$a$ is connected through a resistor to line B5— to which may be applied a negative potential signal of a predetermined magnitude.

The output of amplifier BY$a$ is applied through a diode and a mechanically operated load responsive switch LNS$a$ to one side of the coil of non-stop relay NS$a$. The other side of this coil is grounded. Load responsive switch LNS$a$ is a well known device which is maintained closed as long as there is at least one person in elevator car $a$.

With the comparison circuit arrangement as FIG. 10 non-stop relay NS$a$ is operated by the light traffic signifying means whenever the magnitude of the positive polarity signal along line TBG exceeds the magnitude of the negative polarity signal along line TB$a$ plus that which might be applied along line B5—, and enables amplifier BY$a$ to produce a negative polarity output which will pass through its associated diode and energize the coil of non-stop relay NS$a$. Even though this relationship exists between the compared signals, however, non-stop relay NS$a$ can only be operated by the light traffic signifying means if there is at least one person in car $a$ so as to close load responsive switch LNS$a$.

Another input to the coil of non-stop relay NS$a$ is provided along line PHS$a$(18). As will be explained a potential applied along this line also operates relay NS$a$.

Referring now to the four operational amplifiers and their individual ring arrangements of switching circuits in FIGS. 13 and 14, one of these amplifiers and ring arrangements is provided for each of the cars. The fourth amplifier and ring arrangement is provided for the hall call selection means, described later. Each amplifier is employed as a second summation means and the ring circuits in combination and in conjunction with other equipment in this system form a second distribution circuit means including a second switching means for distributing signals to the second summation means. Except for the reversal of the diodes in the diode chain in these circuits from the manner of their connection in FIGS. 2 and 3; the removal of the connections along lines 1UFM(8), etc.; the inversion of the input signal along line $\overline{-\text{PM}a}$ from that along line —PM$a$ of FIGS. 2 and 3; the advancement of the connections of the travel time terminals 1DDT, etc., to the pairs of second junction points UJ13, UJ14, etc., one floor in the direction of travel from their connections to the pairs of first junction points UJ11, UJ12, etc., in FIGS. 2 and 3, and the maintenance of transistor TR2' of each switches 1MUS$s'$, etc., of the hall call selection means in the off condition permanently these circuits include the same equipment and operate in a fashion similar to the circuits of FIGS. 2 and 3.

The heavy traffic signifying means of FIG. 15 includes operational amplifier OA1 which has its input circuit connected to the first summation means of each car and the averaging means through lines TB$a$(2), TB$b$(2), TB$c$(2) and TBG(9) and also to a positive potential signal applied along line B7+. A binary 1 output signal is produced on line TTBGK whenever the magnitude of the output of one of the first summation means exceeds more than twice the magnitude of the output of the averaging means. Zener diode Z1 prevents a signal of too great a magnitude from being applied to NAND gate N1. Condenser QJR provides a short time delay for reasons which will be explained later.

That part of the equipment of the hall call selection means shown in FIG. 15 includes operational amplifiers OA2, OA3 and OA4. The input circuit of operational amplifier OA2 is connected to the first and second selection summation amplifiers OTB$s$ and OTA$s$ (FIGS. 2 and 13) and to averaging means OTBG (FIG. 9) through lines TB$s$(2), TA$s$(13) and TBG(9) as well as to a positive potential signal applied along line B7+. Amplifier OA2 causes the production of a binary 1 signal along line TTBGS whenever the sum of the magnitudes of the output signals of the first and second selection summation amplifiers exceeds more than twice that of the averaging means.

The input circuit of amplifier OA3 is connected to the first selection summation amplifier OTB$s$ and to the averaging means OTBG through lines TB$s$(2) and TBG(9) as well as to a positive potential signal applied along line B8+. Amplifier OA3 produces a binary 1 signal along line STB whenever the magnitude of the output signal of the first selection summation amplifier OTB$s$ exceeds that of the averaging means.

The input circuit of amplifier OA4 is connected to the second selection summation amplifier OTA$s$ and to the averaging means OTBG through lines TA$s$(13) and TBG(9) as well as to the positive potential signal applied along line B8+. Amplifier OA4 causes the production of a binary 1 signal along line STA whenever the magnitude of the output signal of the second selection summation amplifier exceeds that of the averaging means.

That portion of the hall call selection means shown in FIG. 15 includes the NAND gate logic circuitry including NAND gates 1UN, etc., and N4 to N9. One of the inputs of each of NAND gates 1UN, etc., is connected to a different one of each of the hall call registration circuits through lines 1UF(6), etc. (only four such gates being shown for simplicity, although it is understood that one such gate is provided for each hall call registering device). The other input of each of these gates is connected to a different output of the scanning means of FIG. 16. The output of each NAND gate 1UN, etc., is connected through an associated diode to the expander node of gate N4. The inputs of gate N6 are connected to that part of the direct service means provided for each car as shown in FIG. 18 for car "$a$" through lines $\overline{Ja}$, $\overline{Jb}$ and $\overline{Jc}$. The production of a binary 0 signal on any of these lines causes the actuation of direct service group relay GJ in response to the potential difference between the potential on line V4 and the potential of the output signal of relay driver RDGJ. Actuation of relay GJ causes the separtion of contacts GJ1 and GJ2 (FIGS. 2 and 13) and the production of a binary 1 signal along line GJ (FIG. 16) as well as a binary 0 signal along line $\overline{JG}$ in any well known manner.

The scanning means of the hall call selection means shown in FIGS. 16 and 17 includes scan begin relay SB. This is operated to its actuated condition by the potential difference between the potential of the output of its relay driver RDSB and the potential applied along line V1 when one of the individual car availability switches as shown in FIG. 18 for car $a$ produces a binary 0 signal on line $\overline{QAVa}$(18), $\overline{QAVb}$ or $\overline{QAVc}$. The actuation of the scan begin relay produces a binary 1 signal along line SB and a binary 0 signal along line $\overline{SB}$, in any well known manner. It also closes contacts SB1 and SB2 (FIGS. 2 and 13) in the circuits of the first and second selection summation means OTB$s$ and OTA$s$. The scanning means also includes serially connected flip-flops, or bistable multivibrators 1UFF, etc., one for each floor for each direction of travel to that floor. Any well known multivibrator of suitable characteristics may be employed. Only four such units are shown for simplicity, it being understood that the others are connected to each other sequentially in the direction of travel of the cars in the same fashion as those shown.

The production of a binary 0 along line $\overline{SB}$ causes transistor TR10 to turn off. This permits condenser QCP to charge from the potential applied along line B9+. Upon this charge reaching a sufficient potential unijunction transistor WN1 turns on causing condenser QCP to discharge through resistor RWN1. This discharge continues until the potential of condenser QCP decreases sufficiently to permit unijunction transistor WN1 to turn off whereupon the condenser charges once again to repeat the operation. This produces a sharp pulse across resistor RWN1 each time transistor WN1 turns on and off. Each pulse is applied to flip-flop, or bistable multivibrator, FFCP causing it to produce a binary 1 signal at its output for every other pulse. Between each binary 1 signal a binary 0 signal is produced and each of these causes NAND gate N10 to produce a binary 1 signal along line CP. Each of these signals causes the serially connected flip-flops 1UFF, etc., to advance their output from the one that is then producing a binary 1 signal along line 1M$s$, 2MU$s$, etc., to the next in the series.

Provision is made to prevent the scanner from misoperating. If when the signal along line $\overline{SB}$ goes to a binary 0 condition more than one flip-flop 1UFF, etc., is producing a binary 1 signal along line 1M$s$, etc., operational amplifier OA5 produces a binary 0 signal. This causes NAND gate NCD to produce a binary 0 signal along line CD which is applied to each of the flip-flops 1UFF, etc., and causes each of them to produce a binary 0 signal along its respective line 1M$s$, etc., and a binary 1 signal along its respective line $\overline{1Ms}$, etc. Each of these latter signals is applied to the expander node of NAND gate N13 causing it to produce a binary 0 signal. This in conjunction with the signal along line SB produces a binary 0 signal along line SD. This latter signal is applied to flip-flop 1UFF causing it to operate to produce a binary 1 signal along line 1M$s$ and a binary 0 signal along line $\overline{1Ms}$. The scanner is thereby restored to its operating condition.

When a binary 1 signal is applied along line GJ transistor TRSQ produces a D.C. potential along line SQ which pulsates between a binary 0 signal and a binary 1 signal each time flip-flop FFCP operates.

Flip-flops FFZ1 and FFZ2 operate as a two-stage binary counter to signify that the scanner has made a complete scan of each floor in each direction. Each time the scanner passes the position corresponding to the first floor it transfers the signal along line 1M$s$(16) from the binary 0 to the binary 1 and back to the binary 0 condition. This latter transfer causes NAND gate N17 to produce a binary 0 signal causing flip-flop FFZ1 to produce a binary 1 signal along line Z1. As the scanner passes the position corresponding to the top terminal landing the signal along line TM$s$ is also transferred in the foregoing manner. This also causes NAND gate N17 to produce a binary 0 signal but this time flip-flop FFZ1 produces a binary 0 signal along line Z1. This is applied as the input to flip-flop FFZ2 causing it to produce a binary 1 signal along line Z2. The next time the signal along line 1M$s$(16) is transferred from the binary 1 to the binary 0 state, flip-flop FFZ1 again produces a binary 1 signal along line Z1. This in conjuntcion with the binary 1 signal along line Z2 causes NAND gate N18 to produce a binary 0 signal along line $\overline{PZ}$. As a result, flip-flops FFZ1 and FFZ2 are maintained in the condition in which they produce binary 1 signals along lines Z1 and Z2 until a binary 1 signal is again generated along line SB at the start of another scanning operation. At that time both flip-flops FFZ1 and FFZ2 operate to restore the signals along lines Z1 and Z2 to their binary 0 condition.

If the scanner is stopped at some position before it can operate flip-flops FFZ1 and FFZ2 to produce binary 1 signals along lines Z1 and Z2 in the foregoing manner either the operation of the direct service means in producing a binary 1 signal along line GJ in conjunction with the pulsating D.C. poential along line SQ(16) causes this operation or a binary 1 signal along line $\overline{SB}$ sets the flip-flops to produce binary 1 signals along lines Z1 and Z2.

The individual car availability switch for car $a$ of the car availability means is shown in FIG. 18. A similar switch is provided for each of the other cars, only that for car $a$ being shown for convenience. Operational amplifier OA6 produces a binary 0 signal at the input of NAND gate N31$a$ if the sum of the magnitudes of the output signals from the first and second summation means of car $a$ applied along lines TB$a$(2) and TA$a$(13) is less than the magnitude of the output signal of the averaging means applied along line TBG(9). If car $a$ is in service a binary 1 signal is applied along line IS$a$ in any well known manner in response to the operation of "in service" switch IS$a$. This causes the production of a binary 1 signal along line SW$a$. The production of such a signal in conjunction with the production of a binary 1 signal along line TTBGK(15) causes the production of a binary 1 signal along line IN$a$. If a similar signal is applied along lines $\overline{RCCa}$(7) and $\overline{GJ}$ a binary 1 signal is produced along line QAV$a$. This signal in conjunction with binary 1 signals along lines $\overline{Ja}$ and $\overline{PZ}$(17) causes the operation of prevent hall stop relay PHS$a$ in response to the potential difference between the potential of the output of its relay driver RDPHS$a$ and the potential applied along line V2.

That portion of the direct service means for car $a$ shown in FIG. 18 is representative of the individual equipment provided for each of the cars. Direct service relay J$a$ is operated to its actuated condition by the output signal of NAND gate N23$a$ when that signal is in the binary 0 condition. In its actuated condition relay J$a$ produces a binary 1 signal along line J$a$, a binary 0 signal along line $\overline{Ja}$ in any well known manner, and opens contacts J1$a$ and J2$a$ (FIGS. 2 and 13).

That portion of the direct service means shown in FIG. 19 includes an encoding device for encoding hall calls. That device E1U associated with the lower terminal, or first, floor up hall call is shown. A similar such device is provided for each of the hall call registering devices as shown in FIG. 6. Upon the production of the pulsating D.C. potential applied along line SQ(16) the encoding devices associated with registered hall calls cause a similar pulsating signal to be applied to their respective output lines 1UB, etc. This is true for each of the hall calls except that one corresponding to the position at which the scanner is stopped. That encoding device has a binary 0 signal applied along its respective line $\overline{1Ms}$(16), etc., causing it to produce a steady state D.C. potential along its respective line 1UB, etc., notwithstanding the application of the pulsating D.C. potential along line SQ(16).

The internal component circuit wiring of the decoding device ECH$a$ employed in the circuitry of the coil of the hall call above switch HJX$a$ (FIG. 19) associated with car $a$ is representative of those employed in the hall call stop and reset circuitry (only that for car $a$ being shown in FIG. 6) and the circuitry of the coils of the hall call above and below switches (only that for car $a$ being shown in FIG. 19) for each of the cars. These devices are employed to distinguish between pulsating and steady state D.C. signals. A steady state signal applied to the input of any of these devices, such as ECH$a$, is blocked by condenser QH1$a$. As a result transistor TH1$a$ continues to conduct causing transistor TH2$a$ to remain in the off condition. This results in the application of a binary 1 signal to NAND gates NH1$a$ and NH2$a$. As a result a binary 1 signal is produced at the output of NAND gate NH4a. A pulsating D.C. signal applied to the input of any of these decoding devices, such as ECHa, causes transistor TH1a to turn off during each binary 0 portion of the signal. During this period condenser QH2a charges sufficiently to turn transistor TH2a on. While in the conducting condition transistor TH2a causes a binary 0 signal to be applied to NAND gates NH1a and NH2a. While the pulsating D.C. potential applied to the input is in the binary 1 condition transistor TH1a turns on but condenser QH2a maintains a sufficient poetntial to cause transistor TH2a to remain conducting during this period. If the signal along line $\overline{Ja}$ is in the binary 0 condition while a binary 0 signal is applied to the input of NAND gates NH1a and NH2a, NAND gate NH3a produces a binary 1 signal causing the output signal of NAND gate NH4a to transfer to the binary 0 condition. If on the other hand the signal along line $\overline{Ja}$ is in the binary 1 condition at this time NAND gate NH4a produces a binary 1 signal at it soutput. Thus, a steady state D.C. signal applied to a decoding device causes it to produce a binary 1 signal in all cases; whereas a pulsating D.C. signal causes it to produce a binary 1 signal only if the signal along its respective line $\overline{Ja}$, $\overline{Jb}$ (not shown) or $\overline{Jc}$ (not shown) is in the binary 1 condition.

The circuits for the coils of hall call above and hall call below switches HJXa and LJXa associated with car a are representative of such circuits for all the cars. Brush switches HHB, HHS and LHB, LHS of each car are mounted on the selector machine of the car with which they are associated so that their brushes HHB and LHB cooperate with contacts HH and LH located in the positions corresponding to the floors. These contacts are interconnected in any well known fashion to apply the signals along lines 1UB(6), etc., to brush HHB whenever a call is registered above the location of its respective car and to brush LHB whenever a call is registered below the location of its respective car. Switches HHS and LHS are electrically insulated from their brushes HHB and LHB and close just before and open just after their brushes disengage and engage, respectively, their associated floor position contacts. Binary 1 signals from decoding devices ECH and ECL cause their respective silicon controlled rectifiers SCRH and SCRL to conduct to cause the energization of the hall call above and hall call below switches. Once energized these switches remain energized while their respective car is traveling between floors through the operation of the associated switches HHS and LHS. The normal operation of these circuits is well understood by those skilled in the art and will not be further described.

The foregoing gives a general understanding of the structure and operation of the individual circuits contained in the system of the invention. At this point it is appropriate to described the operation of the system as a whole in order to explain how the individual circuits cooperate to control the operation of the cars. To this end, assume that all three cars are operating and that none of them has its emergency stop switch operated or is carrying a predetermined percentage of its rated load capacity. Under these circumstances "in service" switch IS of each car is operated and contacts IS1 (FIG. 2) and IS2 (FIG. 9) of each switch are engaged. Also assume that car a is adjacent the lower terminal landing floor ready to start to travel in the up direction; that car b is adjacent the fifth floor conditioned for continued travel in the up direction; and that car c is adjacent the fifth floor conditioned for continued travel in the down direction. In these circumstances, a positive potential exists on contact 1Ka (FIG. 1) and floor memory element 1MEa is actuated so as to provide a positive potential output signal on line 1Ma. This signal is applied to inverter —1MEUa and a negative potential signal exists on lines —1MUa and —1UGa. Likewise a positive potential exists on contacts 5Kb and 5Kc (not shown, but similar to contact 5Ka for car a, FIG. 1) so that floor memory elements 5MEb and 5MEc (not shown, but similar to element 5MEa for car a, FIG. 1) are actuated to produce positive potential output signals on lines 5Mb and 5Mc. Because car b is conditioned for continued travel in the up direction, a positive potential signal also appears on line +UDb to cause floor memory unit AND element 5MEUb (not shown, but similar to element 5MEUa for car a, FIG. 1) to produce a positive potential output signal on line 5MUb. This signal is applied to inverter —5MEUb (not shown, but similar to inverter —5MEUa, FIG. 1) and it produces negative potential signals on lines —5MUb and —5UGb. Car c, being conditioned for continued travel in the down direction, a positive potential signal exists on line +DDc to cause floor memory unit AND element 5MEDc (not shown, but similar to element 5MEDa, FIG. 1) to produce a postive potential output signal on line 5MDc. This signal is applied to inverter —5MEDc (not shown, but similar to inverter —5MEDa, FIG. 1), and it produces negative potential output signals on lines —5MDc and —5DGc.

The positive potential output signal on line 1Ma is applied to both inputs of transistor switch 1MUSa (FIG. 2). This causes its transistor TR1 (FIG. 3a) to conduct. Assuming that car a is just about to start moving up so that there is no negative potential on line —PMa, transistor TR2 (FIG. 3a) of switch 1MUSa is also caused to conduct. As a result the input circuit of operational amplifier OTBa (FIG. 3) is connected to the pair of first junction points UJ11 and UJ12 on both sides of diode 1URE1. In the same way, assuming cars b and c are also both ready to start moving so that no negative potential exists on lines —PMb and —PMc (not shown but connected to all transistor switches for cars b and c respectively in the fashion represented by line —PMa for car a in switch 1MUSa, FIG. 2a), both halves of transistor switches 5MUSb and 5MDSc are conducting and operational amplifiers OTBb and OTBc, respectively, are connected to the pairs of first junction points UJ51 and UJ52 and DJ51 and DJ52 on both sides of diodes 5URE1 and 5DRE1.

Assume that each of the cars is carrying at least one person so that the load responsive switches LNSa, LNSb and LNSc (FIG. 10) are all closed, that no signal is applied along line B5— and that the following calls are registered in the system;

an up hall call for the second floor
a down hall call for the sixth floor
a down hall call for the third floor
a car call in car a for the fourth floor
a car call in car b for the sixth floor, and
a car call in car c for the second floor, and that none of the hall calls have been in registration a predetermined interval sufficient to cause the equipment of FIG. 8 to produce outputs from the corresponding switches 1UFS, etc.

Also assume that in a prescribed way the cars normally travel up and down their hoistways in round trips passing one landing at a time in sequential fashion-starting at the first, traveling up to the top and returning down to the first; that they can run from floor to floor at rated running speed in 1 second; that they are allotted 8 seconds to answer a hall call; that they are allotted 6 seconds to answer a car call and 8 seconds to answer both a car and a hall call registered at the same landing.

Lastly assume that the current time scale that is chosen is a convenient one in which one microampere equals one second of time.

Under these assumed conditions, the registration of the third floor down hall call causes a call answering time signal of eight microamperes of current to flow through line 3DC (FIGS. 3 and 6) from timer 3DCT. This signal is applied through contacts IS1a to amplifier OTBa (FIG. 2) by way of that portion of the switching circuits of FIGS. 2 and 3 including diodes 3DRE2, 2DRE1 and 2, line K1, first junction point UJ11, transistor TR1 of switch 1MUSa and line a1. This signal represents the eight seconds allotted car $c$ to answer the third landing down hall call. In addition, the registration of the second floor car call in car $c$ causes a call answering time signal of six microamperes of current to flow through line 2CCc (FIG. 5) from timer 2CCTc (not shown, but similar to timer 2CCTa for car $a$, FIG. 7). This signal is transmitted to line 2DGCS (FIGS. 3 and 5) through switch 2DCSc (FIG. 5) because, as in the earlier explained manner, the negative polarity signal along line 5MDc from floor memory unit inverter −5MEDc (not shown, but similar to the corresponding inverter −5MEDa for car $a$, FIG. 1) is transmitted through switch 4DGSc, 3DGSc and 2DGSc to appear at the input to switch 2DCSc to operate its transistor to its non-conducting condition and permit the signal on line 2CCc to flow to line 2DGCS. The signal on line 2DGCS is applied by means of the switching circuits of FIGS. 2 and 3 through contacts IS1a to amplifier OTBa by way of diode 2DRE2, line K1, first junction point UJ11, transistor TR1 of switch 1MUSa and line a1 to represent the six seconds allotted car $c$ to answer its second floor car call. Lastly, a one microampere travel time signal exists on each of lines 4DDT, 3DDT, 2DDT and 1DDT (FIGS. 2 and 3) and is transmitted through contacts IS1a to amplifier OTBa by the diode chain, transistor TR1 of switch 1MUSa and line a1. The combined magnitude of these signals represents the four seconds it would take car $c$ to travel, at its rated running speed, the four floor heights from its assumed location at the fifth landing (going down) to the assumed location at the first landing of car $a$, the car immediately ahead of car $c$, on its trip through the building.

Figure 11A:
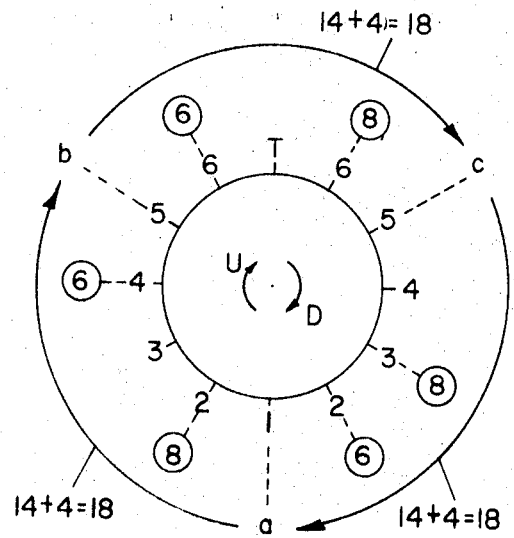

Thus with the cars located in their assumed positions amplifier OTBa although associated with the equipment of car $a$ acts as the summation means for the work load of car $c$, the car, car $a$ is immediately ahead of in the prescribed way of considering the travel of the cars. As a result, amplifier OTBa sums eight, six and four microamperes for a total combined signal of eighteen microamperes signifying that eighteen seconds of performance time separates car $c$ from car $a$, i.e. car $c$ is calculated to have eighteen seconds of work to do before it can reach the present location of car $a$. FIG. 11A illustrates vividly the work load of car $c$ by showing numerically the allotted hall and car call answering times for the third and second landings, respectively, adjacent the floor markings for such landings in the down portion of the semicircle between the reference characters representing cars $a$ and $c$ at their respective locations. Also shown numerically as an addition to the sum of the allotted call answering times is a representation of the travel time required to traverse the four floor heights from the location of car $c$ to that of car $a$.

Amplifier OTBb, presently acting as the summation means for the work load of car $a$, sums a total of eighteen microamperes owing to the eight microampere hall call answering time signal applied through line 2UC(6) and generated in timer 2UCT (FIG. 6) by the up hall call for the second floor, the six microamperes car call answering time signal applied through line 4UGCS(4) and generated in timer 4CCTa (FIG. 7) by the car call in car $a$ for the fourth floor and the four individual one microampere travel time signals applied through lines 2UDT, 3UDT, 4UDT and 5UDT representing the four floor heights between the assumed location of car $b$ at the fifth landing (going up) and the assumed location at the first landing of car $a$, the car immediately following car $b$ in its travel through the building. This signifies the eighteen seconds of performance time that car $a$ is calculated to be behind car $b$ or the eighteen seconds of work car $a$ has to do as it travels in the prescribed way to the present location of car $b$.

Amplifier OTBc, presently acting as the summation means for the work load of car $b$, also sums a total of eighteen microamperes owing to the eight microampere answering time signal through line 6DC(6) generated in response to the down hall call for the sixth landing, the six microampere answering time signal through line 6UGCS(4) generated in response to the car call in car $b$ for the sixth landing and the travel time signals through lines 6UDT, TUDT, 6DDT and 5DDT representing the time it would take car $b$ to travel in the prescribed sequential fashion the four floor heights between the assumed location of car $c$ at the fifth landing (going down) and the assumed location at the fifth landing (going up) of car $b$, the car immediately following car $c$ on its trip through the building. Of course, this signifies that $b$ is calculated to be eighteen seconds behind car $c$ and that it has eighteen seconds of work to do, or services to perform, in traveling in said prescribed way before it becomes situated as car $c$ presently is assumed to be. Representations of the work loads of cars $a$ and $b$ are also shown in FIG. 11A.

In these circumstances amplifiers OTBa, OTBb and OTBc apply negative polarity signals proportional to eighteen seconds of work to their respective lines TBa, TBb and TBc (FIGS. 2 and 9). Assuming contacts SB1 (FIG. 2) to be open at this time only these three signals are applied to operational amplifier OTBG (FIG. 9) and as a result it produces a positive polarity signal proportional to their average at line TBG. Accordingly, a positive polarity signal proportional to eighteen seconds of work is applied along line TBG to each of the comparator circuits of FIG. 10. In each of these circuits the positive polarity signal on line TBG cancels the negative polarity signal on the respective lines TBa, TBb and TBc. Accordingly, having assumed that no signal is applied along the line B5− none of amplifiers BYa, BYb and BYc receive an input signal. No output is produced by the BY amplifiers and the coils of non-stop relays NSa, NSb and NSc remain unenergized.

In these circumstances, contacts NS1 and NS2 (illustrated for car $a$ only in FIG. 6) of the non-stop relay NS, associated with each of the cars, are closed and each car will respond to and answer each of the hall calls it encounters for its direction of travel as well as its own car calls. Thus as car $a$ approaches the second landing it initiates a stop thereat in response to the second floor up hall call. This extinguishes the tube of registering device 2U (FIG. 6) removing the signal to timer 2UCT and causing its condenser Q5 to start to dissipate the potential stored thereon through its transistor TR5. At the same time as car $a$ approaches the second landing, car $b$ approaches the sixth landing and stops thereat in response to its sixth floor car call extinguishing the tube of registering device 6Cb (not shown but similar to that shown for car $a$, FIG. 7). This removes the input signal to timer 6CCTb (not shown, but similar to timer 6CCTa for car $a$ FIG. 7) and causes its condenser Q5 to start to dissipate its stored potential through its transistor TR5. Approximately one second after cars $a$ and $b$ initiate their stops, car $c$ approaches the third landing and stops thereat in response to the third floor down hall call and extinguishes the tube of registering device 3D (FIG. 6). The input to timer 3DCT is thereby removed and its condenser Q5 starts to discharge its stored potential through its transistor TR5.

Figure 11B:
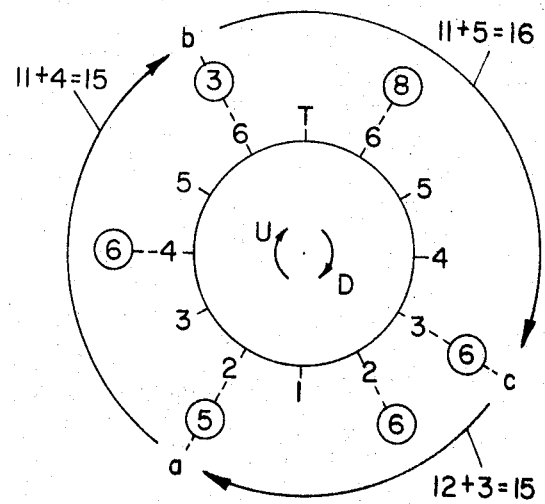
Figure 11C:
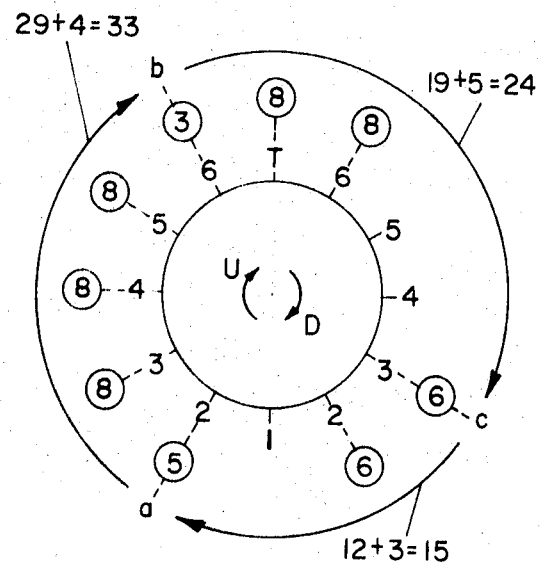
Figure 11D:
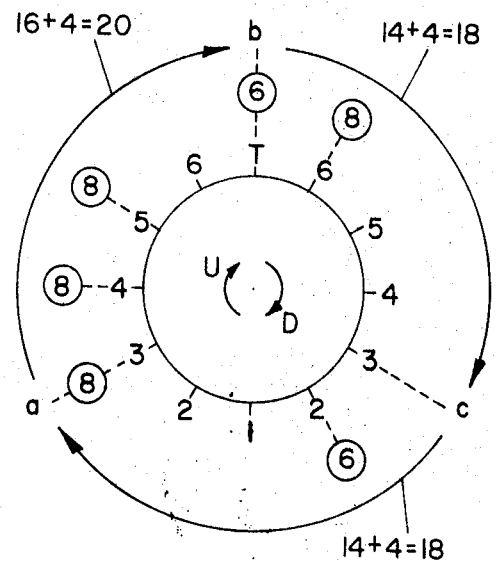

After the three cars initiate their stops at their respective landings, the work loads of the cars, in terms of the performance times separating each of them, are different from those originally assumed. FIG. 11B pictures the system three seconds after car $a$ stops at the second landing. Thus there are five of the allotted eight seconds remaining for car $a$ to complete the second landing up hall call stop. Car $b$ is at the sixth landing with three of its allotted six seconds remaining for it to complete its sixth landing car call stop. Car $c$ is at the third landing with six of its allotted eight seconds left for it to complete the third landing down hall call stop. Only two of its originally allotted eight seconds has elapsed because it took car c one floor height of travel and one second in time more to get to floor three than it took cars a and b to get to floors two and six, respectively.

The combined signals to amplifier OTBa now include, (a) three microamperes for the three sequential floor heights from the location of car a at the second landing (going up) to the present location of car c at the third landing (going down)—applied through lines 2DDT, 1DDT and 2UDT, diodes 2DRE1 through 1URE2, transistor TR1 of switch 2MUSa and line a1; (b) six microamperes—for the second landing car call in car c—applied through line 2DGCS(5), diodes 2DRE2 through 1URE2, switch 2MUSa and line a1; and (c) six microamperes—for the remaining six seconds allotted car c to complete the third landing down hall call stop—applied through line 3DC(6), diodes 3DRE2 through 1URE2, switch 1MUSa and line a1. The sum of these combined signals applied to amplifier OTBa equals 15 microamperes, characteristic of fifteen seconds of performance time separating car c from the present location of car a.

The combined signals to amplifier OTBb now include (a) four microamperes—for the four sequential floor heights from the location of car b at the sixth landing (going up) to the location of car a at the second landing (going up)—applied through lines 6UDT, 5UDT, 4UDT and 3UDT, diodes 3URE1 through 5URE2, transistor TR1 of switch 6MUSb and line b1; (b) six microamperes for the fourth landing car call in car a—applied through line 4UGCS(4), diodes 4URE2 through 5URE2, switch 6MUSb and line b1; and (c) five microamperes—for the remaining five seconds allotted car a to complete the second landing up hall call stop—applied through line 2UC(6), diodes 2URE2 through 5URE2, switch 6MUSb and line b1. The sum of these combined signals applied to amplifier OTBb equals 15 microamperes, characteristic of fifteen seconds of performance time separating car a from the present location of car b.

The combined signals to amplifier OTBc now include (a) five microamperes—for the five sequential floor heights from the location of car c at the third landing (going down) to the location of car b at the sixth landing (going up)—applied through lines 3DDT, 4DDT, 5DDT, 6DDT and TUDT, diodes TDRE1 through 4DRE2, transistor TR1 of switch 3MDSc and line c1; (b) eight microamperes—for the down hall call for the sixth landing—applied through line 6DC(6), diodes 6RE2 to 4DRE2, switch 3MDSc and line c1; and (c) three microamperes—for the remaining three seconds allotted car b to complete its sixth landing car call stop—applied through line 6UGCS(4), diodes 6URE2 to 4DRE2, switch 3MDSc and line c1. The sum of these combined signals applied to amplifier OTBc equals 16 microamperes, characteristic of sixteen seconds of performance time separating car b from the present location of car c.

With negative polarity signals proportional to fifteen seconds of work applied along lines TBa and TBb and a negative polarity signal proportional to sixteen seconds of work applied along line TBc the average of the combined signals along line TBG is greater than the signals along both lines TBa and TBb. This is sufficient to cause amplifiers BYa and BYb (FIG. 10) to produce negative polarity outputs to energize the coils of non-stop relays NSa and NSb and operate the relays. This has no effect at this time however since contacts SM1a, SM1b and SM2a, SM2b are closed.

Assume now that up hall calls are registered at the third, fourth, and fifth landings and a down hall call at the upper, or top terminal. The system is pictured in FIG. 11C under these conditions of call registration and car distribution. The output signal along line TBa re-seconds of work that car c must perform before it can become situated at the second landing (going up), as car a is. The output signal along line TBb changes as a result of the application of eight microamperes to amplifier OTBb by each of the up hall calls at the third and fifth landings, respectively. These signals are applied one along each of lines 3UC(6) and 5UC(6) to cause sixteen microamperes to flow through the diode chain and transistor TR1 of switch 6MUSb. In addition an input signal due to the fourth floor up hall call is applied along line 4UC(6). This in conjunction with the signal along line 4UGCS(4) also causes eight microamperes to flow into first junction point UJ42 at the intersection of diodes 4URE1 and 4URE2 as opposed to the six which previously flowed thereinto as a result of the fourth floor car a call only. As a result the negative polarity output signal along line TBb is proportional to thirty-three seconds of work that car a must perform before it can become situated at the sixth landing (going up) as car b is. The output signal along line ABc also changes. The down hall call at the top landing applies an input signal along line TDC(6) to cause eight microamperes to flow through the diode chain and transistor TR1 of switch 3MDSc to amplifier OTBc. As a result the negative polarity output signal along line TBc is proportional to twenty-four seconds of work car b must perform in order for it to become situated at the third landing (going down) as car c now is.

The increase in magnitude of the signals along lines TBb and TBc causes the output signal along line TBG from amplifier OTBG (FIG. 9) also to increase. The average of the work loads of all cars has increased to twenty-four seconds and so the output along line TBG is a positive polarity signal proportional to twenty-four seconds. The application of this signal to the comparator circuit for car a in conjunction with the negative polarity signal proportional to fifteen seconds applied along line TBa results in an input signal to amplifier BYa which is positive by an amount proportional to nine seconds. This is sufficient to maintain non-stop relay NSa operated so that its contacts NS1a remain separated, still without effect however since contacts SM1a and SM2a remain closed.

In five seconds car a completes its stop at the second landing and starts to travel up again. Car stop relay SMa releases to open contacts SM1a and SM2a in series with the hall call stop and reset circuitry of car a. Approximately one second later car a is adjacent the third floor where an up hall call is in registration. (See FIG. 11D for the pictorial representation of the condition of the system at this time.) By this time, car b has completed its car call stop at the sixth landing, has traveled to the top landing and six seconds remain of the eight that were allotted it for answering the down hall call that had been registered there. Car c just completed the down hall stop at the third landing and is ready to start down again. Accordingly, the signals along lines TBa, TBb and TBc, respectively, are proportional to (a) eighteen seconds of work for car c including six seconds for the second floor car call in car c, four seconds for the four floor heights between the relative positions of car a and c and eight seconds for the up hall call at floor three, which, although it could be answered by car a, is considered part of the work load of the car behind, car c, for purposes of calculating the present work loads of the cars because car a has not initiated a stop at the third landing and a negative signal is not applied along line —PMa (FIG. 2A); (b) twenty seconds of work for car a including eight seconds for the up hall call at floor five, eight seconds for the fourth floor up hall call and the car call in car a for the fourth floor, and four seconds for the four floor heights between the relative positions of cars b and a; and (c) eighteen seconds of work for car b including eight seconds for the down hall call at the sixth landing, six seconds remaining to complete the stop at the top landing (the call answering time for this call having been transferred as formerly indicated when the stop at the top landing was initiated by the signal along line —PMb (not shown but similar to line —PMa, FIG. 2A) so as to be calculated as performance time for car b) and four seconds for the four floor heights between the relative position of cars c and b.

The average of the work loads of all cars has decreased to eighteen and two-third seconds so that the output signal along line TBG is a positive polarity signal proportional to eighteen and two-third seconds. This is applied to the comparator circuits of FIG. 10 and in conjunction with the signal proportional to eighteen seconds applied along line TBa results in the application of an input signal to amplifier BYa which is positive by an amount proportional to two-thirds of a second. This is sufficient to maintain the negative potential output signal from amplifier BYa to keep the coil of non-stop relay NSa energized. Contacts NS1a and NS2a remain separated to the hall call stop and reset circuitry MSa (FIG. 6). As a result car a cannot respond to the third floor up hall call, does not initiate a stop at the third floor and bypasses the third floor up hall call. Thus the number of calls car a has to answer is decreased by one which thereby becomes a call the car immediately behind, or following, car a, in this case car c has to answer. Such bypassing continues until the work load of car c or, as it has also been referred to, the performance time separating car c from the car immediately ahead of it, car a, equals or exceeds the average work load, or performance time. It can be seen that in this way the total work that has to be performed by the system is distributed more evenly among the cars.

As stated earlier, even though a car's non-stop relay NS is actuated, it resets a hall call it encounters for its direction of travel provided it is stopping in response to a car call at the floor for which the hall call is registered. Thus, assume that a third floor car call had been registered in car a under the preceding set of circumstances. In that case, the car would have initiated a stop in response to the third floor car call and the initiation of the stop would have caused contacts SM1a and SM2a (FIG. 6) to engage. A circuit through contacts SM1a would thereby have been completed to reset the third floor up hall call. In addition, a car will not bypass a hall call if the call has been in registration beyond a predetermined period of time. To demonstrate, assume the third floor up hall call, which was bypassed by car a under the earlier set of detailed circumstances, is in registration long enough to cause timer 3UFT (FIG. 8A) to operate switch 3UFS. This causes a positive polarity signal to appear on line 3UFM (FIGS. 2 and 8). As a result of the approach of car a to the third landing in the previously described manner, this signal is provided with two paths of conduction. One of these is to ground through diodes 3UED1 and 3UED2. The other is to the virtual ground at the input of amplifier OTBa and includes collector CO2 and emitter EM2 of switch 3MUSa, line a1, contacts IS1a and diode OTBDa. The impedances of these two paths are matched so as to be substantially equal and as a result half the signal along line 3UFM(8) is applied to amplifier OTBa. This signal is large enough to cause the amplifier to increase radically its output along line TBa. The magnitude and rate of this increase are such that the output along line TBa becomes greater than the time delayed output along line TBG (FIGS. 9 and 10). This causes the input to amplifier BYa (FIG. 10) to go negative and causes the release of relay NSa. Upon such release, contacts NS1a and NS2a close and contacts NS1a complete a circuit to hall call stop and reset circuitry HSa (FIG. 6) to enable the initiation of a stop at the third floor in response to the registered third floor up hall call.

As previously explained, the initiation of a stop resets the hall call. The input signal along line 3UF(6) is thereby removed from timer 3UFT (FIG. 8). This causes rapid resetting of the timer and the removal of the input to switch 3UFS (FIG. 8) with the consequent removal of the signal along line 3UFM(8) before condenser TBGQ (FIG. 9) permits any practical change to take place in the magnitude of the average work load output signal of amplifier OTBG (FIG. 9) along line TBG.

Notwithstanding one of timers 1UFT, etc., may cause the actuation of its associated switch 1UFS, etc., when a car is not in a position to answer the hall call which operated the timer, the signal from the switch along line 1UFM(8), etc., does not materially effect the computation of the individual work load signal of the amplifier OTBa, etc., to which it is connected. When a car is not located at the floor for which such a call is registered two or more additional diodes of the diode chain 1URE1, etc., of FIGS. 2 and 3 are included in the path to the individual work load amplifier and these so attenuate the signals from lines 1UFM(8), etc., that they have no practical effect on the system. Diodes TBD1s and TBD2s (FIG. 2) accomplish the same result when the scanner is scanning a floor associated with such a signal.

As indicated earlier, in addition to the foregoing operation, in which a car is caused to bypass floors at which it would otherwise stop in response to hall calls provided the performance time of the car immediately behind it is less than the average performance time, another operation is also provided. In order to understand this other operation, assume car a has just completed a car call stop at the fourth floor and is starting to continue traveling up; car b has just stopped at the sixth landing in response to a car call while traveling down; and car c has completed a car call stop at the third floor and is starting to continue traveling up. In addition, assume that up hall calls are registered at the first, second, and sixth landings. Down hall calls are registered at the third, fifth and top landing and a car call is registered in car b for the second landing in addition to the one it has just cancelled at the sixth landing. Under these circumstances the magnitude of the signals along lines TBa(2), TBb(2) and TBc(2) are proportional to 1, 20 and 51 seconds respectively. The magnitude of the signals along lines TAa(13), TAb(13) and TAc(13) are 20, 51 and 1 seconds respectively. (A pictorial representation of this condition is shown in FIG. 20A.) The magnitude of the signal along line TBG(2) is proportional to 24 seconds.

As is indicated, the individual performance time for car b exceeds more than twice the average performance time. Thus, the signal along line TBc(2) characteristic of the performance time of car b causes operational amplifier OA1 (FIG. 15) of the heavy demand signifying means to operate to produce a binary 1 signal along line TTBGK. In addition the sum of the magnitudes of the output signals of the first and second summation means of car a, OTBa and OTAa, (FIGS. 2 and 13) is equal to 21 seconds such that the sum of the performance time of car c and that of the car ahead of car c, car a, is less than the average performance time. The signals along lines TBa(2) and TAa(13) cause operational amplifier OA6 (FIG. 18) of the car availability means to operate and this in conjunction with the binary 1 signal along line ISa produces a similar signal along line SWa. Binary 1 signals along lines TTBGK(15) and SWa cause the production of a binary 1 signal along line INa (FIG. 18). Since as has been assumed no car call exists in car a a binary 1 signal exists along line $\overline{RCCa}$(7). This in conjunction with the binary 1 signals along lines INa and $\overline{GJ}$(15) causes the production of a binary 1 signal along line QAVa and a binary 0 signal along line $\overline{QAVa}$ (FIG. 18). At this time thet signals along lines $\overline{Ja}$ and $\overline{PZ}$(17) are also in the binary 1 condition and this causes the operation of prevent hall stop relay PHSa of car a. The operation of relay PHSa provides a signal along line PHSa which operates non-stop relay NSa (FIG. 10) to open contacts NS1a and NS2a (FIG. 6) and prevent car a from responding to hall calls.

The production of a binary 0 signal along line $\overline{QAVa}$(18) causes the operation of scan begin relay SB (FIG. 16). This closes contacts SB1 (FIG. 2) and SB2 (FIG. 13). In addition it causes the production of a binary 0 signal along line $\overline{SB}$ (FIG. 16). Assuming the scanner starts with flip-flop 1UFF producing a binary 1 along line 1M$s$, when contacts SB1 close a signal is produced along line TB$s$(2) proportional to 41 seconds. Simultaneously the signal along line TB$c$(2) (FIGS. 9 and 15) decreases to a value proportional to 10 seconds. The decrease in the magnitude of the signal along line TB$c$(2) does not affect the magnitude of the average signal along line TBG because an input signal which compensates for this decrease is provided to amplifier OTBG (FIG. 9) along line TB$s$(2). When contacts SB2 close a signal is produced along line TA$s$(13) also proportional to 10 seconds. The signals along lines TA$s$ and TB$s$ operate to cause operational amplifier OA2 (FIG. 15) to produce a binary 0 signal along line $\overline{TTBGS}$ indicating that the scanner is scanning a floor located in the area of heavy demand. The signal along line $\overline{TTBGS}$ is applied to NAND gate N2 (FIG. 15) to continue the production of a binary 1 signal along line TTBGK. Condenser QJR represents a short time delay device provided to insure that the signal along line TTBGK is maintained in the binary 1 condition while the output signals of amplifiers OTB$c$, OTB$s$ and OTA$s$ are changing.

The production of a binary 0 signal along line $\overline{SB}$ causes the production of a pulsating D.C. signal along line CP (FIG. 16). As has been explained, this starts the scanner to operate one flip-flop 1UFF, etc., after the other in the series. Assume the operation of the scanner is rapid enough for it to scan up and down the entire hoistway before any operation occurs to change the magnitudes of the call and distance responsive signals applied to the first and second distribution circuit means. The scan proceeds until flip-flop 3DFF (not shown) produces a binary 1 signal along line 3MD$s$. As this occurs the signal along line TB$s$ is proportional to 25 seconds while that along line TA$s$ is proportional to 26 seconds. (The first and second selection summation means receive the same car call responsive signals that would otherwise be received by the first summation means of the car immediately ahead of the location of the scanning means because the scanning means has no affect upon the car call separation circuits of FIGS. 4 and 5.) The signals along lines TB$s$ and TA$s$ cause operational amplifiers OA3 and OA4 (FIG. 15) to produce binary 1 signals along lines STB and STA. At the same time the signal along line 3UF(6) owing to the down hall call registered at the third floor causes all inputs to NAND gate N5 (FIG. 15) to be in the binary 1 condition. This produces a binary 1 signal along line SH and a binary 0 signal along line $\overline{SH}$. This latter signal causes the continuous production of a binary 1 signal along line CP which stops the scanner at the position in which it produces a binary 1 signal along line 3MD$s$.

The production of a binary 1 signal along line SH(15) causes the actuation of direct service relay J$a$ (coil circuit FIG. 18) and the consequent separation of contacts J1$a$ and J2$a$ (FIGS. 2 and 13). This disconnects the first and second summation means OTB$a$ and OTA$a$ of car $a$ from the first and second distribution circuits to prevent car $a$ from interfering with the operation of the other cars while it is providing direct service. The average signal along line TBG (FIG. 9) is unaffected by this because the first summation means of the other cars receive the signals car $a$ otherwise would receive and transmit these signals to the averaging means OTBG (FIG. 9). The actuation of relay J$a$ also causes the production of a binary 1 signal along line J$a$ and a binary 0 signal along line $\overline{Ja}$. This latter signal maintains the signal along line QAV$a$ in the binary 1 condition and releases prevent hall stop relay PHS$a$ (FIG. 18). Also the binary 0 signal along line $\overline{Ja}$ causes the actuation of direct service group relay GJ (coil circuit FIG. 15) and the separation of contacts GJ1 and GJ2 (FIGS. 2 and 13). This disconnects the first and second selection summation amplifiers OTB$s$ and OTA$s$ from the first and second distribution circuits. The average signal along TBG (FIG. 9) is unaffected by this because the first and second summation means of the cars which are not providing direct service, cars $b$ and $c$, receive all the call and distance responsive signals and transmit them to the averaging means OTBG (FIG. 9). The signals along lines TB$s$ and TA$s$ are discontinued by the disconnection of their respective amplifiers and the signals along lines STB, STA and TTBGS (FIG. 15) are transferred to binary 0 signals while that along line $\overline{TTBGS}$ is transferred to a binary 1 signal. This is without affect however since the signal along line TB$c$(2) maintains the signal along line TTBGK in the binary 1 condition.

The actuation of relay GJ also causes the production of a binary 1 signal along line GJ (FIGS. 16 and 17) and a binary 0 signal along line $\overline{GJ}$ (FIGS. 15 and 18). This latter signal maintains the signal along line SH in the binary 1 condition. The production of a binary 1 signal along line GJ causes the production of a pulsating D.C. potential along line SQ (FIG. 16). This pulsating signal in conjunction with the binary 1 signal along line GJ causes the production of a binary 0 signal along line $\overline{PZ}$ (FIG. 17) in preparation for the next operation of the scanner.

As a result of the production of the pulsating signal along line SQ(16) all encoders E1U, etc., except encoder E3D operate to encode their associated registered hall calls. Thus, a pulsating D.C. potential exists along all lines 1UB, etc., corresponding to registered hall calls except line 3DB (FIG. 6). As a result decoder ECH$a$ (FIG. 19) receives only pulsating signals and since the signal along line $\overline{Ja}$ is in the binary 0 condition, encoder ECH$a$ likewise produces a binary 0 signal. Hall call above relay HJX$a$ releases and car $a$ not having any call above it to which it can respond stops at the next landing it encounters in any well known manner.

Assume the control system of car $a$ is beyond being able to stop the car at the fourth landing and the car continues to travel for another second before it stops at the fifth landing. Upon encountering the fifth landing, decoder ECL$a$ (FIG. 19) receives the steady state signal along line 3DB from encoder E3D (FIG. 6) and operates hall call below relay LJX$a$ to cause the car to travel down. Upon reversal the car does not respond to the fifth floor down hall call since that call is encoded as a pulsating signal which produces a binary 0 signal at the output of decoder ECD$a$ (FIG. 6) and this is incapable of operating hall call stop and reset circuitry HS$a$. As a result the car provides direct service to the selected down hall call at the third floor and upon encountering the third floor, stops thereat to serve the intending passenger. This stop is produced because encoder E3D provides a steady state signal along line 3DB to decoder ECD$a$ (FIG. 6) which provides a binary 1 signal to operate circuitry HS$a$. The provision of direct service to the third floor down hall call consumes two more seconds of time.

As is known upon the initiation of the stop at the third floor, door control equipment (not shown) operates to open the elevator doors (not shown) for a predetermined period to enable the intending passenger to enter the car. In any well known manner, this operation produces a binary 1 signal along line DT$a$ (FIG. 18) to cause the release of direct service relay J$a$ (coil circuit FIG. 18), the engagement of contacts J1$a$ and J2$a$ (FIGS. 2 and 13) and the production of a binary 0 signal along line J$a$ and a binary 1 signal along line $\overline{Ja}$. The engagement of contacts J1$a$ and J2$a$ reconnects the first and second summation means of car $a$, OTB$a$ and OTA$a$, to the first and second distribution circuits. The connection of amplifiers OTB$a$ and OTA$a$ together with the travel of car a to the third floor and its stopping thereat causes the signals along lines TBa(2), TBb(2), TBc(2) to be proportional to 14 seconds, 18 seconds and 31 seconds respectively. At this time car a is located at the third floor prepared for future down travel with eight seconds remaining for it to complete its stop in response to the third floor down hall call, car b is located at the sixth floor prepared for future down travel with three of the original six seconds left for it to complete its stop in response to its sixth floor car call and car c is located at the sixth floor prepared for future up travel having just initiated a stop in response to the up hall call registered thereat with eight seconds remaining for it to complete the stop. This condition is depicted in FIG. 20b. The second floor car call in car b is no longer considered in the performance time measurements because the location of car a at the third floor traveling down prevents its application to the distribution circuits as will be appreciated from the explanation of FIGS. 4 and 5.

Simultaneous with the production of the forementioned signals along lines TBa(2), TBb(2) and TBc(2), the binary 1 signal along line $\overline{Ja}$ (FIG. 15) causes direct service group relay GJ (coil circuit FIG. 15) to start to release. Before this relay can release, however, the signal along line $\overline{GJ}$ (FIG. 18) is still in the binary 1 condition and the binary 1 signal along line $\overline{Ja}$ (FIG. 18) causes the signal along line QAVa to transfer to the binary 0 condition and the signal along line $\overline{QAVa}$ to transfer to the binary 1 condition. At the same time the magnitude of the signals along lines TBa(2), TBb(2) and TBc(2) all being less than twice the magnitude of the average signal along line TBG(9) cause amplifier OA1 to produce a binary 0. This in conjunction with the binary 1 along line $\overline{TTBGS}$ causes the output of NAND gate N2 to transfer to a binary 0. However, the time delay presented by the time delay device represented by condenser QJR maintains the signal along line TTBGK in the binary 1 condition for a short period. This time is considerably less than the release time of direct service group relay GJ and as a result the signal along line TTBGK transfers to the binary 0 condition before the relay releases. Also, this binary 0 signal causes the production of a binary 0 along line INa before the release of relay GJ. Thus before the signal along line $\overline{GJ}$ (FIG. 18) is transferred to the binary 1 condition, a binary 0 signal exists along line INa to maintain a binary 0 signal along line QAVa and a binary 1 signal along line $\overline{QAVa}$. When this latter signal was first produced scan begin relay SB (coil circuit FIG. 16) started to release. Before that is accomplished, however, direct service group relay GJ releases to close contacts GJ1 and GJ2 (FIGS. 2 and 13) and to produce a binary 0 signal along line GJ and a binary 1 signal along line $\overline{GJ}$. The engagement of contacts GJ1 and GJ2 reconnects the first and second selection summation amplifiers OTBs and OTAs to the first and second distribution circuits. The binary 1 signal along line $\overline{GJ}$ (FIG. 15) transfers the signal along line SH to the binary 0 condition and the signal along line $\overline{SH}$ to the binary 1 condition. This latter signal enables the pulsating D.C. potential to be reapplied to line CP (FIG. 16) to restart the scanner. But all of this is without operative effect for shortly thereafter scan begin relay SB releases to open contacts SB1 and SB2 (FIGS. 2 and 13) and to produce a binary 0 signal along line SB and a binary 1 signal along line $\overline{SB}$. The engagement of contacts SB1 and SB2 again disconnects the first and second selection summation amplifiers from their respective distribution circuits. The binary 1 signal along line $\overline{SB}$ discontinues the pulsating D.C. potential along line CP and the binary 0 signal along line SB causes the production of a similar signal along line CD (FIG. 16). This causes each of the flip-flops of the scanner 1UFF, etc., to produce a binary 1 signal along its respective output line $\overline{1Ms}$, etc., and a binary 0 signal along its respective output line 1Ms, etc. Consequently, the scanner is prepared for its next operation upon the reception of another binary 0 signal along line $\overline{SB}$. In the meantime, of course, before flip-flop FFCP ceased operation the production of a binary 0 signal along line GJ caused transistor TRSQ to turn off removing the pulsating D.C. potential from line SQ (FIG. 16). This discontinued the encoding of hall calls, returning the signals along lines 1UB, etc., to steady state potentials.

The anti-coincident circuit of FIG. 21 is associated only with car a but is representative of similar equipment provided for each of the cars. It is recognized that two cars of the system may be indicated to be coincident in their location and direction of travel, notwithstanding one is physically ahead of the other by something less than a floor height. If this happens the first summation means of the cars would share the distance and call responsive currents which would otherwise be applied only to the equipment of the car which is physically trailing. Thus under certain circumstances of call registration both cars could be enabled to bypass hall calls in response to the operation of the light traffic signifying means notwithstanding the trailing car would otherwise stop for these calls. Assume car a approaches the physical location of another car traveling in the same direction such that the circuitry of FIG. 1 indicates it to be at the same location as the other car. Thus the output signal from amplifier OTBa (FIG. 2) along line TBa(2) is substantially instantaneously reduced in magnitude to approximately one-half its previous magnitude. This causes amplifier OA6a, operating as a differentiator, to apply an input pulse to one-shot multivibrator OSMa. As a result a negative pulse is applied along line COa to amplifier B4a (FIG. 10) of such a magnitude to prevent it from operating non-stop relay NSa. This operation is repeated each time the location and direction of travel of car a coincides with that of a car physically ahead of it. Thus as car a approaches a landing for which a hall call is registered it is prevented from bypassing that call as a result of this coincidence. As will be understood amplifier OA6a and multivibrator OSMa are so designed that amplifier OA6a does not produce a signal sufficient to cause multivibrator OSMa to produce the foregoing negative output signal along line COa in response to the decrease in the magnitude of the signal along line TBa(2') owing to car a bypassing a landing at which a hall call is registered.

Another arrangement for providing the foregoing operation is recognized as being accurate even where the decrease in the signal along line TBa(2) owing to coincidence is not sufficient to provide the desired output along line COa. It involves advancing the indication of the location of a car at a landing as produced by the circuitry of FIG. 1 immediately upon the elevator control system operating to signify that the car is not going to stop at that landing. This, for all practical purposes, eliminates the possibility of any indication of coincidence arising at a landing at which a hall call is registered to which a closely trailing car would otherwise respond.

From the foregoing it can be seen that this invention provides a control system for a group of elevator cars in which the cars are controlled in accordance with the work load between each car and the car immediately ahead of it on its trip through the building. That the work load between each two such cars in expressed in terms of the time calculated to elapse while the cars are performing services and is measured by two criteria. That these criteria are first the time it would take each car running at its rated speed to travel the distance between itself and the car immediately in front of it if it traverses the floors in sequence; and second, the time allotted each car to respond to and answer those car and hall calls it will encounter in traversing the floors in sequence in traveling to the present location of the car immediately in front of it. Furthermore, upon determining each work load the system combines them all and derives an average work load. The work load of each individual car is compared to this average and if the work load of any particular car is less than the average it causes the system to condition the car immediately ahead of that car so as to be unresponsive to and bypass hall calls it would otherwise answer. This continues until the individual work load under consideration compares more favorably with the average. Notwithstanding, a car is to bypass hall calls it will cancel such calls if it stops in response to a car call at a floor at which a hall call is registered for its direction of travel. Moreover, in the preferred embodiment no car is permitted to bypass hall calls in response to the work load of the car behind it being less than the average if the car which otherwise would bypass is empty. A car is also conditioned to bypass hall calls it would otherwise respond to and provide direct service to a hall call which would ordinarily be responded to by another car, if the work load of that other car is greater than twice the average and the combined work loads of the car which is conditioned to bypass and the car immediately behind it are less than the average. In these circumstances the bypassing car is available for such operation if it does not have a car call registered in it.

Cars which are carrying more than a predetermined percentage of their maximum capacity are not considered part of the group under control of the system and thereby have no effect on the system, except that such a car also will cancel hall calls for its direction of travel should it stop in response to a car call at a floor at which such a hall call is registered.

Various modifications are also possible. Thus it is recognized that it is not absolutely necessary in every installation to take the floor to floor travel times into consideration in determining work loads or performance times as has been done in the disclosed arrangement. Nevertheless, it should be understood that if such times are disregarded in any installation, the particular elevator system in that installation is not as accurate in controlling the operation of its cars as one in which such times are taken into account. Furthermore, it is realized that variations in actual floor to floor travel times occur because of variations in the maximum speeds attainable on different trips. For present purposes, however, it is deemed sufficient to consider each of the travel times to be that which elapses at rated speed.

It might be desirable in certain installations to bias the bypass means of FIG. 10 so that it operates in a manner somewhat different than previously described. Thus by inserting a negative polarity signal along line B5— in the circuits of a particular car the bypass means of that car could be prevented from operating until the work load of the car behind it fell below the average by some predetermined amount. Conversely, a positive signal inserted along line B5— of that car would permit its bypass means to operate so long as the work load for the car behind it did not exceed the average by some predetermined amount. It should also be understood that although two separate devices for signifying that a car is empty are employed, one a load weighing and the other a device which signifies whether a car call is registered in a car, either device can be suitably interchanged with the other without detracting from the operation of the system.

Other operations can also be appropriately included in an installation in which the present invention is provided; and other ways of travel might be prescribed. For example, various known control arrangements might be combined with this one to provide different modes of operation to suit different traffic conditions. Also, high and low call reversal might be provided. As a further sophistication it might be desired that such reversals be limited to specific areas of the building. Those skilled in the art will understand from the foregoing how to accomplish such well known operations in the system of the present invention. As well as providing typical high and low call reversal, it might also be desired to reverse a car notwithstanding calls are registered above or below the car, respectively, which would otherwise cause the car to continue traveling up or down. Such reversals might be made where if the car were permitted to encounter the call or calls the bypass means would indicate that it should bypass it or them.

In addition instead of computing the work load of each car by referencing on the car immediately in front and measuring back to the car in question and when such measurement is below the average causing the car in front to bypass hall calls, a different but substantially equivalent arrangement is also contemplated, i.e. to compute the work load of each car by measuring directly from the car in question forward to the car immediately in front of it and when such measurement is greater than the average causing the car in question to bypass hall calls. The same manner of measurement might also be used for determining an area of heavy demand, rather than that used in FIG. 15. Thus instead of producing a binary 1 signal along line TTBGK in response to the magnitude of the output signal of one of the first summation means exceeding the magnitude of the output signal of the averaging means, the same signal might suitably be produced along line TTBGK in response to the same relationship between the magnitude of the output signal of one of the second summation means and that of the averaging means. If this measurement is desirable the production of the binary 1 signal along line TTBGK in this manner could be prevented if the magnitude of the output signal of the first summation means of the car, whose second summation means output signal would otherwise produce the binary 1 signal along line TTBGK, was less than the magnitude of the output signal of the averaging means. This would prevent the indication of a heavy demand if the car with the heavy demand in front of it was prepared to bypass hall calls which caused the heavy demand indication because the car immediately behind it had a light demand.

In the foregoing detailed description, a time was allotted to each call equal to the anticipated time which would elapse while a car responded to that call. For improved accuracy the signal proportional to this time dissipated as a function of the time which elapsed from the cancellation of that call. For the sake of simplification no consideration is given for reestablishing part or all of this time if the doors of a car which is stopped in response to a call should be reopened, for example by a proximity detector or a door open button. If desired this might be accomplished by applying a signal in response to such reopening to condenser Q5 (FIG. 6A) of the call timing circuits associated with the call for which the car is stopped. This signal suitably would provide the condenser with a charge proportional to the time provided both for reopening the doors and for maintaining them in the open condition.

Also in the foregoing description it is explained that amplifiers OA3 and OA4 (FIG. 14) produce binary 1 signals along lines STB and STA whenever the magnitudes of the output signals of the first and second selection summation amplifiers OTBs and OTAs (FIGS. 2 and 13) exceed that of the averaging means OTBG (FIG. 9). Under these conditions the hall call selected for direct service in the area of heavy demand is registered at a landing which has a work load both behind it and ahead of it greater than the average work load. In some installations it might be desirable to produce a a binary 1 signal along either or both of lines STB and STA when a different relationship exists between the average signal and the output signals of amplifiers OTBs and OTAs. Any such desired relationship is readily employed by using separate bias signals rather than the common one along line B8+ and by setting the magnitudes and polarities of these signals accordingly.

Other variations within the scope of the invention will also occur to those skilled in the art. It is intended therefore that all matter contained in the above description or shown in the accompanying drawing be interpreted as illustrative and not limiting in any sense.

What is claimed is:

1. In an elevator control system in which a plurality of cars operate to perform services at a plurality of floors in a building by traveling in the up and down directions in a prescribed way and by stopping in response to and cancelling calls registered by passengers desiring to travel to and from said floors; individual starting switch means for each car; car call registering means in each car for registering car calls for travel to said floors; hall call registering means at each floor for registering hall calls for travel from each of said respective floors; starting and stopping mechanism for each of said cars starting its respective car in response to the operation of its individual starting switch means and stopping it in response to calls registered therein and at said floors; call cancellation means cancelling a call registered for a floor upon a car stopping in response to said call; wherein the improvement comprises means segregating said floors into a plurality of groups of floors, each group associated with a car located at a floor in its associated group; traffic measuring means individual to each of said groups of floors operating in response to hall calls in registration at the floors in its respective group and generating an output control signal individual to that group characteristic of the level of traffic for the floors comprising its respective group; averaging means operating in response to the number of cars operating in said system and to said individual traffic level signals and generating an output control signal characteristic of the average thereof; and operation control means controlling the operation of said cars in response to said average traffic level signal.

2. In an elevator control system according to claim 1, wherein said operation control means controls the operation of said cars in response to the relationship between said average traffic level signal and said individual traffic level signals.

3. In an elevator control system according to claim 2, wherein said operation control means includes light traffic signifying means which operates in response to the magnitude of any of said individual traffic level signals being less than the magnitude of said average traffic level signal and prevents the starting and stopping mechanism of a predetermined one of the cars from stopping said car in response to hall calls.

4. In an elevator control system according to claim 3, wherein said light traffic signifying means is operable in response to the magnitude of one of said individual traffic level signals being less than the magnitude of said average traffic level signal to prevent the starting and stopping mechanism of the car in the group immediately ahead of the group whose associated traffic level signal is less from stopping said car ahead in response to hall calls until the magnitude of said one individual traffic level signal equals or exceeds that of said average signal.

5. In an elevator control system according to claim 4, wherein each individual group of floors includes the floors the car associated with said group will encounter in traveling in said prescribed way to the location of the car associated with the group adjacent said group in said prescribed way of travel.

6. In an elevator control system according to claim 2, wherein said operation control means includes heavy traffic signifying means which operates in response to the magnitude of any of said individual traffic level signals being greater than the magnitude of said average traffic level signal and prevents the starting and stopping mechanism of a predetermined one of the cars from stopping said car in response to hall calls.

7. In an elevator control system according to claim 6, wherein said operation control means includes car availability means operating in response to the combined traffic level signals of any two adjacent groups of floors being less than said average traffic level signal and said predetermined car is the one associated with that one of said two adjacent groups of floors that is the leading one in the prescribed way of travel.

8. In an elevator control system according to claim 7, wherein said operation control means includes selection means which operates in response to the operation of said heavy traffic signifying means and selects a floor in the group whose traffic level signal caused the operation of said heavy traffic signifying means, and direct service means which operates in response to said car availability means and said selection means and causes the starting and stopping mechanism of said predetermined car to cause its respective car to travel to said selected floor and to stop thereat.

9. In an elevator control system according to claim 8, wherein said direct service means causes the starting and stopping mechanism of the car traveling to said selected floor to operate to cause said car to travel directly to said selected floor without responding to hall calls regardless of both the direction in which it had been traveling before the operation of the direct service means and the direction in which it has to travel to enable it to travel to said selected floor.

10. In an elevator control system according to claim 9, wherein said heavy traffic signifying means operates in response to the magnitude of the traffic level signal of any individual group of floors being greater than twice the magnitude of the average traffic level signal.

11. In an elevator control system according to claim 10, wherein said car availability means includes an individual car availability switch for each car, said system including means indvidual to each car operating to signify the presence of a passenger in its associated car, said means operating to prevent the car availability switch associated with its respective car from operating.

12. In an elevator control system according to claim 11, wherein said selected floor is selected because a hall call is registered thereat, said system including means operating in response to the cancellation of said hall call at said selected floor by other than said available car and releasing the direct service means.

13. In an elevator control system according to claim 12, means operating in response to the cancellation of said hall call at said selected floor by said available car and releasing the car availability switch of said available car.

14. In an elevator control system according to claim 13, wherein each individual group of floors includes the floors the car associated with said group will encounter in traveling in said prescribed way to the location of the car associated with the group adjacent said group in said prescribed way of travel.

15. In an elevator control system according to claim 3, wherein said operation control means includes heavy traffic signifying means which operates in response to the magnitude of any of said individual traffic level signals being greater than the magnitude of said average traffic level signal and prevents the starting and stopping mechanism of a predetermined one of said cars from stopping said car in response to hall calls.

16. In an elevator control system according to claim 15, wherein the predetermined car which is prevented from stopping by the operation of said light traffic signifying means is that car ahead, in the prescribed way of travel, of the car associated with the group of floors whose individual traffic level signal caused the operation of said light traffic signifying means.

17. In an elevator control system according to claim 16, wherein said operation control means includes car availability means operating in response to the combined traffic level signals of two adjacent groups of floors being less than said average traffic level signal and the predetermined car which is prevented from stopping by the operation of said heavy traffic signifying means is the car associated with that one of said two adjacent groups of floors that is the leading one in the prescribed way of travel.

18. In an elevator control system according to claim 17, wherein said operation control means includes selection means which operates in response to the operation of said heavy traffic signifying means and selects a floor in the group whose traffic level signal caused the operation of said heavy traffic signifying means and direct service means which operates in response to said car availability means and said selection means and causes the starting and stopping mechanism of the predetermined car which is prevented from stopping by the operation of said heavy traffic signifying means to cause its respective car to travel to said selected floor and to stop thereat.

19. In a control system in which a plurality of conveyor cars operate to perform services at a plurality of stations, landings or floors by traveling in a prescribed way and by stopping in response to and cancelling calls registered by passengers desiring to travel to and from said floors; car call registering means in each car for registering calls for travel to each of said floors; hall call registering means at each floor for registering calls for each direction in which a car can travel from each floor; stopping mechanism individual to each car, each mechanism operable to stop its respective car in answer to calls for those floors for which car calls are registered said respective car and at which hall calls are registered for the direction in which said car is traveling as it approaches the floors at which said calls are registered; first control means, responsive to the car calls registered in each car and to the hall calls registered at said floors as well as to the directions of travel and the locations of said cars for producing for each car a separate output control signal individual to that car characteristic of the performance time calculated to be separating its respective car from the car immediately ahead of it in said prescribed way of travel; and second control means controlling the operation of said cars in accordance with said individual performance time signals.

20. In a control system according to claim 19, in which said first control means also produces a signal characteristic of the average of said individual performance time signals and said second control means also controls the operation of said cars in accordance with said average performance time signal.

21. In a control system according to claim 20, in which said second control means operates to control the operation of said cars in accordance with the relationship between said average performance time signal and said individual performance time signals.

22. In a control system according to claim 21, in which said second control means operates in response to a first predetermined relationship between said average performance time signal and any of said individual performance time signals to condition the stopping mechanism of a predetermined car to bypass floors at which said car otherwise would stop in answer to hall calls until a second predetermined relationship exists between said signals.

23. In a control system according to claim 22, in which said second control means is operable in response to the magnitude of one of said individual performance time signals being less than the magnitude of said average performance time signal to condition the stopping mechanism of the car immediately ahead of the one whose performance time signal is less to bypass floors at which said car ahead would otherwise stop in answer to hall calls until the magnitude of said one individual performance time signal equals or exceeds that of said average signal.

24. In a control system according to claim 23, in which each of said individual performance time signals is also a function of the distance between its respective car and said car immediately ahead of it.

25. In a control system according to claim 24, including means operating in response to an indication that a car is carrying no passengers and upon the approach of said car traveling in a particular direction to a floor for which a hall call for said direction is registered to prevent said second control means from conditioning the stopping mechanism of said car to bypass said floor.

26. In a control system according to claim 25, including means operating in response to the time each hall call is in registration and upon the approach of a car traveling in a particular direction to a floor for which a hall call for said direction has been in registration for a predetermined length of time to prevent said second control means from conditioning the stopping mechanism of said car to bypass said floor.

27. In a control system according to claim 21, including a heavy traffic signifying means operating in response to any individual performance time signal exceeding said average performance time signal by a predetermined amount; car availability means operating in response to said average performance time signal exceeding the combined individual performance time signals of any car and the car immediately ahead of it in said prescribed way of travel; call selection means operating in response to the operation of said heavy traffic signifying means and selecting a hall call whose registration produces part of the excessive individual performance time signal; and direct service means operating in response to the operation of said car availability means and said call selection means and preventing the stopping mechanism of one of the cars whose combined performance time signals are exceeded by said average performance time signal from stopping its respective car in response to any hall calls it might encounter other than the selected hall call and whereby said car is caused to travel to the floor at which said selected hall call is registered and upon encountering it its stopping mechanism operates to stop said car in response thereto regardless of whether the call is registered for the direction in which the car is traveling as it approaches said floor.

28. In a control system according to claim 27, wherein said car which is caused to travel to said selected hall call is the car ahead in the prescribed way of travel.

29. In a control system according to claim 28, wherein said heavy traffic signifying means operates in response to the magnitude of any individual performance time signal being greater than twice the magnitude of the average performance time signal.

30. In a control system according to claim 29, wherein said car availability means includes an indvidual car availability switch for each car, said system including means individual to each car operating to signify the presence of a passenger in its associated car and to release the car availability switch of its respective car, said system also including means operating in response to the cancellation of said selected hall call by other than said available car and releasing the car availability switch of said available car, whereby upon the release of said car avilability switch said formerly available car is enabled to once again travel in said prescribed way and stop in response to hall calls for its direction of travel.

31. In a control system according to claim 21, wherein said second control means includes a light traffic signifying means operable to prevent a predetermined car from stopping in response to hall calls when said average performance time signal exceeds any of said individual performance time signals and a heavy traffic signifying means operable to prevent a predetermined car from stopping in response to hall calls when any of said individual performance time signals exceeds said average performance time signal, whereby said second control means operates to maintain each of said individual performance time signals substantially equal to said average performance time signal.

32. In a control system according to claim 31, wherein said second control means includes car availability means operating in response to the combined performance time signals of any car and the car immediately ahead of it in the prescribed way of travel being less than the average performance time signal; the predetermined car which is prevented from stopping by the heavy traffic signifying means being the car ahead; and the predetermined car which is prevented from stopping by the light traffic signifying means being the car ahead, in the prescribed way of travel, of the car associated with the performance time signal which caused the operation of said light traffic signifying means.

33. In a control system according to claim 32, wherein said second control means includes call selection means operating in response to the operation of said heavy traffic signifying means and selecting a hall call whose registration is producing part of the individual performance time signal which caused the operation of said heavy traffic signifying means; and direct service means operating in response to the operation of said car availability means and said call selection means and causing the car which is prevented from stopping by said heavy traffic signifying means to respond directly to said selected hall call, to travel to the floor at which it is registered and to stop thereat upon encountering that floor.

34. In an elevator control system in which a plurality of cars serve a plurality of floors in a building in response to car and hall calls registered for said floors and in which said hall calls include up hall calls and down hall calls and each of said cars travels in a prescribed way through the building while serving said floors and stops in answer to its own car calls and those hall calls for its direction of travel when its location corresponds to the floors for which said calls are registered; summation means, individual to each car, responsive to the directions of travel and the locations of the cars as well as to the hall calls and car calls registered in said system, each summation means producing as an output a performance time signal which is a function of those registered car and hall calls which the car immediately behind its associated car can stop in answer to while traveling in said prescribed way to the location of said associated car; averaging means being responsive to said summation means output signals and deriving therefrom a signal characteristic of the average of said output signals; and control means operating in response to the relationship between said averaging means signal and the output signals of said summation means to control the operation of said cars.

35. In an elevator control system according to claim 34, in which the output signal produced by each of said summation means is a function of the distance between its associated car and the car immediately behind it in said prescribed way of travel as well as of those registered car and hall calls which said car behind can stop in answer to while traveling in said prescribed way to the location of said associated car.

36. In an elevator control system according to claim 34, in which the magnitude of the output signal produced by each of said summation means is scaled to be proportional to the sum of both the time it would take the car behind its associated car to travel at its rated speed the number of floor heights between its location and the location of said associated car and the time said car behind is allotted to answer those registered car and hall calls it can stop in answer to while traveling between said locations.

37. In an elevator control system according to claim 36, in which said control means operates when the magnitude of said averaging means signal exceeds the magnitude of the output signal of one of said summation means to condition the car associated with said summation means to bypass hall calls it would otherwise stop in answer to until the magnitude of said summation means output signal equals or exceeds said averaging means signal.

38. In an elevator control system according to claim 37, including means responsive to the duration of registration of each hall call and operative upon the approach of a car in a particular direction to a floor for which a hall call for said direction has been in registration a predetermined period for preventing said control means from conditioning said car to bypass said hall call notwithstanding the conditions under which said control means otherwise would so condition said car are present.

39. In an elevator control system according to claim 37, including means operating in response to an indication that a car is empty of passengers and upon the approach of said car in a particular direction to a floor for which a hall call for said particular direction is in registration for preventing said control means from conditioning said car to bypass said hall call notwithstanding the conditions under which said control means otherwise would so condition said car are present.

40. In an elevator control system according to claim 36, wherein said control means includes car availability means operating when the combined magnitude of the output signals of the summation means individual to any car and the car immediately ahead of it is less than the magnitude of said averaging means signal and establishing said car as an available; and heavy traffic signifying means operating to signify a heavy traffic area in response to the magnitude of the output signal of any of said summation means exceeding the magnitude of said averaging means signal and preventing said available car from stopping in response to hall calls.

41. In an elevator control system according to claim 40, wherein said control means includes hall call selection means operating in response to said heavy traffic signifying means and selecting for response by said available car one of the hall calls whose registration caused the operation of said heavy traffic signifying means; and direct service means operating in response to the operation of said car availability means and said hall call selection means and causing said available car to respond only to said selected hall call and to stop in answer thereto.

42. In an elevator control system according to claim 41, wherein said heavy traffic signifying means operates in response to the magnitude of the output signal of any of said summation means being greater than twice the magnitude of said averaging means signal.

43. In an elevator control system according to claim 42, wherein said selected hall call is registered for a floor located at a position in said heavy traffic area where the performance time ahead of said floor is approximately equal to the performance time behind said floor.

44. In an elevator control system according to claim 37, wherein said control means includes car availability means operating if the combined magnitude of the output signals of the summation means individual to any one car and the car immediately ahead of it is less than the magnitude of said averaging means signal to designate said one car as an available car; and heavy traffic signifying means operating to signify a heavy traffic area in response to the magnitude of the output signal of any of said summation means exceeding the magnitude of said averaging means signal and preventing said available car from stopping in response to hall calls.

45. In an elevator control system according to claim 44, wherein said control means includes hall call selection means operating in response to said heavy traffic signifying means and selecting for response by said available car one of the hall calls whose registration caused the operation of said heavy traffic signifying means; and direct service means operating in response to the operation of said car availability means and said hall call selection means and causing said available car to respond only to said selected hall call and to stop in answer thereto.

46. In an elevator control system according to claim 45, wherein said heavy traffic signifying means operates in response to the magnitude of the outer signal of any of said summation means being greater than twice the magnitude of said averaging means signal.

47. In an elevator control system according to claim 46, wherein said selected hall call is registered for a floor located at a position in said heavy traffic area where the performance time ahead of said floor is approximately equal to the performance time behind said floor.

48. In an elevator control system according to claim 47, wherein said car availability means includes a car availability switch individual to each car, each operable to signify that its respective car is an available car and wherein said control means includes a means individual to each car, each operable to signify the presence of a passenger in its respective car, each said means preventing the operation of the car availability switch associated with its respective car.

49. In an elevator control system in which a plurality of cars serve a plurality of floors including upper and lower terminal floors in a building in response to car calls and hall calls registered for said floors in which said hall calls include up hall calls and down hall calls and each of said cars is responsive to its own registered car calls and to the registered hall calls for its direction of travel and stops to answer them as it encounters the floors for which they are registered in traveling in a prescribed way through the building while serving said floors; individual direction and location means for each car each generating a separate signal upon each approach of its car to each particular floor in each direction in which it can approach each floor; call answering time means generating in response to the registration of each call a separate answering time signal characteristic of the time allotted to a car to answer its associated call; first summation means individual to each car; first distribution circuit means receiving the call answering time signals and the signals generated by said direction and location means and being actuated in response thereto to distribute to each car's first summation means the answering time signals for those hall calls registered for the floors the car immediately behind said associated car will encounter in traveling in said prescribed way from its location to the location of said associated car and which are registered for each direction in which said car behind will encounter each of said floors while traveling between said locations; said first distribution circuit means upon actuation also distributing to each car's first summation means the answering time signals for the car calls registered in said car behind its associated car for the floors said car behind will encounter while traveling in its direction of travel between its location and the location of said associated car; each said individual first summation means upon receiving the answering time signals distributed to its producing a performance time output signal characteristic of the total time allotted the car behind its associated car to answer both the car calls and hall calls whose registration caused the generation of the time answering signals distributed to said first summation means; averaging means deriving from all the first summation means output signals a signal characteristic of the average of said output signals; and bypass means operating in response to the existence of a first predetermined relationship between said averaging means signal and one of said first summation means signal for conditioning a predetermined one of said cars to bypass hall calls.

50. In an elevator control system according to claim 49, in which said bypass means includes a circuit individual to each car and operates when the magnitude of said averaging means signal exceeds the magnitude of the output signal of one of said first summation means to condition the circuit individual to the car associated with said one first summation means whereby said car bypasses hall calls until said one first summation means output signal is equal to or exceeds said averaging means signal.

51. In an elevator control system according to claim 50, in which travel time means generates for each floor for each direction of travel to each floor a separate signal characteristic of the time it takes a car to travel at its rated speed to its associated floor from the preceding floor in the direction with which said signal is associated, and in which said first distribution circuit means receives said travel time signals and is actuated thereby to distribute to each car's first summation means those travel time signals, for each of the floors between the location of its associated car and the location of said car immediately behind it, which are associated with the direction of travel in which said car behind will pass said floors in traveling in said prescribed way to the location of said associated car so that the performance time output signal produced by each said first summation means is characteristic of the combined sum of both the total travel time of said car behind its associated car in traveling in said prescribed way to the location of said associated car and the total call answering time allotted said car behind.

52. In an elevator control system according to claim 51, in which the magnitude of each call answering time signal is proportional to the time allotted a car to answer its associated call, the magnitude of each travel time signal is proportional to the time it takes a car to travel at its rated speed to its associated floor from the floor immediately preceding said associated floor in the direction with which said signal is associated, the magnitude of the performance time output signal of each of said first summation means is proportional to the combined sum of both the total travel time of the car immediately behind its associated car and the total call answering time allotted said car behind and the magnitude of said averaging means signal is proportional to the average of the magnitudes of all said first summation means output signals.

53. In an elevator control system according to claim 52, in which individual hall call registration timing means, responsive to the duration of the registration of each hall call, each generates an associated signal whenever its respective hall call has been in registration for a predetermined period of time, each said signal being operative upon the approach of a car to the floor for which its respective call is registered in the direction with which said call is associated for causing said car to answer said call notwithstanding it would in the absence of such signal having bypassed said call.

54. In an elevator control system according to claim 52, in which a separate load responsive switch individual to each car operates in the absence of a passenger in its respective car, each such switch being operative upon the approach of its car to a floor for which a hall call is registered for the direction in which said car is traveling to cause said car to answer said call notwithstanding it would otherwise have bypassed said call.

55. In an elevator control system according to claim 52, including means for cancelling calls upon stopping to answer them and in which said call answering time means includes cancellation time dependent means for decreasing the magnitude of each call answering time signal in the time allotted for answering its respective call as a function of the time elapsed from the cancellation of said respective call.

56. In an elevator control system according to claim 52, in which said first distribution circuit means is operative upon the approach of a car to a floor in a predetermined direction and before the initiation of a stop at that floor to distribute to the first summation means associated with said car the call answering time signal for a hall call for said floor for the direction of travel of said car whereby said bypass means is prevented from causing said car to bypass said hall call if the magnitude of its call answering time signal causes the output signal of the first summation means associated with said car to equal or exceed the magnitude of said averaging means signal.

57. In an elevator control system according to claim 55, in which said first distribution circuit means is operative upon the approach of a car to a floor and after the initiation of a stop at said floor to distribute to the first summation means associated with the car immediately ahead of said car the decreasing magnitudes of the call answering time signals for a car call for said floor registered in said car and for a hall call for said floor for the direction of travel of said car.

58. In an elevator control system according to claim 49, wherein said by pass means includes a heavy traffic signifying means which operates in response to the magnitude of the output signal of one of said first summation means exceeding twice the magnitude of said averaging means signal for conditioning a predetermined one of said cars to bypass hall calls.

59. In an elevator control system according to claim 58, including a second summation means for each car; a second distribution circuit means receiving the call answering time signals and the signals generated by said direction and location means and being actuated in response thereto to distribute to each car's second summation means the answering time signals for those hall calls registered for the floors the car associated with said second summation means will encounter in traveling in said prescribed way from its location to the location of the car immediately ahead of said associated car and which hall calls are registered for each direction in which said associated car will encounter each of said floors while traveling between said locations; said second distribution circuit means upon actuation also distributing to each car's second summation means the answering time signals for the car calls registered in said associated car for the floors said associated car will encounter while traveling in its direction of travel between its location and the location of said car immediately ahead of said associated car; each said individual second summation means upon receiving the answering time signals distributed to it producing a performance time output signal characteristic of the total time allotted said associated car to answer both the car calls and hall calls whose registration caused the generation of the time answering signals distributed to said second summation means; and wherein said bypass means includes a car availability switch individual to each car, each operating to condition its associated car as an available car to bypass hall calls in response to the combined magnitudes of the output signals of its associated car's first and second summation means being less than said averaging means signal.

60. In an elevator cotrol system according to claim 59, wherein said bypass means includes hall call selection means comprising a scanning means operable in response to the operation of said heavy traffic signifying means to scan the floors for hall calls and to select one of said hall calls which caused the operation of said heavy traffic signifying means; and direct service means operable in response to the operation of one of said car availability switches to cause the car associated therewith to serve a selected hall call by traveling to the floor for which said selected hall call is registered bypassing all floors at which hall calls are registered for which it might otherwise stop to answer.

61. In an elevator control system according to claim 60, including travel time means generating for each floor for each direction of travel to each floor a separate signal characteristic of the time it takes a car to travel at its rated speed to its associated floor from the preceding floor in the direction with which said signal is associated, wherein said first distribution circuit means receives said travel time signals and is actuated thereby to distribute to each car's first summation means those travel time signals, for each of the floors between the location of its associated car and the location of the car immediately behind it, which are associated with the direction of travel in which said car behind will pass said floors in traveling in said prescribed way to the location of said associated car so that the performance time output signal produced by each said first summation means is characteristic of the combined sum of both the total travel time of said car behind its associated car in traveling in said prescribed way to the location of said associated car and the total call answering time allotted said car behind its associated car, and wherein said second distribution circuit means receives said travel time signals and is actuated thereby to distribute to each car's second summation means those travel time signals, for each of the floors between the location of its associated car and the car immediately ahead of it, which are associated with the direction of travel in which said associated car will pass said floors in traveling in said prescribed way to the location of said car ahead so that the performance time output signal produced by each said second summation means is characteristic of the combined sum of both the total travel time of said associated car in traveling in said prescribed way to the location of said car ahead and the total call answering time allotted said associated car.

62. In an elevator control system according to claim 61, including a means individual to each car, each operable to signify the presence of a passenger in its respective car, each said means preventing the operation of the car availability switch of its associated car.

63. In an elevator control system according to claim 50, wherein said bypass means includes a heavy traffic signifying means which operates in response to the magnitude of the output signal of one of said first summation means exceeding twice the magnitude of said averaging means signal for conditioning a predetermined one of said cars to bypass hall calls.

64. In an elevator control system according to claim 63, wherein said bypass means includes a car availability switch individual to each car, each operating to condition its associated car as an available car to bypass hall calls in response to the combined magnitudes of the output signals of its associated car's first and second summation means being less than said averaging means signal.

65. In an elevator control system according to claim 64, wherein said bypass means includes hall call selection means comprising a scanning means operable in response to the operation of said heavy traffic signifying means to scan the floors for hall calls and to select one of said hall calls whch caused the operation of said heavy traffic signifying means; and direct service means operable in response to the operation of one of said car availability switches to cause the car associated therewith to serve a selected hall call by traveling to the floor for which said selected hall call is registered bypassing all floors at which hall calls are registered for which it might otherwise stop to answer.

66. In an elevator control system according to claim 65, wherein said first distribution circuit means receives said travel time signals and is actuated thereby to distribute to each car's first summation means those travel time signals, for each of the floors between the location of its associated car and the location of the car immediately behind it, which are associated with the direction of travel in which said car behind said associated car will pass said floors in traveling in said prescribed way to the location of said associated car so that the performance time output signal produced by each said first summation means is characteristic of the combined sum of both the total travel time of said car behind its associated car in traveling in said prescribed way to the location of said associated car and the total call answering time allotted said car behind its associated car, and wherein said second distribution circuit means receives said travel time signals and is actuated thereby to distribute to each car's second summation means those travel time signals, for each of the floors between the location of its associated car and the car immediately ahead of it, which are associated with the direction of travel in which said associated car will pass said floors in traveling in said prescribed way to the location of said car ahead of said associated car so that the performance time output signal produced by each said second summation means is characteristic of the combined sum of both the total travel time of said associated car in traveling in said prescribed way to the location of said car ahead of said associated car and the total call answering time allotted said associated car.

67. In an elevator control system according to claim 66, including a means individual to each car, each operable to signify the presence of a passenger in its respective car, each said means preventing the operation of the car availability switch of its associated car.

68. In an elevator control system according to claim 67, wherein a separate load responsive switch individual to each car operates in the absence of a passenger in its respective car, each such switch being operative upon the approach of its car to a floor for which a hall call is registered for the direction in which said car is traveling to cause said car to answer said call notwithstanding it would otherwise have bypassed said call in response to the magnitude of said averaging means signal exceeding the magnitude of the output signal of the first summation means associated with said car.

69. In an elevator control system according to claim 68, including means for cancelling calls upon stopping to answer them and in which said call answering time means includes cancellation time dependent means for decreasing the magnitude of each call answering time signal in the time allotted for answering its respective call as a function of the time elapsed from the cancellation of said respective call.

70. In an elevator control system in which a plurality of cars serve a plurality of floors including upper and lower terminal floors in a building in response to car calls and hall calls registered for said floors and in which said hall calls include up hall calls and down hall calls and each of said cars is responsive to its own registered car calls and those registered hall calls for its direction of travel and stops to answer such calls as it encounters the floors for which they are registered in traveling in a prescribed way through the building while serving said floors; individual direction and location means for each car, each generating a separate signal in response to the approach of its associated car to each particular floor in each direction in which it can approach each floor; call answering time means generating in response to the registration of each call a separate answering time signal whose magnitude is proportional to the time allotted a car to answer its respective call; a different first electrical circuit junction point for each floor for each direction in which a car can approach each floor; said hall call answering time signal associated with each registered hall call being applied to the first junction point associated with the floor and the direction of travel for which the respective call is registered; car call separation means operating in response to the signals generated by said direction and location means and with respect to each car individually separating those car calls which are registered in it for floors from its location to the closer of either the terminal floor in its direction of travel or the floor at which the car immediately ahead of it in said prescribed way of travel is located from all other calls which might be registered in it; said call answering time signal associated with each separated car call being applied to the first junction point associated with the floor for which the respective call is registered and with the direction of travel of the car in which the respective call is registered; first summation means indvidual to each car; first switching means for each car operating in response to the signals generated by said direction and location means and connecting the first summation means of each car to the first junction points associated with the floors between the location of its respective car and the location of the car immediately behind it in said prescribed way of travel, whereby each first summation means produces a performance time output signal whose magnitude is proportional to the total call answering time allotted said car behind its respective car in traveling in said prescribed way between said locations; averaging means operating in response to the output signals of said first summation means and deriving therefrom a signal whose magnitude is proportional to the average of the magnitudes of the output signals of all said first summation means; and bypass means operating in response to the existence of a first predetermined relationship between the magnitude of said averaging means signal and the output signal of one of said first summation means for conditioning a predetermined one of said cars to bypass floors for which hall calls are registered, even though said car would otherwise answer said hall calls in its prescribed travel through the building.

71. In a control system according to claim 70, in which said bypass means is responsive to the magnitude of the output signal of any one of the first summation means being less than the magnitude of said averaging means signal to condition the car associated with said one first summation means to bypass floors for which hall calls are registered until the magnitude of the output signal of said one first summation means equals or exceeds the magnitude of the signal from said averaging means.

72. In a control system according to claim 71, in which travel time means generates for each floor for each direction of travel to each floor a separate signal whose magnitude is proportional to the time it takes a car to travel at its rated speed to said floor from the preceding floor in the direction with which said signal is associated, each separate travel time signal being applied to the first junction point associated both with the floor and with the direction for which the respective signal is generated, whereby the magnitude of the performance time output signal of each said first summation means is proportional to the sum of the total call answering time allotted said car behind its respective car and the total travel time of said car behind its respective car in traveling in said prescribed way from its location to the location of said respective car.

73. In a control system according to claim 72, in which registration timing means separately responsive to the duration of the registration of each hall call generates an associated signal whenever its respective hall call has been in registration for a predetermined period of time, each said signal being operative upon the approach of a car to the floor for which and in the direction with which its respective call is associated to condition said car to stop at said floor and answer said call even though it would otherwise have bypassed said floor.

74. In a control system according to claim 72, in which each travel time signal is applied to its respective first junction point through a rectifier which isolates the call answering time signals applied to said first point from said travel time signal and in which said switching means operates in response to the initiation of a stop at a floor by a car conditioned for continued travel in a predetermined direction to connect the first junction point associated with said floor and direction to the first summation means associated with the car immediately ahead of said car whereby the call answering time signals form part of the total call answering time signal of said car.

75. In a control system according to claim 74, including means for cancelling calls upon stopping to answer them and in which said call answering time means includes timing equipment for dissipating the magnitude of each call answering time signal in the time allotted for answering the call corresponding to said signal as a function of the time elapsed from the cancellation of said call.

76. In a control system according to claim 74, in which said first switching means and each said rectifier in conjunction operate upon the approach of a car to a floor in a predetermined direction and before the initiation of a stop at that floor to disconnect the first junction point associated with that floor and direction from the first summation means associated with the car immediately ahead of said car and to connect said first junction point to the first summation means associated with said car, whereby the call answering time signals and the travel time signal applied to said point form part of the performance time output signal of the car immediately behind said car.

77. In a control system according to claim 76, in which said car call separation means includes for each car a switch for each floor for each direction of travel to each floor, each individual floor switch for each car being actuated upon the approach of its respective car to its floor in its associated direction by a signal generated by the direction and location means of its respective car and upon such actuation each said individual floor switch enabling the call answering time signal generated by the car call registered in its car for its floor to be applied to the first junction point associated with the floor and direction of travel of said car.

78. In a control system according to claim 77, in which the individual floor switches for each car that are associated with each direction of travel are interconnected in the sequential order of the floors with which they are associated whereby a separate ring arrangement of such switches is formed for each car, adjacent floor switches in each ring being connected through a set of second switches, one such set being provided for each of the cars, each set containing a second switch for each floor for each direction of travel to each floor whereby the actuation signal generated upon the approach of a car to a particular floor is transmittable through said second switches to the floor switches in that car's ring arrangement which are associated with floors ahead in the prescribed way of travel so as to actuate said switches also and enable the call time answering signals generated by car calls registered in the respective car for the floors ahead to be applied to the first junction points associated with said floors and the direction of travel of the car.

79. In a control system according to claim 78, in which each second switch is actuated upon the approach of any car to its floor in its associated direction of travel by a signal generated by the direction and location means of the approaching car and upon actuation the second switches associated with each floor and direction open the connections in each of the ring arrangements between the floor switches for the respective floor and direction and the floor switches for the floor immediately behind in the prescribed way of travel whereby only the call answering time signals for the car calls registered in each car for the floors between its own location and the location of the car immediately ahead of it are applied to the first junction points associated with said floors and the direction of travel of the car.

80. In a control system according to claim 79, in which the second switch for each car associated with the up direction of travel to the floor adjacent the lower terminal floor is actuated to open its respective car's ring arrangement in response to downward travel of said respective car and in which the second switch for each car associated with the down direction of travel to the floor adjacent the top terminal floor is actuated to open its respective car's ring arrangement in response to upward travel of said respective car.

81. In an elevator control system according to claim 70, wherein said bypass means includes a heavy traffic signifying means which operates in response to the magnitude of the output signal of any one of the summation means exceeding twice the magnitude of said averaging means signal to condition a predetermined one of said cars to bypass floors for which hall calls are registered.

82. In an elevator control system according to claim 81, including a different second electrical circuit junction point for each floor for each direction in which a car can approach each floor; said hall call answering time signal associated with each registered hall call being applied to the second junction point associated with the floor and the direction of travel for which the respective call is registered; said call answering time signal associated with each separated car call being applied to the second junction point associated with the floor for which the respective call is registered and with the direction of travel of the car in which the respective call is registered; second summation means individual to each car; second switching means for each car operating in response to the signals generated by said direction and location means and connecting the second summation means of each car to the second junction points associated with the floors between the location of its respective car and the location of the car immediately ahead of it, whereby each second summation means produces a performance time output signal whose magnitude is proportional to the total call answering time allotted its associated car in traveling in said prescribed way between said locations; and wherein said bypass means includes a car availability switch individual to each car, each operating to condition its associated car as an available car to bypass hall calls in response to the combined magnitudes of the output signals of its associated car's first and second summation means being less than said averaging means signal.

83. In an elevator control system according to claim 82, wherein said bypass means includes hall call selection means comprising scanning means, first and second selection summation means and first and second selection switching means; said scanning means operating in response to the operation of said heavy traffic signifying means and generating in the sequence of the prescribed way of travel through the building a separate floor signal corresponding to each particular floor in each particular direction in which a car can approach each floor; said first and second selection switching means operating in response to the signals generated by said scanning means and connecting the first and second selection summation means, respectively, to the first and second junction points, respectively, so that said first and second selection summation means operate in the same manner as the first and second summation means associated with a car so as to produce, respectively, at each floor a first selection performance time output signal whose magnitude is proportional to the total call answering time which would be allotted the closest car approaching the location of that floor in traveling in said prescribed way if another car was located there and a second selection performance time output signal whose magnitude is proportional to the total call answering time which would be allotted a car located at that floor in traveling in said prescribed way to the location of the car immediately ahead in the prescribed way; said scanning means operating in response to the existence of predetermined relationships between the magnitude of said averaging means signal and the magnitudes of the output signals of said first and said second selection summation means to cease the generation of said flow signals with the generation of a selected one corresponding to a floor at which a selected hall call is registered which caused the operation of said heavy traffic signifying means; and direct service means operable in response to the operation of one of said car availability switches to cause the car associated therewith to travel to the floor corresponding to the selected floor signal and stop thereat in answer to said selected hall call bypassing all other floors it encounters at which hall calls are registered for its direction of travel.

84. In an elevator control system according to claim 83, wherein said scanning means ceases the generation of said floor signals when the magnitudes of the output signals of both the first and the second selection summation means each equals or exceeds the magnitude of said averaging means signal.

85. In an elevator control system according to claim 84, including travel time means generating for each floor for each direction of travel to each floor a separate signal whose magnitude is proportional to the time it takes a car to travel at its rated speed to said floor from the preceding floor in the direction with which said signal is associated, each separate travel time signal being applied to the first junction point associated both with the floor and with the direction for which the respective signal is generated, whereby the magnitude of the performance time output signal of each said first summation means is proportional to the sum of the total call answering time allotted the car immediately behind its respective car and the total travel time of said car behind in traveling in said prescribed way from its location to the location of said respective car, each separate travel time signal being applied to the second junction point associated both with the floor and with the direction immediately preceding in the prescribed way of travel the floor and the direction for which the respective signal is generated, whereby the magnitude of the performance time output signal of each said second summation means is proportional to the sum of the total call answering time allotted its respective car in traveling in said prescribed way from its location to the location of the car immediately ahead of it.

86. In an elevator control system according to claim 85, including a means individual to each car, each operable to signify the presence of a passenger in its respective car, each said means preventing the operation of the car availability switch of its associated car.

87. In an elevator control system according to claim 86, including means for cancelling calls upon stopping to answer them and in which said call answering time means includes timing equipment for dissipating the magnitude of each call answering time signal in the time allotted for answering the call corresponding to said signal as a function of the time elapsed from the cancellation of said call.

88. In an elevator control system according to claim 87, wherein said car call separation means includes for each car a switch for each floor for each direction of travel to each floor, each individual floor switch for each car being actuated upon the approach of its respective car to its floor in its associated direction by a signal generated by the direction and location means of its respective car and upon such actuation each said individual floor switch enabling the call answering time signal generated by the car call registered in its car for its floor to be applied to the first and second junction points associated with the floor and direction of travel of said car.

89. In an elevator control system according to claim 88, wherein the individual floor switches for each car that are associated with each direction of travel are interconnected in the sequential order of the floors with which they are associated whereby a separate ring arrangement of such switches is formed for each car, adjacent floor switches in each ring being connected through a set of second switches, one such set being provided for each of the cars, each set containing a second switch for each floor for each direction of travel to each floor whereby the actuation signal generated upon the approach of a car to a particular floor is transmittable through said second switches to the floor switches in that car's ring arrangement which are associated with floors ahead in the prescribed way of travel so as to actuate said switches also and enable the call time answering signals generated by car calls registered in the respective car for the floors ahead to be applied to the first and second junction points associated with said floors and the direction of travel of the car.

90. In an elevator control system according to claim 89, wherein each second switch is actuated upon the approach of any car to its floor in its associated direction of travel by a signal generated by the direction and location means of the approaching car and upon actuation the second switches associated with each floor and direction open the connections in each of the ring arrangements between the floor switches for the respective floor and direction and the floor switches for the floor immediately behind in the prescribed way of travel whereby only the call answering time signals for the car calls registered in each car for the floors between its own location and the location of the car immediately ahead of it are applied to the first and second junction points associated with said floors and the direction of travel of the car.

91. In an elevator control system according to claim 90, wherein the second switch for each car associated with the up direction of travel to the floor adjacent the lower terminal floor is actuated to open its respective car's ring arrangement in response to downward travel of said respective car and in which the second switch for each car associated with the down direction of travel to the floor adjacent the top terminal floor is actuated to open its respective car's ring arrangement in response to upward travel of said respective car.

92. In an elevator control system according to claim 71, wherein said bypass means includes a heavy traffic signifying means which operates in response to the magnitude of the output signal of any one of the summation means exceeding twice the magnitude of said averaging means signal to condition a predetermined one of said cars to bypass floors for which hall calls are registered.

93. In an elevator control system according to claim 92, including a different second electrical circuit junction point for each floor for each direction in which a car can approach each floor; said hall call answering time signal associated with each registered hall call being applied to the second junction point associated with the floor and the direction of travel for which the respective call is registered; said call answering time signal associated answering time signal associated with each separated car call being applied to the second junction point associated with the floor for which the respective call is registered and with the direction of travel of the car in which the respective call is registered; second summation means individual to each car; second switching means for each car operating in response to the signals generated by said direction and location means and connecting the second summation means of each car to the second junction points associated with the floors between the location of its respective car and the location of the car immediately ahead of it, whereby each second summation means produces a performance time output signal whose magnitude is proportional to the total call answering time allotted its associated car in traveling in said prescribed way between said locations; and wherein said bypass means includes a car availability switch individual to each car, each operating to condition its associated car as an available car to bypass hall calls in response to the combined magnitudes of the output signals of its associated car's first and second summation means being less than said averaging means signal.

94. In an elevator control system according to claim 93, wherein said bypass means includes hall call selection means comprising scanning means, first and second selection summation means and first and second selection switching means; said scanning means operating in response to the operation of said heavy traffic signifying means and generating in the sequence of the prescribed way of travel through the building a separate floor signal corresponding to each particular floor in each particular direction in which a car can approach each floor; said first and second selection switching means operating in response to the signals generated by said scanning means and connecting the first and second selection summation means, respectively, to the first and second junction points, respectively, so that said first and second selection summation means operate in the same manner as the first and second summation means associated with a car so as to produce, respectively, at each floor a first selection performance time output signal whose magnitude is proportional to the total call answering time which would be allotted the closest car approaching the location of that floor in traveling in said prescribed way if another car was located there and a second selection performance time output signal whose magnitude is proportional to the total call answering time which would be allotted a car located at that floor in traveling in said prescribed way to the location of the car immediately ahead in said prescribed way; said scanning means operating in response to the existence of predetermined relationships between the magnitude of said averaging signal means and the magnitude of the output signals of said first and second selection summation means to cease the generation of said floor signals with the generation of a selected one corresponding to a floor at which a selected hall call is registered which caused the operation of said heavy traffic signifying means; and direct service means operable in response to the operation of one of said car availability switches to cause the car associated therewith to travel to the floor corresponding to the selected floor signal and stop thereat in answer to said selected hall call bypassing all other floors it encounters at which hall calls are registered for its direction of travel.

95. In an elevator control system according to claim 94, wherein said scanning means ceases the generation of said floor signals when the magnitudes of the output signals of both the first and the second selection summation means each equals or exceeds the magnitude of said averaging means signal.

96. In an elevator control system according to claim 95, including travel time means generating for each floor for each direction of travel to each floor a separate signal whose magnitude is proportional to the time it takes a car to travel at its rated speed to said floor from the preceding floor in the direction with which said signal is associated, each separate travel time signal being applied to the first junction point associated both with the floor and with the direction for which the respective signal is generated, whereby the magnitude of the performance time output signal of each said first summation means is proportional to the sum of the total call answering time allotted the car immediately behind its respective car and the total travel time of said car behind in traveling in said prescribed way from its location to the location of said respective car, each separate travel time signal being applied to the second junction point associated both with the floor and with the direction immediately preceding in the prescribed way of travel the floor and the direction for which the respective signal is generated, whereby the magnitude of the performance time output signal of each said second summation means is proportional to the sum of the total call answering time allotted its respective car and the total travel time of its respective car in traveling in said prescribed way from its location to the location of the car immediately ahead of it.

97. In an elevator control system according to claim 96, including a means individual to each car, each operable to signify the presence of a passenger in its respective car, each said means preventing the operation of the car availability switch of its associated car.

98. In an elevator control system according to claim 97, wherein each travel time signal is connected through a separate rectifier to the first and second junction points to which it is applied, each said rectifier isolating the call answering time signals applied to said first and second points from said travel time signal and wherein said first and second switching means, respectively, operate in response to the initiation of a stop at a floor by a car conditioned for continued travel in a predetermined direction to disconnect, and connect respectively, the first and secod junction points associated with said floor and direction from the first and to the second summation means associated with said car whereby the call answering time signals form part of the total call answering time signals of said car.

99. In an elevator control system according to claim 98, including means for cancelling calls upon stopping to answer them and in which said call answering time means includes timing equipment for dissipating the magnitude of each call answering time signal in the time allotted for answering the call corresponding to said signal as a function of the time elapsed from the cancellation of said call.

100. In an elevator control system according to claim 99, wherein said first and second switching means and said rectifiers connected to said first and second junction points operate in conjunction upon the approach of a car to a floor in a predetermined direction and before the initiation of a stop thereat to connect and disconnect, respectively, the first and second junction points associated with that floor and direction to the first and from the second summation means associated with said car, whereby the call answering time signals and the travel time signals applied to said points form part of the performance time output signal of the car immediately behind said associated car.

101. In an elevator control system according to claim 100, wherein said car call separation means includes for each car a switch for each floor for each direction of travel to each floor, each individual floor switch for each car being actuated upon the approach of its respective car to its floor in its associated direction by a signal generated by the direction and location means of its respective car and upon such actuation each said individual floor switch enabling the call answering time signal generated by the car call registered in its car for its floor to be applied to the first and second junction points associated with the floor and direction of travel of said car.

102. In an elevator control system according to claim 101, wherein the individual floor switches for each car that are associated with each direction of travel are interconnected in the sequential order of the floors with which they are associated whereby a separate ring arrangement of such switches is formed for each car, adjacent floor switches in each ring being connected through a set of second switches, one such set being provided for each of the cars each set containing a second switch for each floor for each direction of travel to each floor whereby the actuation signal generated upon the approach of a car to a particular floor is transmittable through said second switches to the floor switches in that car's ring arrangement which are associated with floors ahead in the prescribed way of travel so as to actuate said switches also and enable the call time answering signals generated by car calls registered in the respective car for the floors ahead to be applied to the first and second junction points associated with said floors and the direction of travel of the car.

103. In an elevator control system according to claim 102, wherein each second switch is actuated upon the approach of any car to its floor in its associated direction of travel by a signal generated by the direction and location means of the approaching car and upon actuation the second switches associated with each floor and direction open the connections in each of the ring arrangements between the floor switches for the respective floor and direction and the floor switches for the floor immediately behind in the prescribed way of travel whereby only the call answering time signals for the car calls registered in each car for the floors between its own location and the location of the car immediately ahead of it are applied to the first and second junction points associated with said floors and the direction of travel of the car.

104. In an elevator control system according to claim 103, wherein the second switch for each car associated with the up direction of travel to the floor adjacent the lower terminal floor is actuated to open its respective car's ring arrangement in response to downward travel of said respective car and in which the second switch for each car associated with the down direction of travel to the floor adjacent the top terminal floor is actuated to open its respective car's ring arrangement in response to upward travel of said respective car.

105. In an elevator control system for a plurality of elevator cars operating to provide service to a plurality of landings in response to signals common to said cars generated by the registration of calls at said landings; call selection means receiving all the call registration signals generated and selecting a particular registered call for direct service by one of said cars; direct service means selecting a particular car to provide direct service to said selected call; encoding means connected to said call selection means operating in response to the selection of said particular call and causing the characteristics of the call registration signal of said selected call to be different from the characteristics of the call registration signals of other registered calls; and decoding means connected to said direct service means operating in response to the selection of said particular car and causing said car to operate in response to said call registration signal of said selected call while preventing it from operating in response to call registration signals having characteristics different from that of said selected call signal.

106. In an elevator control system according to claim 105, wherein said call registration signals are generated as steady state direct current signals and said encoding means causes the transfer of all said signals except that of said selected call to pulsating signals.

107. In an elevator control system according to claim 106, wherein said decoding means includes decoding apparatus individual to each car, each receiving all call registration signals and operating to enable its respective car to operate in response to either steady state direct current call registration signals or pulsating call registration signals provided its respective car is not selected by said direct service means.

108. In an elevator control system according to claim 107, including heavy traffic signifying means operating in response to the registration of calls to signify a predetermined traffic condition, said call selection means operating in response to the operation of said heavy traffic signifying means to select a call whose registration caused the operation of said heavy traffic signifying means.

109. In an elevator control system according to claim 108, including car availability means operating in response to the registration of calls to signify the availability of a car for selection to provide direct service to a particular call, said direct service means and said call selection means both operating in response to the operation of said car availability means.

110. In an elevator control system according to claim 109, wherein said plurality of cars normally travel in a prescribed way to serve said plurality of landings and said plurality of landings are segregated into groups of landings, each group associated with a different one of said cars, the landings in each group including that at which its respective car is located and those landings between that landing and the landing at which the car ahead of said respective car is located considering the prescribed way of travel of said cars.

111. In an elevator control system according to claim 110, wherein said heavy traffic signifying means operates in response to said predetermined traffic condition in any of said groups.

112. In an elevator control system according to claim 111, wherein said car availability means operates in response to the number of calls registered at the landings of any two adjacent groups being less than a predetermined number.

113. In an elevator control system according to claim 112, wherein said car availability means includes a car availability switch individual to each car, each operating to signify the availability of its respective car in response to the number of registered calls at the landings of the group associated with its respective car and the group associated with the car immediately behind its respective car in the prescribed way of travel being less than said predetermined number.

114. In an elevator control system according to claim 113, wherein said direct service means includes a direct service switch individual to each car, said direct service switches and each said car availability switch being so connected that only one car at a time can be selected to provide direct service.

115. In an elevator control system according to claim 114, including call cancellation means operating to cancel a call in response to any car providing service to said call, said direct service means operating in response to the cancellation of a selected call to release the selection of the car selected to provide direct service to that call.

116. In an elevator control system according to claim 115, wherein said call selection means includes a scanning means scanning registered calls in the sequential order of the landings in the prescribed way of travel.

117. In an elevator control system according to claim 116, including a pulse generator connected to said encoding means and said scanning means operating in response to said car availability means to cause the transfer of said call registration signals and to cause the operation of said scanning means.

References Cited

UNITED STATES PATENTS 3,443,668   5/1969   Hall et al. _____ 187—29

ORIS L. RADER, Primary Examiner

W. E. DUNCANSON, JR., Assistant Examiner